US012521560B2

(12) United States Patent
Galarneau et al.

(10) Patent No.: US 12,521,560 B2
(45) Date of Patent: Jan. 13, 2026

(54) MEDICAL DEVICE AND METHOD FOR ENABLING A CARDIAC MONITORING FEATURE

(71) Applicant: Medtronic, Inc., Minneapolis, MN (US)

(72) Inventors: Michelle M. Galarneau, Minneapolis, MN (US); Saul E. Greenhut, Denver, CO (US); Yanina Grinberg, Plymouth, MN (US); Todd J. Sheldon, North Oaks, MN (US)

(73) Assignee: Medtronic, Inc., Minneapolis, MN (US)

( * ) Notice: Subject to any disclaimer, the term of this patent is extended or adjusted under 35 U.S.C. 154(b) by 1199 days.

(21) Appl. No.: 17/392,585

(22) Filed: Aug. 3, 2021

(65) Prior Publication Data
US 2022/0062646 A1    Mar. 3, 2022

Related U.S. Application Data

(60) Provisional application No. 63/070,325, filed on Aug. 26, 2020.

(51) Int. Cl.
*A61N 1/37*    (2006.01)
(52) U.S. Cl.
CPC ................................. *A61N 1/3714* (2013.01)
(58) Field of Classification Search
CPC .. A61N 1/3714; A61N 1/3706; A61N 1/3756; A61N 1/37205; A61N 1/36578; A61N 1/36585; A61B 5/363; A61B 5/686; A61B 5/7282; A61B 5/4836
See application file for complete search history.

(56) References Cited

U.S. PATENT DOCUMENTS

| | | | |
|---|---|---|---|
| 4,485,813 A | 12/1984 | Anderson et al. |
| 5,052,388 A | 10/1991 | Sivula et al. |
| 5,507,782 A | 4/1996 | Kieval et al. |
| 5,593,431 A | 1/1997 | Sheldon |
| 5,683,426 A | 11/1997 | Greenhut et al. |
| 5,885,471 A | 3/1999 | Ruben et al. |
| 6,044,297 A | 3/2000 | Sheldon et al. |

(Continued)

FOREIGN PATENT DOCUMENTS

| | | |
|---|---|---|
| WO | 2006086435 A2 | 8/2006 |
| WO | 2016118508 A1 | 7/2016 |

OTHER PUBLICATIONS (PCT/US2021/045154) PCT Notification of Transmittal of the International Search Report and the Written Opinion of the International Searching Authority, Mailed Nov. 10, 2021, 9 pages.

(Continued)

*Primary Examiner* — Ankit D Tejani
*Assistant Examiner* — Joshua Brendon Solomon

(57) ABSTRACT

A medical device is configured to sense a cardiac signal, determine a monitoring metric representative of activity of at least one heart chamber from the sensed cardiac signal, and determine that the monitoring metric meets expected rhythm criteria. The medical device may enable a monitoring feature of the medical device that is based on processing and analysis of the cardiac signal in response to the monitoring metric meeting the expected rhythm criteria.

30 Claims, 14 Drawing Sheets

(56) References Cited

U.S. PATENT DOCUMENTS

| | | | |
|---|---|---|---|
| 6,434,428 | B1 | 8/2002 | Sloman et al. |
| 8,204,593 | B2 | 6/2012 | Sheldon et al. |
| 8,731,662 | B2 | 5/2014 | Imran |
| 8,788,028 | B2 | 7/2014 | Kumar et al. |
| 9,592,391 | B2 | 3/2017 | Stahmann et al. |
| 10,463,866 | B2 | 11/2019 | Stahmann et al. |
| 2008/0234771 | A1 | 9/2008 | Chinchoy et al. |
| 2012/0095521 | A1 | 4/2012 | Hintz |
| 2012/0215274 | A1 | 8/2012 | Koh et al. |
| 2014/0121720 | A1 | 5/2014 | Bonner et al. |
| 2016/0015984 | A1 | 1/2016 | Demmer et al. |
| 2016/0175603 | A1 | 6/2016 | Sheldon et al. |
| 2016/0310733 | A1* | 10/2016 | Sheldon ............... A61N 1/3756 |
| 2018/0028087 | A1* | 2/2018 | Zhang ................... A61B 5/349 |
| 2018/0361160 | A1* | 12/2018 | Sheldon ............. A61N 1/36542 |
| 2019/0083779 | A1 | 3/2019 | Yang et al. |
| 2019/0298210 | A1 | 10/2019 | Bennet et al. |
| 2020/0269055 | A1* | 8/2020 | Kleckner ............ A61N 1/36592 |
| 2020/0376280 | A1* | 12/2020 | Shuros ............... A61N 1/36585 |
| 2020/0406041 | A1* | 12/2020 | Cao ....................... A61B 5/352 |

OTHER PUBLICATIONS

Galarneau, et al., U.S. Appl. No. 63/006,208, entitled "Medical Device and Method for Detecting Atrioventricular Block," filed Apr. 7, 2020, 84 pages.

\* cited by examiner

MEDICAL DEVICE AND METHOD FOR ENABLING A CARDIAC MONITORING FEATURE

REFERENCE TO RELATED APPLICATIONS

This application claims the benefit of U.S. Provisional Patent Application No. 63/070,325, filed on Aug. 26, 2020, incorporated herein by reference in its entirety.

TECHNICAL FIELD

This disclosure relates to a medical device configured to enable and disable a cardiac monitoring feature of the medical device.

BACKGROUND

During normal sinus rhythm (NSR), the heartbeat is regulated by electrical signals produced by the sino-atrial (SA) node located in the right atrial wall. Each atrial depolarization signal produced by the SA node spreads across the atria, causing the depolarization and contraction of the atria, and arrives at the atrioventricular (AV) node. The AV node responds by propagating a ventricular depolarization signal through the bundle of His of the ventricular septum and thereafter to the bundle branches and the Purkinje muscle fibers of the right and left ventricles, sometimes referred to as the "His-Purkinje system."

Patients with a conduction system abnormality, e.g., SA node dysfunction or poor AV node conduction, bundle branch block, or other conduction abnormalities, may receive a pacemaker to restore a more normal heart rhythm. A single chamber pacemaker coupled to a transvenous lead carrying electrodes positioned in the right atrium may provide atrial pacing to treat a patient having SA node dysfunction. When the AV node is functioning normally, single chamber atrial pacing may sufficiently correct the heart rhythm. The pacing-evoked atrial depolarizations may be conducted normally to the ventricles via the AV node and the His-Purkinje system maintaining normal AV synchrony. Some patients, however, may experience conduction abnormalities of the AV node, e.g., partial or complete AV block. AV block may be intermittent and may evolve over time. In the presence of high-grade AV block, atrial depolarizations are not conducted to the ventricles on every atrial cycle.

A dual chamber pacemaker may be implanted in some patients to pace both the atrial and ventricular chambers and maintain AV synchrony. The dual chamber pacemaker may be coupled to a transvenous atrial lead and a transvenous ventricular lead, for placing electrodes for sensing and pacing in both the atrial and ventricular chambers. The pacemaker itself is generally implanted in a subcutaneous pocket with the transvenous leads tunneled to the subcutaneous pocket. Intracardiac pacemakers have been introduced or proposed for implantation entirely within a patient's heart eliminating the need for transvenous leads. For example, an atrial intracardiac pacemaker may provide sensing and pacing from within an atrial chamber of a patient having bradycardia or SA node dysfunction but is expected to have AV conduction. A ventricular intracardiac pacemaker may provide sensing and pacing from within a ventricular chamber of a patient having AV block to provide ventricular rate support.

SUMMARY

The techniques of this disclosure generally relate to a medical device configured to sense at least one cardiac signal that includes cardiac event signals, e.g., atrial event signals which may correspond to atrial systolic events and/or ventricular event signals which may correspond to ventricular systolic or diastolic events. The medical device is configured to perform a cardiac monitoring feature in association with at least one cardiac signal, such as monitoring for AV block, monitoring for cardiac pacing capture, monitoring for oversensing and/or undersensing of cardiac events, or other cardiac-related or device performance-related monitoring from a second cardiac signal. In some examples, the medical device may be configured to sense cardiac signals for controlling therapy delivery, e.g., for controlling the delivery of cardiac pacing pulses. The medical device may be configured to enable or disable the cardiac monitoring feature without altering or disrupting the cardiac signal sensing and therapy delivered by the medical device. The medical device may be configured to determine a monitoring metric from a sensed cardiac signal over a test time interval to verify that the monitoring metric meets expected cardiac rhythm criteria. When the expected cardiac rhythm criteria are met based on the monitoring metric determined from the sensed cardiac signal and in association with an event monitoring threshold, the medical device may enable a cardiac monitoring feature in association with sensing the cardiac signal and the event monitoring threshold.

In one example, the medical device is a pacemaker that includes an AV block monitoring feature. The pacemaker may be configured to sense an atrial electrical signal, deliver atrial pacing pulses, and sense a cardiac motion signal. The pacemaker may set a ventricular event monitoring threshold, determine a ventricular event monitoring metric from at least one of the atrial electrical signal or the cardiac motion signal during a test time interval, and determine that AV conduction criteria are met by the ventricular event monitoring metric during the test time interval. The pacemaker may enable AV block monitoring in response to the AV conduction criteria being met during the test time interval and disable AV block monitoring in response to the AV conduction criteria not being met.

In one example, the disclosure provides a medical device including a sensing circuit configured to sense a cardiac signal, and a control circuit configured to determine a monitoring metric representative of activity of at least one heart chamber from the cardiac signal. The control circuit is configured to determine that the monitoring metric meets expected rhythm criteria. The control circuit may enable a monitoring feature of the medical device that is based on processing and analysis of the cardiac signal in response to the monitoring metric meeting the expected rhythm criteria.

In another example, the disclosure provides a method including sensing a cardiac signal, determining a monitoring metric representative of activity of at least one heart chamber from the cardiac signal, determining that the monitoring metric meets expected rhythm criteria, and enabling a monitoring feature of the medical device that is based on processing and analysis of the cardiac signal in response to the monitoring metric meeting the expected rhythm criteria.

In another example, the disclosure provides a non-transitory, computer-readable storage medium comprising a set of instructions which, when executed by a control circuit of a medical device, cause the medical device to sense a cardiac signal, determine a monitoring metric representative of activity of at least one heart chamber from the cardiac signal, determine that the monitoring metric meets expected rhythm criteria, and enable a monitoring feature of the medical device that is based on processing and analysis of the cardiac signal in response to the monitoring metric meeting the expected rhythm criteria.

Further disclosed herein is the subject matter of the following clauses:

1. A medical device comprising:
   a first sensing circuit configured to sense at least a first cardiac signal; and
   a control circuit configured to determine a monitoring metric from the first cardiac signal; determine that the monitoring metric meets atrioventricular conduction criteria; and enable atrioventricular block monitoring based on sensing the first cardiac signal in response to the monitoring metric meeting the atrioventricular conduction criteria.

2. The medical device of clause 1, wherein the control circuit is configured to:
   set a first event monitoring threshold by determining the monitoring metric from the first cardiac signal sensed during a first time interval; and determining the first event monitoring threshold based on the determined monitoring metric;
   redetermine the monitoring metric from the first cardiac signal sensed during a second time interval after the first time interval; and
   determine that the redetermined monitoring metric meets the atrioventricular conduction criteria based on a comparison of the redetermined monitoring metric to the first event monitoring threshold.

3. The medical device of any of clauses 1-2, wherein the control circuit is configured to determine the monitoring metric by determining an integration metric of the first cardiac signal.

4. The medical device of clause 3, wherein the control circuit is configured to determine an atrial rate; and determine the monitoring metric by normalizing the integration metric by the atrial rate.

5. The medical device of any of clauses 3-4, wherein the control circuit is configured to set a first event monitoring threshold by:
   determining the integration metric from the first cardiac signal over each one of a plurality of integration time intervals occurring within a first time interval, where each one of the plurality of integration time intervals extends over a plurality of cardiac cycles;
   determining the first event monitoring threshold based on the integration metrics determined from the first cardiac signal sensed over the first time interval;
   re-determine the integration metric from the first cardiac signal sensed over at least one integration time interval occurring during a second time interval after the first time interval; compare the re-determined integration metric to the first event monitoring threshold; and determine that the atrioventricular conduction criteria are met when the re-determined integration metric is greater than the first event monitoring threshold.

6. The medical device of clause 5, wherein the control circuit is configured to set the first event monitoring threshold by identifying a minimum integration metric from the integration metrics determined over each one of the plurality of integration time intervals occurring during the first time interval; and setting the event monitoring threshold based on the minimum integration metric.

7. The medical device of any of clauses 1-2, wherein the control circuit is configured to determine the monitoring metric by:
   identifying a plurality of ventricular events from the first cardiac signal; and
   determining the monitoring metric based on the identified plurality of ventricular events by determining at least one of: a ventricular event rate; an atrioventricular time interval; and a ratio of a count of the plurality of ventricular events to a count of atrial events occurring over a time interval comprising the identified plurality of ventricular events.

8. The medical device of clause 7, wherein the control circuit is configured to: set an event monitoring threshold; and identify the plurality of ventricular events from the first cardiac signal based on the first cardiac signal crossing the event monitoring threshold.

9. The medical device of clause 8, wherein the control circuit is configured to set the event monitoring threshold by setting a blanking interval in response to each of the plurality of atrial events; determining a maximum amplitude of the first cardiac signal outside the blanking interval; and setting the event monitoring threshold based on the maximum amplitude.

10. The medical device of any of clauses 1-9, wherein the control circuit is configured to:
    set a first event monitoring threshold;
    determine the monitoring metric from the first cardiac signal sensed during a first time interval;
    determine, according to the first event monitoring threshold, that the monitoring metric determined from the first cardiac signal sensed during the first time interval does not meet the atrioventricular conduction criteria;
    adjust the first event monitoring threshold to a second event monitoring threshold;
    re-determine the monitoring metric from the first cardiac signal sensed during a second time interval after the first time interval;
    determine, according to the second event monitoring threshold, that the re-determined monitoring metric determined from the first cardiac signal sensed during the second time interval meets the atrioventricular conduction criteria; and
    enable the atrioventricular block monitoring in response to the redetermined monitoring metric meeting the atrioventricular conduction criteria.

11. The medical device of any of clauses 1-10, comprising a second sensing circuit configured to sense a second cardiac signal different than the first cardiac signal, wherein the control circuit is configured to:
    determine that the monitoring metric determined from the first cardiac signal does not meet the atrioventricular conduction criteria;
    determine a second monitoring metric from the second cardiac signal;
    determine that the second monitoring metric meets the atrioventricular conduction criteria; and
    enable the atrioventricular block monitoring based on the second cardiac signal in response to the second monitoring metric meeting the atrioventricular conduction criteria.

12. The medical device of any of clauses 1-11, wherein the first sensing circuit comprises an accelerometer for sensing the first cardiac signal as an acceleration signal.

13. The medical device of any of clauses 1-12, wherein:
    the first sensing circuit is configured to sense the first cardiac signal as a cardiac electrical signal;
    the control circuit is configured to:
        set an event monitoring threshold by setting a far field R-wave detection threshold; sense far field R-waves from the cardiac electrical signal; and
        determine the event monitoring metric based on the sensed far field R-waves.
14. The medical device of any of clauses 1-13, comprising:
    a second sensing circuit configured to sense a second cardiac signal different than the first cardiac signal;
    wherein the control circuit is configured to determine when the second cardiac signal meets second atrioventricular conduction criteria; and enable the atrioventricular block monitoring based on sensing the first cardiac signal and the second cardiac signal in response to the monitoring metric determined from the first cardiac signal meeting the atrioventricular conduction criteria and the second cardiac signal meeting second atrioventricular conduction criteria.
15. A method, comprising:
    sensing at least a first cardiac signal
    determining a monitoring metric from the first cardiac signal;
    determining that the monitoring metric meets atrioventricular conduction criteria; and
    enabling atrioventricular block monitoring based on the sensing first cardiac signal in response to the monitoring metric meeting the atrioventricular conduction criteria.
16. The method of clause 15, comprising:
    setting a first event monitoring threshold by determining the monitoring metric from the first cardiac signal sensed during a first time interval; and determining the first event monitoring threshold based on the determined monitoring metric;
    redetermining the monitoring metric from the first cardiac signal sensed during a second time interval after the first time interval; and
    determining that the redetermined monitoring metric meets the atrioventricular conduction criteria based on a comparison of the redetermined monitoring metric to the first event monitoring threshold.
17. The method of any of clauses 15-16, wherein determining the monitoring metric comprises determining an integration metric of the first cardiac signal.
18. The method of clause 17, comprising:
    determining an atrial rate; and
    determining the monitoring metric by normalizing the integration metric by the atrial rate.
19. The method of any of clause 17-18, comprising:
    setting a first event monitoring threshold by determining the integration metric from the first cardiac signal over each one of a plurality of integration time intervals occurring within a first time interval, where each one of the plurality of integration time intervals extends over a plurality of cardiac cycles; and determining the first event monitoring threshold based on the integration metrics determined from the first cardiac signal sensed during the first time interval;
    re-determining the integration metric from the first cardiac signal sensed over at least one integration time interval occurring during a second time interval after the first time interval;
    comparing the re-determined integration metric to the first event monitoring threshold; and
    determining that the atrioventricular conduction criteria are met when the re-determined integration metric is greater than the first event monitoring threshold.
20. The method of clause 19, wherein setting the first event monitoring threshold comprises identifying a minimum integration metric from the integration metrics determined over each one of the plurality of integration time intervals occurring during the first time interval; and setting the event monitoring threshold based on the minimum integration metric.
21. The method of any of clauses 15-16, wherein determining the monitoring metric comprises:
    identifying a plurality of ventricular events from the first cardiac signal; and
    determining the monitoring metric based on the identified plurality of ventricular events by determining at least one of: a ventricular event rate; an atrioventricular time interval; and a ratio of a count of the plurality of ventricular events to a count of atrial events occurring over a time interval comprising the identified plurality of ventricular events.
22. The method of clause 21, comprising:
    set an event monitoring threshold;
    identify the plurality of ventricular events from the first cardiac signal based on the first cardiac signal crossing the event monitoring threshold.
23. The method of clause 22, wherein setting the event monitoring threshold comprises setting a blanking interval in response to each of the plurality of atrial events determining a maximum amplitude of the first cardiac signal outside the blanking interval; and setting the event monitoring threshold based on the maximum amplitude.
24. The method of any of clauses 15-23, comprising:
    setting a first event monitoring threshold;
    determining the monitoring metric from the first cardiac signal sensed during a first time interval;
    determining, according to the first event monitoring threshold, that the monitoring metric determined from the first cardiac signal sensed during the first time interval does not meet the atrioventricular conduction criteria;
    adjusting the first event monitoring threshold to a second event monitoring threshold;
    re-determining the monitoring metric from the first cardiac signal sensed during a second time interval after the first time interval;
    determining, according to the second event monitoring threshold, that the re-determined monitoring metric determined from the first cardiac signal sensed during the second time interval meets the atrioventricular conduction criteria; and
    enabling the atrioventricular block monitoring in response to the redetermined monitoring metric meeting the atrioventricular conduction criteria.
25. The method of any of clauses 15-24, comprising:
    determining that the monitoring metric determined from the first cardiac signal does not meet the atrioventricular conduction criteria; sensing a second cardiac signal different than the first cardiac signal;
    determining a second monitoring metric from the second cardiac signal;
    determining that the second monitoring metric meets the atrioventricular conduction criteria; and enabling the atrioventricular block monitoring based on the second cardiac signal in response to the second monitoring metric meeting the atrioventricular conduction criteria.
26. The method of any of clauses 15-25, comprising sensing the first cardiac signal as an acceleration signal.
27. The method of any of clauses 15-26, comprising:
sensing the first cardiac signal as a cardiac electrical signal;
setting a far field R-wave detection threshold;
sensing far field R-waves from the cardiac electrical signal based on the far field R-wave detection threshold; and
determining the event monitoring metric based on the sensed far field R-waves.
28. The method of any of clauses 15-27, comprising:
sensing a second cardiac signal different than the first cardiac signal; determining when the second cardiac signal meets second atrioventricular conduction criteria; and
enabling the atrioventricular block monitoring based on sensing the first cardiac signal and the second cardiac signal in response to the monitoring metric determined from the first cardiac signal meeting the atrioventricular conduction criteria and the second cardiac signal meeting second atrioventricular conduction criteria.
29. A non-transitory, computer-readable storage medium comprising a set of instructions which, when executed by a control circuit of a medical device, cause the medical device to:
sense a cardiac signal
determine a monitoring metric from the cardiac signal;
determine that the monitoring metric meets atrioventricular conduction criteria; and
enable atrioventricular block monitoring based on sensing the first cardiac signal in response to the monitoring metric meeting the atrioventricular conduction criteria.
30. A medical device comprising:
a sensing circuit configured to sense a cardiac signal; and
a control circuit configured to:
determine a monitoring metric from the cardiac signal;
determine that the monitoring metric meets an expected cardiac rhythm criteria; and
enable a monitoring feature based on sensing the cardiac signal in response to the monitoring metric meeting the expected cardiac rhythm criteria.
31. The medical device of clause 30, wherein the control circuit is configured to enable the monitoring feature based on sensing the cardiac signal by enabling at least one of an atrioventricular block monitoring feature, a cardiac capture monitoring feature, an oversensing monitoring feature, or a cardiac event undersensing monitoring feature.
32. A medical device comprising:
a first sensing circuit configured to sense a first cardiac signal; and
a control circuit configured to:
determine a monitoring metric representative of activity of at least one heart chamber from the first cardiac signal;
determine that the monitoring metric meets expected rhythm criteria; and
enable a monitoring feature of the medical device that is based on processing and analysis of the first cardiac signal in response to the monitoring metric meeting the expected rhythm criteria.
33. The medical device of clause 32, wherein the control circuit is configured to:
set a first event monitoring threshold by:
determining the monitoring metric from the first cardiac signal sensed during a first time interval; and
determining the first event monitoring threshold based on the determined monitoring metric;
redetermine the monitoring metric from the first cardiac signal sensed during a second time interval after the first time interval; and
determine that the redetermined monitoring metric meets the expected rhythm criteria based on a comparison of the redetermined monitoring metric to the first event monitoring threshold.
34. The medical device of any of clauses 32-33, wherein the control circuit is configured to determine the monitoring metric by determining an integration metric of the first cardiac signal.
35. The medical device of clause 34, wherein the control circuit is further configured to determine an atrial rate; and determine the monitoring metric by normalizing the integration metric by the atrial rate.
36. The medical device of any of clauses 34-35, wherein the control circuit is configured to:
set a first event monitoring threshold by:
determining the integration metric from the first cardiac signal over each one of a plurality of integration time intervals occurring within a first time interval, where each one of the plurality of integration time intervals extends over a plurality of cardiac cycles; and
determining the first event monitoring threshold based on the integration metrics determined from the first cardiac signal sensed over the first time interval;
re-determine the integration metric from the first cardiac signal sensed over at least one integration time interval occurring during a second time interval after the first time interval;
determine that the re-determined integration metric is greater than the first event monitoring threshold; and
determine that the expected rhythm criteria are met in response to the re-determined integration metric being greater than the first event monitoring threshold.
37. The medical device of clause 36, wherein the control circuit is further configured to set the first event monitoring threshold by identifying a minimum integration metric from the integration metrics determined over each one of the plurality of integration time intervals occurring during the first time interval; and setting the event monitoring threshold based on the minimum integration metric.
38. The medical device of any of clauses 32-37, wherein the control circuit is configured to determine the monitoring metric by:
identifying a plurality of ventricular events from the first cardiac signal; and
determining the monitoring metric based on the identified plurality of ventricular events by determining at least one of: a ventricular event rate; an atrioventricular time interval; and a ratio of a count of the plurality of ventricular events to a count of atrial events occurring over a time interval comprising the identified plurality of ventricular events.

39. The medical device of clause 38, wherein the control circuit is configured to:
set an event monitoring threshold; and
identify the plurality of ventricular events from the first cardiac signal based on the first cardiac signal crossing the event monitoring threshold.

40. The medical device of clause 39, wherein the control circuit is configured to set the event monitoring threshold by:
setting a blanking interval in response to each of the plurality of atrial events
determining a maximum amplitude of the first cardiac signal outside the blanking interval; and
setting the event monitoring threshold based on the maximum amplitude.

41. The medical device of any of clauses 32-40, wherein the control circuit is configured to:
set a first event monitoring threshold;
determine the monitoring metric from the first cardiac signal sensed during a first time interval;
determine, based on the first event monitoring threshold, that the monitoring metric determined from the first cardiac signal sensed during the first time interval does not meet the expected rhythm criteria;
adjust the first event monitoring threshold to a second event monitoring threshold;
re-determine the monitoring metric from the first cardiac signal sensed during a second time interval after the first time interval;
determine, based on the second event monitoring threshold, that the re-determined monitoring metric determined from the first cardiac signal sensed during the second time interval meets the expected rhythm criteria; and
enable the monitoring feature of the medical device in response to the redetermined monitoring metric meeting the expected rhythm criteria.

42. The medical device of any of clauses 32-41, further comprising a second sensing circuit configured to sense a second cardiac signal different than the first cardiac signal, wherein the control circuit is configured to:
determine that the monitoring metric determined from the first cardiac signal does not meet the expected rhythm criteria;
determine a second monitoring metric from the second cardiac signal;
determine that the second monitoring metric meets the expected rhythm criteria; and
enable the monitoring feature of the medical device that is based on processing and analysis of the second cardiac signal in response to the second monitoring metric meeting the expected rhythm criteria.

43. The medical device of any of clauses 32-42, wherein:
the first sensing circuit comprises an accelerometer for sensing the first cardiac signal as an acceleration signal.

44. The medical device of any of clauses 32-42, wherein:
the first sensing circuit is configured to sense the first cardiac signal as a cardiac electrical signal; and
the control circuit is configured to:
set an event monitoring threshold by setting a far field R-wave detection threshold;
sense far field R-waves from the cardiac electrical signal; and
determine the event monitoring metric based on the sensed far field R-waves.

45. The medical device of any of clauses 32-44, further comprising:
a second sensing circuit configured to sense a second cardiac signal different than the first cardiac signal;
wherein the control circuit is configured to:
determine that the second cardiac signal meets second expected rhythm criteria; and
enable the monitoring feature of the medical device that is based on processing and analysis of the first cardiac signal and the second cardiac signal in response to the monitoring metric determined from the first cardiac signal meeting the expected rhythm criteria and the second cardiac signal meeting the second expected rhythm criteria.

46. The medical device of any of clauses 32-45, wherein the control circuit is configured to:
determine that the expected rhythm criteria are met by determining that the monitoring metric meets atrioventricular conduction criteria; and
enable the monitoring feature that is based on processing and analysis of the cardiac signal by enabling an atrioventricular block monitoring feature.

47. The medical device of any of clauses 32-45, wherein the control circuit is configured to enable the monitoring feature by enabling one of a cardiac capture monitoring feature, an oversensing monitoring feature, and a cardiac event undersensing monitoring feature.

48. A method, comprising:
sensing a first cardiac signal
determining a monitoring metric representative of activity of at least one heart chamber from the first cardiac signal;
determine that the monitoring metric meets expected rhythm criteria; and
enabling a monitoring feature of the medical device that is based on processing and analysis of the first cardiac signal in response to the monitoring metric meeting the expected rhythm criteria.

49. The method of clause 48, comprising:
setting a first event monitoring threshold by:
determining the monitoring metric from the first cardiac signal sensed during a first time interval; and
determining the first event monitoring threshold based on the determined monitoring metric;
redetermining the monitoring metric from the first cardiac signal sensed during a second time interval after the first time interval; and
determining that the redetermined monitoring metric meets the expected rhythm criteria based on a comparison of the redetermined monitoring metric to the first event monitoring threshold.

50. The method of any of clauses 48-49, wherein determining the monitoring metric comprises determining an integration metric of the first cardiac signal.

51. The method of clause 50, further comprising determining an atrial rate; and determining the monitoring metric by normalizing the integration metric by the atrial rate.

52. The method of any of clauses 50-51, further comprising:
setting a first event monitoring threshold by:
determining the integration metric from the first cardiac signal over each one of a plurality of integration time intervals occurring within a first time interval, where each one of the plurality of integration time intervals extends over a plurality of cardiac cycles; and determining the first event monitoring threshold based on the integration metrics determined from the first cardiac signal sensed during the first time interval;

re-determining the integration metric from the first cardiac signal sensed over at least one integration time interval occurring during a second time interval after the first time interval;

determining that the re-determined integration metric is greater than the first event monitoring threshold; and determining that the expected rhythm criteria are met in response to the re-determined integration metric being greater than the first event monitoring threshold.

53. The method of clause 52, where setting the first event monitoring threshold further comprises:

identifying a minimum integration metric from the integration metrics determined over each one of the plurality of integration time intervals occurring during the first time interval; and setting the event monitoring threshold based on the minimum integration metric.

54. The method of any of clauses 48-53, wherein determining the monitoring metric comprises:

identifying a plurality of ventricular events from the first cardiac signal; and determining the monitoring metric based on the identified plurality of ventricular events by determining at least one of a ventricular event rate; an atrioventricular time interval; and a ratio of a count of the plurality of ventricular events to a count of atrial events occurring over a time interval comprising the identified plurality of ventricular events.

55. The method of clause 54, further comprising setting an event monitoring threshold; and identifying the plurality of ventricular events from the first cardiac signal based on the first cardiac signal crossing the event monitoring threshold.

56. The method of clause 55, wherein setting the event monitoring threshold comprises:

setting a blanking interval in response to each of the plurality of atrial events determining a maximum amplitude of the first cardiac signal outside the blanking interval; and setting the event monitoring threshold based on the maximum amplitude.

57. The method of any of clauses 48-56, further comprising:

setting a first event monitoring threshold;

determining the monitoring metric from the first cardiac signal sensed during a first time interval;

determining, based on the first event monitoring threshold, that the monitoring metric determined from the first cardiac signal sensed during the first time interval does not meet the expected rhythm criteria;

adjusting the first event monitoring threshold to a second event monitoring threshold;

re-determining the monitoring metric from the first cardiac signal sensed during a second time interval after the first time interval;

determining, based on the second event monitoring threshold, that the re-determined monitoring metric determined from the first cardiac signal sensed during the second time interval meets the expected rhythm criteria; and enabling the monitoring feature of the medical device in response to the redetermined monitoring metric meeting the expected rhythm criteria.

58. The method of any of clauses 48-57, further comprising:

determining that the monitoring metric determined from the first cardiac signal does not meet the expected rhythm criteria;

sensing a second cardiac signal different than the first cardiac signal;

determining a second monitoring metric from the second cardiac signal;

determining that the second monitoring metric meets the expected rhythm criteria; and enabling the monitoring feature of the medical device that is based on processing and analysis of the second cardiac signal in response to the second monitoring metric meeting the expected rhythm criteria.

59. The method of any of clauses 48-58, comprising sensing the first cardiac signal as an acceleration signal.

60. The method of any of clauses 48-58, comprising:

sensing the first cardiac signal as a cardiac electrical signal;

setting a far field R-wave detection threshold;

sensing far field R-waves from the cardiac electrical signal based on the far field R-wave detection threshold; and determining the event monitoring metric based on the sensed far field R-waves.

61. The method of any of clauses 48-60, further comprising:

sensing a second cardiac signal different than the first cardiac signal;

determining that the second cardiac signal meets second expected rhythm criteria; and enabling the monitoring feature of the medical device that is based on processing and analysis of the first cardiac signal and the second cardiac signal in response to the monitoring metric determined from the first cardiac signal meeting the expected rhythm criteria and the second cardiac signal meeting second expected rhythm criteria.

62. The method of any of clauses 48-61 wherein:

determining that the expected rhythm criteria are met comprises determining that the monitoring metric meets atrioventricular conduction criteria; and enabling the monitoring feature that is based on processing and analysis of the cardiac signal comprises enabling an atrioventricular block monitoring feature.

63. The method of any of clauses 48-61, comprising enabling the monitoring feature by enabling one of a cardiac capture monitoring feature, an oversensing monitoring feature, and a cardiac event undersensing monitoring feature.

64. A non-transitory, computer-readable storage medium comprising a set of instructions which, when executed by a control circuit of a medical device, cause the medical device to:

sense a cardiac signal determine a monitoring metric representative of activity of at least one heart chamber from the cardiac signal;

determine that the monitoring metric meets expected rhythm criteria; and enable a monitoring feature of the medical device that is based on processing and analysis of the first cardiac signal in response to the monitoring metric meeting the expected rhythm criteria.

The details of one or more aspects of the disclosure are set forth in the accompanying drawings and the description below. Other features, objects, and advantages of the techniques described in this disclosure will be apparent from the description and drawings, and from the claims.

DETAILED DESCRIPTION

Figure 1:
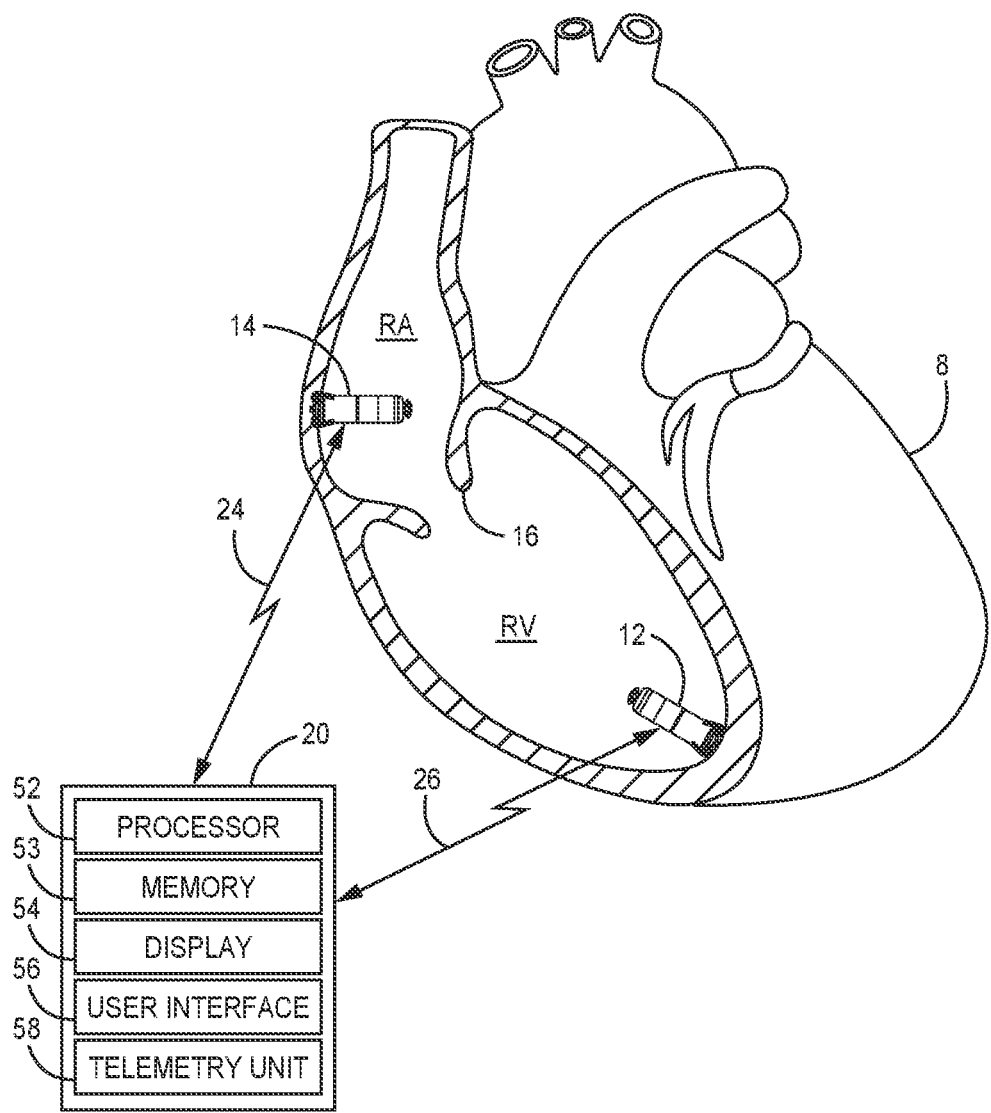
FIG. 1 is a conceptual diagram illustrating an implantable medical device (IMD) system that may be used to sense cardiac electrical signals and cardiac mechanical signals induced by cardiac motion and flowing blood and provide pacing therapy to a patient's heart.

In general, this disclosure describes a medical device and techniques for determining that a cardiac signal sensed by the medical device is reliable for use in association with a monitoring feature of the medical device. Based on a determination that a monitoring metric determined from the sensed cardiac signal meets expected rhythm criteria, the medical device may enable a monitoring feature that utilizes the cardiac signal. In general, the monitoring metric is a value determined from at least one sensed cardiac signal that is representative of heart chamber activity in a far field heart chamber, a near field heart chamber or a combination of both. The far field heart chamber is a heart chamber that is remote from the heart chamber where the cardiac signal is being sensed. The near field heart chamber is the heart chamber where the sensor or electrodes sensing the cardiac signal are located. As an example, if the sensor sensing a cardiac signal is located in a ventricle, the near field chamber is the ventricle and the far field chamber can be the atrium.

The monitoring metric determined from the cardiac signal sensed in one heart chamber may be correlated to the atrial rate, correlated to the ventricular rate, or correlated to a ratio, difference, or other combination of both atrial and ventricular rates or the relative timing of atrial and ventricular activity as examples. The monitoring metric may be representative of activity of at least one heart chamber and may be determined by processing and analysis of at least one sensed cardiac signal to determine if the sensed cardiac signal, e.g., a feature or characteristic(s) of at least one sensed cardiac signal, meets expected heart rhythm criteria. For example, a monitoring metric may be an integration metric of a cardiac mechanical signal representative of heart motion such that the monitoring metric is representative of the ventricular rate over an integration time interval. In other examples, the monitoring metric may be a count or rate of ventricular event signals attendant to ventricular myocardial depolarizations or ventricular contractions. The monitoring metric may be ratio of the count or rate of ventricular event signals to a count or rate of atrial event signals (sensed or paced) over a corresponding time interval. In other examples, the monitoring metric may be a measure of an atrioventricular time interval or the variability thereof. The atrioventricular time interval may be determined as the time from an atrial event (sensed or paced) to the following ventricular event sensed from a cardiac signal based on a cardiac signal feature. In each of these examples, the monitoring metric may be representative of the rate, regularity and/or synchrony of the atrial and/or ventricular rates, which may be useful in monitoring for an expected cardiac rhythm, an abnormal or unexpected rhythm, or a cardiac event sensing issue.

A medical device monitoring feature that is based on processing and analysis of the sensed cardiac signal may be enabled in association with sensing the cardiac signal and determining the monitoring metric from the sensed cardiac signal when the monitoring metric meets expected rhythm criteria. The monitoring feature may be a heart rate monitoring feature, a heart rhythm monitoring feature such as detection of bradycardia, tachyarrhythmia or premature contractions, or a conduction abnormality monitoring feature such as an atrioventricular (AV) block monitoring feature. In other examples, the monitoring feature may relate to performance of the medical device such as pacing capture monitoring or oversensing and/or undersensing monitoring, e.g., for detecting over- or under-sensing of a cardiac event sensed from another cardiac signal.

The medical device may be configured to deliver or adjust a therapy, e.g., a pacing therapy, based on a condition detected by the monitoring feature. In other examples, the medical device may be configured to generate an output in response to the monitoring feature detecting a cardiac condition, with or without altering other cardiac signal sensing and/or therapy delivery functions.

FIG. 1 is a conceptual diagram illustrating an implantable medical device (IMD) system 10 that may be used to sense cardiac signals and perform at least one monitoring function. IMD system 10 is shown including a pacemaker 14, shown implanted within an atrial chamber in FIG. 1. Pacemaker 14 may be a transcatheter leadless pacemaker which is implantable wholly within a heart chamber, e.g., wholly within the right atrium (RA) of heart 8 for sensing cardiac signals and delivering atrial pacing pulses from within the atrium. Pacemaker 14 is shown positioned in the RA, e.g., along the lateral endocardial wall though other locations are possible within or on the RA different than the location shown. IMD system 10 may additionally or alternatively include pacemaker 12 implanted in the right ventricle (RV). Pacemaker 12 may also be a transcatheter leadless pacemaker, which may be wholly implantable within a ventricular heart chamber for sensing cardiac signals and delivering ventricular pacing pulses. Pacemakers 12 and 14 may be reduced in size compared to subcutaneously implanted pacemakers and may be generally cylindrical in shape to enable transvenous implantation via a delivery catheter. The techniques disclosed herein are not limited to a particular pacemaker location and may be implemented in an implantable medical device implanted in a variety of locations and configured to sense cardiac signals for performing at least one monitoring function.

Pacemakers 12 and 14 may include housing-based electrodes for sensing cardiac electrical signals and delivering pacing pulses. Pacemaker 14 may include cardiac electrical signal sensing circuitry configured to sense atrial P-waves attendant to the depolarization of the atrial myocardium and a pulse generator for generating and delivering an atrial pacing pulse in the absence of a sensed atrial P-wave. In some examples, the cardiac electrical signal sensing circuitry of pacemaker 14 may be configured to sense far-field R-waves (FFRWs) associated with the depolarization of the ventricular myocardium from the cardiac electrical signal sensed from within the RA using the housing-based electrodes. Pacemaker 12 may include cardiac electrical signal sensing circuitry configured to sense ventricular R-waves and, in some examples, far-field P-waves from within the RV using the housing-based electrodes.

Pacemakers 12 and/or 14 are configured to sense a cardiac electrical signal and a cardiac mechanical signal in some examples. The mechanical signal may be a motion signal sensed by a motion sensor, e.g., an accelerometer, enclosed within or on the housing of the pacemaker 12 or 14. Cardiac mechanical event signals, e.g., corresponding to atrial contraction and/or relaxation, ventricular contraction and/or relaxation, and/or opening/closure of the heart valves associated with atrial and ventricular contraction and relaxation cycles, may be present in a motion signal produced by a motion sensor implanted within a heart chamber. For example, ventricular mechanical event signals may be present in an intra-atrial cardiac mechanical signal sensed by pacemaker 14 in addition to atrial mechanical event signals corresponding to atrial contraction. Atrial mechanical event signals may be present in an intra-ventricular cardiac mechanical signal sensed by pacemaker 12 in addition to ventricular mechanical event signals.

A motion signal produced by an accelerometer implanted within a heart chamber, which may be referred to as an "intra-cardiac motion signal," may include motion signals caused by ventricular and atrial mechanical events as indicated above. For example, acceleration of blood due to closure of the tricuspid valve 16 between the RA and RV, the mitral valve between the left atrium and the left ventricle, opening and closure of the semilunar valves (aortic and pulmonic) and the heart motion due to ventricular contraction and relaxation may produce ventricular event signals in an intra-atrial cardiac motion signal. In other examples, pacemakers 12 and 14 may include other types of sensors for sensing a cardiac signal such as a pressure sensor, a flow sensor, an oxygen saturation sensor or other sensor capable of generating a signal that includes event signals corresponding to the mechanical contraction and/or relaxation of the ventricles and/or atria and/or valve opening and closing.

Pacemakers 12 and 14 may be configured to use the electrical and/or mechanical signals to perform one or more cardiac monitoring functions. For example, pacemaker 14 may be configured to monitor for AV block or ventricular pauses. A ventricular pause may be defined as a lack of ventricular depolarizations for a time interval of more than two seconds, more than three seconds, more than four seconds or another predetermined threshold time interval. Pacemaker 14 may determine monitoring metrics as ventricular event metrics from a cardiac signal sensed from within the RA and determine if the ventricular event metrics meet expected rhythm criteria during known AV conduction. In this case the expected rhythm criteria are AV conduction criteria. When the expected AV conduction criteria are met by the monitoring metric(s) determined from the sensed cardiac signal, an AV block monitoring feature of pacemaker 14 may be enabled. Pacemaker 14 may determine monitoring metrics as ventricular event metrics from a cardiac signal sensed from within the RA and determine if the ventricular event metrics meet AV block (or ventricular pause) detection criteria during known AV conduction and/or when the monitoring feature is enabled. A patient implanted with an atrial pacemaker, such as pacemaker 14 without ventricular pacing capabilities or with ventricular pacing capabilities disabled, may be treated for SA node dysfunction but may develop AV node dysfunction or other conduction abnormalities over time. As such, ambulatory AV block monitoring by pacemaker 14 may provide important information for determining when a patient may need ventricular pacing or dual chamber pacing to provide necessary ventricular pacing support in addition to atrial pacing.

As described below, in performing AV block monitoring, pacemaker 14 may be configured to determine a monitoring metric from a sensed cardiac signal that is correlated to the occurrence of ventricular events. The cardiac signal may be sensed from an atrial chamber. In some instances, however, ventricular event signals may be undersensed or oversensed or even be absent from a cardiac signal that is sensed from an atrial chamber. As disclosed herein, pacemaker 14 is configured to determine whether a cardiac signal that is to be used for a monitoring feature meets criteria, e.g., expected rhythm criteria, for enabling the monitoring feature prior to using the cardiac signal for monitoring for a particular abnormal cardiac rhythm or condition. The monitoring feature may be an ambulatory monitoring feature that is enabled to operate indefinitely or for relatively long periods of time such as several hours, several days, several weeks or several months.

In some cases, a cardiac signal sensed from one chamber, e.g., atrial or ventricular, may be analyzed to determine if the signal meets criteria for enabling a monitoring feature that monitors for a rhythm or condition of a different heart chamber, e.g., ventricular or atrial. Such monitoring may be referred to as far-field monitoring since the cardiac signal sensed in one chamber is being processed and analyzed for monitoring events or activity of a different heart chamber.

In the example of AV block monitoring, pacemaker 14 may be configured to verify that a cardiac signal sensed from the atrium meets AV conduction criteria before enabling AV block monitoring. If the cardiac signal does not meet AV conduction criteria during a known or expected AV conduction rhythm, pacemaker 14 may determine that the cardiac signal is not reliable for detecting AV block should it occur at a later time. Pacemaker 14 may determine that expected rhythm criteria corresponding to AV conduction are not met based on a ventricular event metric determined from the sensed cardiac signal and, in this situation, determine that AV block monitoring should not be enabled. When the expected AV conduction rhythm criteria are met, however, pacemaker 14 may enable AV block monitoring using the selected cardiac signal. In some examples, the cardiac signal sensed from the atrium is a motion signal, e.g., an acceleration signal. Far field ventricular event signals may be present in the motion signal sensed from within the atrium and are useful for detecting AV block without requiring a sensor in or on the ventricles of the patient's heart for sensing ventricular events. In a patient with initially normal AV conduction requiring only an atrial pacemaker such as pacemaker 14, far field monitoring of ventricular events enables detection of AV block without requiring additional sensors, electrodes or medical devices for determining when ventricular pacing support is needed.

In other examples, a cardiac electrical signal sensed from the RA may be used by pacemaker 14 for monitoring for AV block. Atrial P-waves and, at least in some cases, far field ventricular R-waves may be sensed using electrodes carried by pacemaker 14. Pacemaker 14 may be configured to determine a ventricular event metric from the atrial electrical signal that is correlated to the FFRWs present in the atrial electrical signal. As disclosed herein, the pacemaker 14 may be configured to determine that the cardiac electrical signal sensed from the atrial chamber meets AV conduction criteria when the patient is known or expected to be in an AV conducted rhythm. When the atrial electrical signal does meet the AV conduction criteria, pacemaker 14 may enable AV block monitoring using the atrial electrical signal and otherwise disable AV block monitoring using the atrial electrical signal.

AV block monitoring is one example of a monitoring feature that pacemaker 14 may be configured to enable or disable using the techniques disclosed herein including determining that a sensed cardiac signal meets expected rhythm criteria (or not). The techniques disclosed herein may be implemented for enabling and disabling other monitoring features that use a sensed cardiac signal to detect a cardiac rhythm or condition. A monitoring feature may be enabled or disabled based on whether the sensed cardiac signal meets expected rhythm criteria when the condition or abnormal rhythm being monitored for is known not to be present. When processing and analysis of the cardiac signal is determined to meet expected rhythm criteria when the condition or abnormal rhythm is not present, the signal is deemed reliable for monitoring for the condition or abnormal rhythm. Other monitoring features may include pacing capture monitoring, monitoring for evidence of oversensing and/or undersensing of cardiac events from another cardiac signal or by another medical device, and monitoring the cardiac event rate or rhythm as examples.

For instance, according to the techniques disclosed herein a monitoring feature for detecting loss of capture may be enabled by the medical device, e.g., pacemaker 12 or 14, when the cardiac signal meets capture detection criteria (or conversely does not meet loss of capture detection criteria) when capture is known to occur. If capture detection criteria are not met by the cardiac signal when capture is known to occur, the loss of capture monitoring feature that is based on processing and analysis of the cardiac signal may be disabled. In another example, when a cardiac signal sensed by the medical device meets AV conduction criteria (or conversely does not meet AV block detection criteria) when AV conduction is known to be present, AV block monitoring that is based on processing and analysis of the cardiac signal may be enabled. If the cardiac signal does not meet AV conduction criteria when AV conduction is known to be present, the AV block monitoring that is based on processing and analysis of the cardiac signal may be disabled by the medical device. In yet another example, when a cardiac signal, e.g., a motion signal, sensed by the medical device meets normal sinus rate criteria when a normal sinus rate is known to be present, monitoring for oversensing on a second sensed cardiac signal, e.g., a cardiac electrical signal, may be enabled based on processing and analysis of the first cardiac signal. If the first cardiac signal does not meet normal sinus rate criteria when a normal sinus rate is known to be present, the oversensing monitoring of a second sensed cardiac signal that is based on processing and analysis of the first cardiac signal may be disabled by the medical device.

Pacemakers 12 and 14 may be capable of bidirectional wireless communication with an external device 20 for programming the sensing and pacing control parameters, which may include control parameters used for monitoring cardiac motion from the motion sensor signal. Aspects of external device 20 may generally correspond to the external programming/monitoring unit disclosed in U.S. Pat. No. 5,507,782 (Kieval, et al.), hereby incorporated herein by reference in its entirety. External device 20 is often referred to as a "programmer" because it is typically used by a physician, technician, nurse, clinician or other qualified user for programming operating parameters in pacemaker 12 or pacemaker 14. External device 20 may be located in a clinic, hospital or other medical facility. External device 20 may alternatively be embodied as a home monitor or a handheld device that may be used in a medical facility, in the patient's home, or another location. Operating parameters, including sensing and therapy delivery control parameters, may be programmed into pacemaker 12 or pacemaker 14 by a user interacting with external device 20.

External device 20 may include a processor 52, memory 53, display unit 54, user interface 56 and telemetry unit 58. Processor 52 controls external device operations and processes data and signals received from pacemaker 12 or 14. Display unit 54 may generate a display, which may include a graphical user interface, of data and information relating to pacemaker functions to a user for reviewing pacemaker operation and programmed parameters as well as cardiac electrical signals, cardiac motion signals or other physiological data that may be acquired by pacemaker 12 and pacemaker 14 and transmitted to external device 20 during an interrogation session. For example, pacemaker 12 or 14 may generate an output for transmission to external device 20 including cardiac event monitoring metrics or relating data, notifications associated with a monitoring feature, e.g., AV block notifications, and/or other data or notifications. Transmitted data may include an episode of a cardiac electrical signal produced by pacemaker sensing circuitry and/or an episode of a cardiac mechanical signal, e.g., a motion signal produced by a motion sensor included in pacemaker 12 or 14.

User interface 56 may include a mouse, touch screen, keypad or the like to enable a user to interact with external device 20 to initiate a telemetry session with pacemaker 12 or 14 for retrieving data from and/or transmitting data to the pacemaker 12 or 14, including programmable parameters for controlling cardiac event sensing and therapy delivery. Telemetry unit 58 includes a transceiver and antenna configured for bidirectional communication with a telemetry circuit included in pacemakers 12 and 14 and is configured to operate in conjunction with processor 52 for sending and receiving data relating to pacemaker functions via communication link 24 and communication link 26. Telemetry unit 58 may establish a wireless bidirectional communication link 24 or 26 with pacemaker 14 or 12, respectively. Communication link 24 may be established using a radio frequency (RF) link such as BLUETOOTH®, Wi-Fi, Medical Implant Communication Service (MICS) or other communication bandwidth. In some examples, external device 20 may include a programming head that is placed proximate pacemaker 12 or 14 to establish and maintain a communication link 24, and in other examples external device 20 and pacemakers 12 and 14 may be configured to communicate using a distance telemetry algorithm and circuitry that does not require the use of a programming head and does not require user intervention to maintain a communication link.

It is contemplated that external device 20 may be in wired or wireless connection to a communications network via a telemetry circuit that includes a transceiver and antenna or via a hardwired communication line for transferring data to a centralized database or computer to allow remote management of the patient. Remote patient management systems including a centralized patient database may be configured to utilize the presently disclosed techniques to enable a clinician to be notified when criteria for enabling a monitoring feature are met and in some cases for notifying the clinician when a condition is detected by the monitoring feature, e.g., when AV block monitoring is enabled and when AV block is detected by pacemaker 14. Review of cardiac event monitoring metrics, heart rate and/or rhythm determinations, cardiac signal episodes and marker channel data may be performed remotely by a clinician who may authorize programming of sensing and therapy control parameters in pacemaker 12 and/or 14 and/or enabling or disabling of a monitoring feature, e.g., after viewing a visual representation of data transmitted from pacemaker 12 and/or 14.

Figure 2:
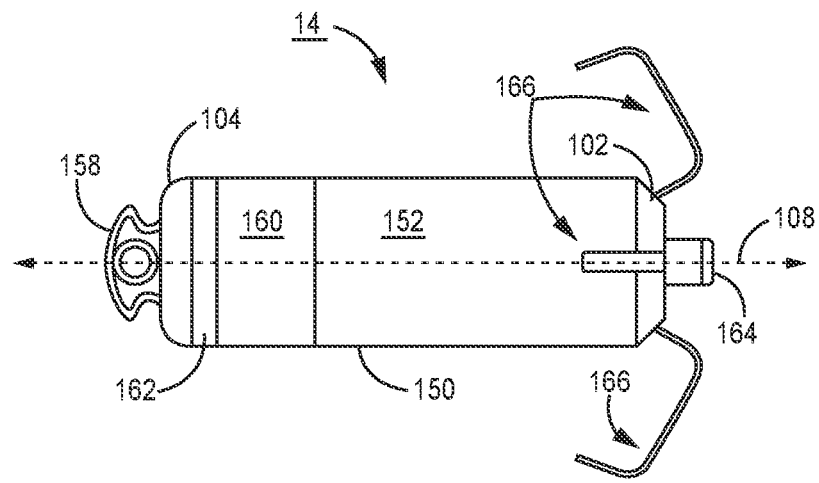
FIG. 2 is a conceptual diagram of the intracardiac pacemaker shown in FIG. 1.

FIG. 2 is a conceptual diagram of a transcatheter leadless pacemaker according to one example. The pacemaker shown in FIG. 2 may correspond to pacemaker 14 of FIG. 1, configured for implantation in or on an atrial chamber. Features of pacemaker 14 described in conjunction with FIG. 2, however, may generally correspond to features included in a pacemaker deployable at other cardiac locations, such as pacemaker 12 shown in the RV in FIG. 1. Pacemaker 14 includes electrodes 162 and 164 spaced apart along the housing 150 of pacemaker 14 for sensing cardiac electrical signals and delivering pacing pulses. Electrode 164 is shown as a tip electrode extending from a distal end 102 of pacemaker 14, and electrode 162 is shown as a ring electrode along a mid-portion of housing 150, for example adjacent proximal end 104. Distal end 102 is referred to as "distal" in that it is expected to be the leading end as pacemaker 14 is advanced through a delivery tool, such as a catheter, and placed against a targeted pacing site.

Electrodes 162 and 164 form an anode and cathode pair for bipolar cardiac pacing and sensing. In alternative embodiments, pacemaker 14 may include two or more ring electrodes, two tip electrodes, and/or other types of electrodes exposed along pacemaker housing 150 for delivering electrical stimulation to heart 8 and sensing cardiac electrical signals. Electrodes 162 and 164 may be, without limitation, titanium, platinum, iridium or alloys thereof and may include a low polarizing coating, such as titanium nitride, iridium oxide, ruthenium oxide, platinum black, among others. Electrodes 162 and 164 may be positioned at locations along pacemaker 14 other than the locations shown.

Housing 150 is formed from a biocompatible material, such as a stainless steel or titanium alloy. In some examples, the housing 150 may include an insulating coating. Examples of insulating coatings include parylene, urethane, PEEK, or polyimide, among others. The entirety of the housing 150 may be insulated, but only electrodes 162 and 164 uninsulated. Electrode 164 may serve as a cathode electrode and be coupled to internal circuitry, e.g., a pacing pulse generator and cardiac electrical signal sensing circuitry, enclosed by housing 150 via an electrical feedthrough crossing housing 150. Electrode 162 may be formed as a conductive portion of housing 150 defining a ring electrode that is electrically isolated from the other portions of the housing 150 as generally shown in FIG. 2, e.g., circumscribing a lateral sidewall of the housing 150. In other examples, the entire periphery of the housing 150 may function as an electrode that is electrically isolated from tip electrode 164, instead of providing a localized ring electrode such as electrode 162. Electrode 162 formed along an electrically conductive portion of housing 150 serves as a return anode during pacing and sensing.

The housing 150 may include a control electronics subassembly 152 and a battery subassembly 160, which provides power to the control electronics subassembly 152. Control electronics subassembly 152 houses the electronics for sensing cardiac signals, producing pacing pulses and controlling therapy delivery and other functions of pacemaker 14 as described herein. A motion sensor implemented as an accelerometer may be enclosed within housing 150 in some examples. The accelerometer provides a signal to a processor included in control electronics subassembly 152 for signal processing and analysis for determining a cardiac event monitoring metric for use by a monitoring feature of pacemaker 14 in some examples.

The accelerometer may be a multi-axis or multi-dimensional accelerometer where each axis of the accelerometer generates an acceleration signal in a different dimension. In some examples, the accelerometer may have one "longitudinal" axis that is parallel to or aligned with the longitudinal axis 108 of pacemaker 14 and two orthogonal axes that extend in radial directions relative to the longitudinal axis 108. Practice of the techniques disclosed herein, however, are not limited to a particular orientation of the accelerometer within or along housing 150 or a particular number of axes. In other examples, a one-dimensional accelerometer may be used to obtain a cardiac motion signal from which a cardiac event monitoring metric may be determined. In still other examples, a two dimensional accelerometer or other multi-dimensional accelerometer may be used. Each axis of a single or multi-dimensional accelerometer may be defined by a piezoelectric element, micro-electrical mechanical system (MEMS) device or other sensor element capable of producing an electrical signal in response to changes in acceleration imparted on the sensor element, e.g., by converting the acceleration to a force or displacement that is converted to the electrical signal. In a multi-dimensional accelerometer, the sensor elements may be arranged orthogonally with each sensor element axis orthogonal relative to the other sensor element axes. Orthogonal arrangement of the elements of a multi-axis accelerometer, however, is not necessarily required.

Each sensor element or axis may produce an acceleration signal corresponding to a vector aligned with the axis of the sensor element. A vector signal of a multi-dimensional accelerometer (also referred to herein as a "multi-axis" accelerometer) for use in monitoring cardiac motion may be selected as a single axis signal or a combination of two or more axis signals. For example, one, two or all three axis signals produced by a three-dimensional accelerometer may be selected for processing and analysis for use in monitoring cardiac motion by pacemaker 14.

Pacemaker 14 may include features for facilitating deployment and fixation of pacemaker 14 at an implant site. For example, pacemaker 14 may include a set of fixation tines 166 to secure pacemaker 14 to patient tissue, e.g., by actively engaging with the atrial endocardium and/or interacting with the atrial pectinate muscle. Fixation tines 166 are configured to anchor pacemaker 14 to position electrode 164 in operative proximity to a targeted tissue for delivering therapeutic electrical stimulation pulses. Numerous types of active and/or passive fixation members may be employed for anchoring or stabilizing pacemaker 14 in an implant position. A pacemaker configured for implantation in a ventricular chamber, such as pacemaker 12 shown in FIG. 1, may include a fixation member, which may include multiple fixation tines, configured for fixation in the ventricular endocardium or interacting with the ventricular trabeculae. Pacemaker 14 may optionally include a delivery tool interface 158. Delivery tool interface 158 may be located at the proximal end 104 of pacemaker 14 and is configured to connect to a delivery device, such as a catheter, used to position pacemaker 14 at an implant location during an implantation procedure, for example within a heart chamber.

Figure 3:
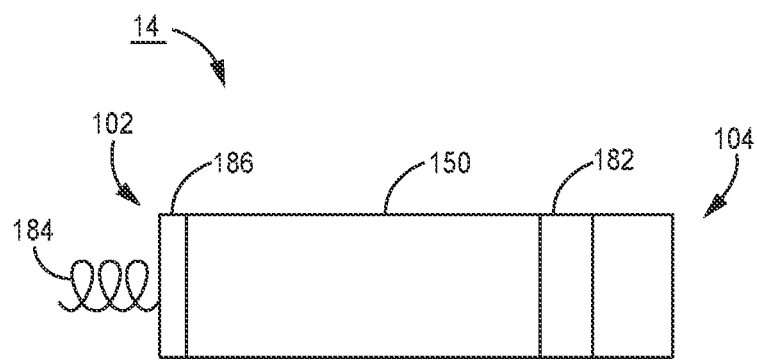
FIG. 3 is a conceptual diagram of the intracardiac pacemaker of FIG. 1 according to another example.

FIG. 3 is a conceptual diagram of atrial intracardiac pacemaker 14 according to another example. In FIG. 2, the cathode tip electrode 164 is shown as a button or hemispherical type electrode that may make contact with the atrial endocardial tissue when distal end 102 is anchored at an implant site by fixation tines 166. In the example of FIG. 3, the cathode tip electrode 184 is shown as a screw-in helical electrode which may provide fixation of pacemaker 14 at the implant site as well as serving as a pacing/sensing electrode. In the example of FIG. 3, pacemaker 14 may be configured to provide dual chamber pacing when electrode 184 is advanced from within the right atrial chamber to a His bundle pacing location or ventricular septal pacing location.

In this case, tip electrode 184 and return anode electrode 182 may be used for pacing the ventricles, e.g., via the His bundle when AV block is detected by pacemaker 14. A second cathode electrode 186 may be provided for providing atrial pacing and sensing in combination with the return anode 182, for example. Pacemaker 14 may include two or more electrodes which may be ring electrodes, helical electrodes, hook electrodes, button electrodes, hemispherical electrodes or other types of electrodes arranged along housing 150 for providing at least atrial sensing and pacing (which may include far field R-wave sensing from the atrial signal) and may further provide ventricular electrical signal sensing (e.g., R-wave sensing) and ventricular pacing, e.g., via the His bundle, in some examples. Examples of various electrode arrangements that may be included in a pacemaker that may be configured to perform cardiac monitoring techniques as disclosed herein are generally disclosed in U.S. Publication No. 2019/0083779 (Yang, et al.), incorporated herein by reference in its entirety.

Figure 4:
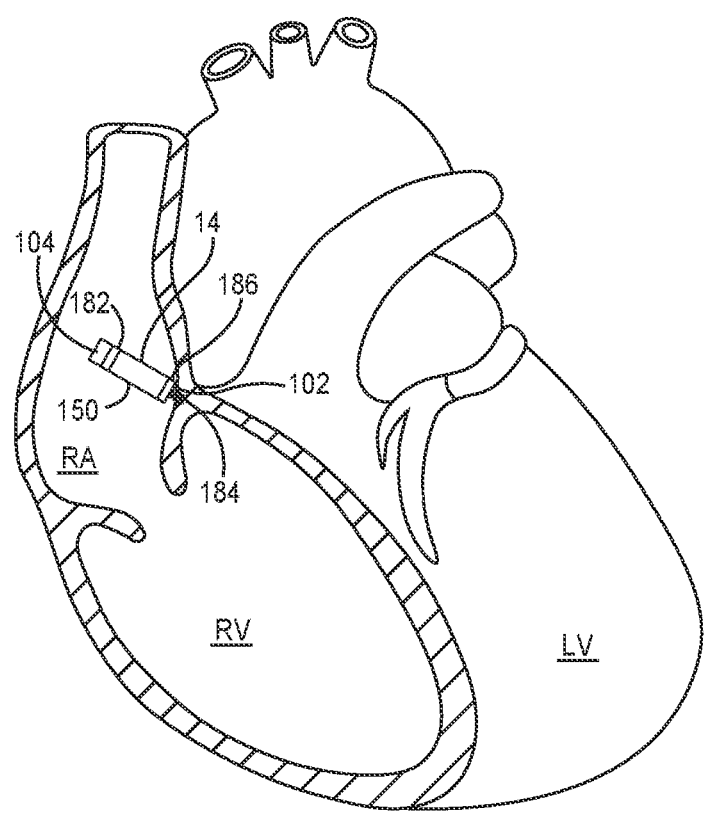
FIG. 4 is a diagram of the pacemaker of FIG. 3 shown implanted in the right atrium at an implant site for providing dual chamber pacing and sensing according to one example.

FIG. 4 is conceptual diagram of the pacemaker 14 of FIG. 3 shown implanted in the RA at an implant site for providing dual chamber pacing and sensing according to one example. The distal end 102 of pacemaker 14 may be positioned at the inferior end of the interatrial septum, beneath the AV node and near the tricuspid valve annulus to position tip electrode 184 for advancement into the interatrial septum toward the His bundle. Ring electrode 182 spaced proximally from tip electrode 184 may be used as the return electrode with the cathode tip electrode 184 for pacing the right and left ventricles via the His-Purkinje system. The distal ring electrode 186 may be used in combination with the proximal ring electrode 182 for sensing atrial P-waves and delivering atrial pacing pulses. In this position, a motion sensor included in pacemaker 14 may produce a signal including ventricular event signals. Pacemaker 14 may be configured to detect or confirm AV block based on the motion signal produced by the motion sensor. Pacemaker 14 may be configured to respond to detecting AV block by delivering ventricular pacing pulses via electrode 184 to provide ventricular rate support.

Figure 5:
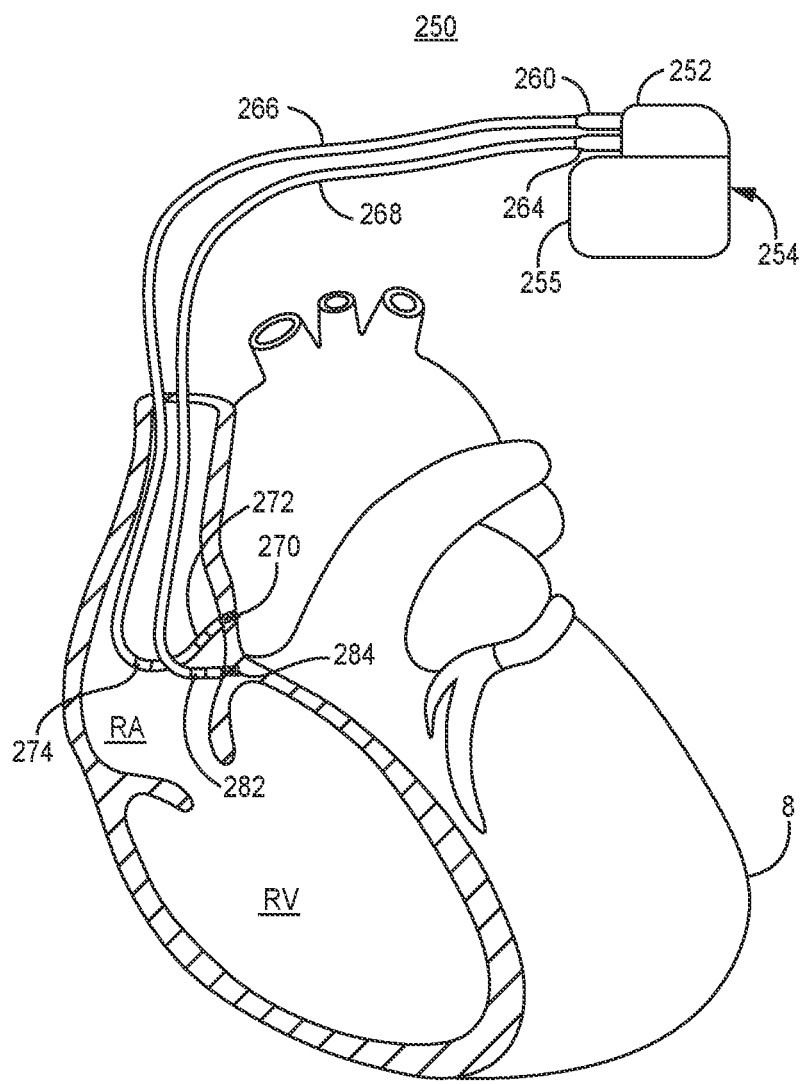
FIG. 5 is a conceptual diagram of a medical device system capable of pacing a patient's heart and sensing cardiac electrical signals and cardiac motion signals according to another example.

FIG. 5 is a conceptual diagram of a medical device system 250 capable of pacing a patient's heart 8 and sensing cardiac electrical signals and cardiac motion signals according to another example. Techniques disclosed herein are not limited to a leadless medical device that includes electrodes on the medical device housing as shown by the examples given above. The system 250 includes a pacemaker 254 coupled to a patient's heart 8 via at least one transvenous medical electrical lead 266 and/or lead 268. Pacemaker 254 is shown as a dual chamber device capable of sensing cardiac signals in an atrial chamber and delivering cardiac pacing pulses in the atrial chamber. Ventricular pacing pulses may be delivered using an electrode 284 advanced from the RA to a His bundle pacing location. In other examples, pacemaker 254 may be configured as a single chamber device, e.g., coupled to only a signal lead 266 extending into the RA for RA sensing and pacing. Pacemaker housing 255 encloses internal circuitry corresponding to the various circuits and components, for example as described in conjunction with FIG. 6 below, for sensing cardiac electrical signals from heart 8, sensing cardiac motion signals, and controlling electrical stimulation therapy, e.g., pacing therapy, delivered by pacemaker 254.

Pacemaker 254 includes a connector block 252 that may be configured to receive the proximal ends of an atrial pacing and sensing lead 266, referred to hereafter as "atrial lead" 266, and/or a ventricular pacing and sensing lead 268, referred to hereafter as "ventricular lead" 268. Each of leads 266 and 268 are advanced transvenously for positioning electrodes for sensing and stimulation of the atria and the ventricles, respectively. Atrial lead 266 may be positioned such that its distal end is in the vicinity of the right atrium (RA) and the superior vena cava. Atrial lead 266 is equipped with pacing and sensing electrodes, shown as a tip electrode 270 and a ring electrode 272 spaced proximally from tip electrode 270. The electrodes 270 and 272 provide sensing and pacing in the RA and are each connected to a respective insulated conductor extending within the elongated body of atrial lead 266. Each insulated conductor is coupled at its proximal end to a connector carried by proximal lead connector 260, and thereby electrically coupled to internal pacemaker circuitry via connector block 252.

Atrial lead 266 may include a sensor for sensing a mechanical signal, e.g., an accelerometer 274, carried by the atrial lead body for positioning within the RA for sensing an intra-atrial signal for monitoring cardiac mechanical signals.

Accelerometer 274 may produce cardiac motion signals passed to circuitry enclosed by pacemaker housing 255 via an electrical conductor extending within the lead body to proximal connector 260. Accelerometer 274 generates motion signals which may include a ventricular event signal. The ventricular event signal may be detected by processing circuitry included in pacemaker 250. The cardiac motion signal sensed from within the RA may be used for determining cardiac event monitoring metrics, which may include ventricular event monitoring metrics for use by a monitoring feature of pacemaker 254 such as AV block monitoring. Pacemaker 254 may be a single chamber pacemaker coupled only to the atrial lead 266 for sensing cardiac electrical signals, sensing cardiac motion signals, and delivering atrial pacing pulses.

Ventricular lead 268, when included, may be advanced within the RA to position electrodes 282 and 284 for pacing and sensing in the vicinity of the His bundle from a right atrial approach, as shown. Ventricular lead tip electrode 284 may be a helical electrode that may be advanced into the inferior end of the interatrial septum, beneath the AV node and near the tricuspid valve annulus to position tip electrode 284 in or proximate to the His bundle. A ring electrode 282 spaced proximally from tip electrode 284 may be used as the return electrode with the cathode tip electrode 284 for pacing the right and left ventricles via the His-Purkinje system. While lead 268 is referred to herein as a ventricular pacing and sensing lead for delivering pacing pulses for pacing the ventricles, ventricular lead 268 may be referred to as a "His bundle pacing and sensing lead" when positioned for delivering pacing pulses to the ventricles via the His-Purkinje system from the right atrial approach.

The electrodes 282 and 284 are coupled to respective insulated conductors extending within the elongated body of ventricular lead 268, which provide electrical connection to the proximal lead connector 264 coupled to connector block 252, and electrical connection to circuitry enclosed by housing 255 is thereby achieved. Cardiac electrical signal sensing circuitry included in pacemaker 254 may receive a cardiac electrical signal from electrodes 282 and 284 of ventricular lead 268 for sensing ventricular R-waves.

While atrial lead 266 and ventricular lead 268 are each shown carrying two electrodes, it is recognized that each lead may carry one or more electrodes for providing one or more selectable pacing and/or sensing electrode vectors, which may include bipolar combinations of electrodes carried by the respective lead or unipolar combinations of an electrode carried by the respective lead and the pacemaker housing 255. Furthermore while atrial lead 266 is shown including accelerometer 274, it is understood that one or both of leads 266 and 268 may include a motion sensor such as accelerometer 274 for producing a cardiac motion signal due to acceleration forces imparted on accelerometer 274. Accelerometer 274 may be a single or multi-axis accelerometer as described above. Circuitry enclosed by housing 255 includes processing circuitry for determining cardiac event monitoring metrics from the acceleration signal produced by accelerometer 274 and/or from the cardiac electrical signal(s) sensed using any of the available electrodes.

In some examples, pacemaker 254 is configured as a dual-chamber pacemaker capable of sensing and pacing in the RA and sensing ventricular R-waves and delivering atrial synchronized ventricular pacing pulses, e.g., in atrial-tracking ventricular pacing modes. In other examples, pacemaker 254 may be coupled to a single lead advanced into the RA for sensing both atrial and ventricular FFRWs and delivering at least atrial pacing pulses. In still other examples, pacemaker 254 may be a single chamber pacing device coupled only to ventricular lead 268. In this case, accelerometer 274 may be carried by lead 268 for positioning within the RA for monitoring cardiac motion and in some cases for detecting AV block. Pacemaker 254 may be configured to detect AV block based on the signal received from accelerometer 274 for use in controlling ventricular pacing delivered via electrode 284, particularly when ventricular electrical signal sensing is compromised, e.g., due to noise or low signal strength. In some cases, pacemaker 254 may be configured for dual chamber sensing of both atrial electrical signals and ventricular electrical signals. Accelerometer-based cardiac motion monitoring may confirm or support AV block detection made based on electrical signals and/or provide for AV block detection when electrical signals are unreliable.

In response to detecting AV block, ventricular pulses may be delivered by pacemaker 254 to for at least maintaining a minimum ventricular rate and/or delivering atrial synchronized ventricular pacing. It is to be understood that in some examples, pacemaker 254 may be configured as an implantable cardioverter defibrillator capable of delivering both low voltage cardiac pacing therapies and high voltage cardioversion and defibrillation (CV/DF) shocks. In this case, Pacemaker 254 may be coupleable to at least one lead carrying at least one high voltage CV/DF electrode such as an elongated coil electrode.

While illustrative examples presented herein refer to AV block monitoring based on a cardiac motion signal or a cardiac electrical signal, it is to be understood that other monitoring features may utilize a signal from accelerometer 274 and/or a sensed cardiac electrical signal for other cardiac function, cardiac events or rhythm monitoring, which may include pacing capture monitoring or monitoring for oversensing/undersensing of cardiac event signals that are being sensed from a different cardiac signal as examples. Furthermore, while a cardiac electrical signal and a cardiac motion signal, particularly an acceleration signal, are referred to in the illustrative examples, other example sensors, e.g., any listed above, may be included in a medical device system performing the techniques disclosed herein for sensing a cardiac signal, determining a monitoring metric from the sensed cardiac signal, and determining to enable or disable a monitoring feature based on the monitoring metric.

The example medical devices and implant positions shown in FIGS. 1-5 relate to sensing cardiac signals from an atrial chamber. The sensed cardiac signals may be used for far field monitoring of ventricular events depending on the monitoring feature. It is to be understood that a medical device, e.g., pacemaker 12 in FIG. 1, may be implanted for sensing cardiac signal from a ventricular chamber and for performing a monitoring function. In this case, far field monitoring of atrial events from a cardiac signal sensed from a ventricle may be performed based on an atrial event monitoring metric determined from the sensed cardiac signal. For example, the medical device may monitor for atrial arrhythmias, atrial systolic events (which may be associated with intrinsic atrial depolarizations and subsequent contractions or atrial pacing capture by another device), atrial rate or other atrial conditions or events using a cardiac electrical or mechanical signal sensed from a ventricle.

Figure 6:
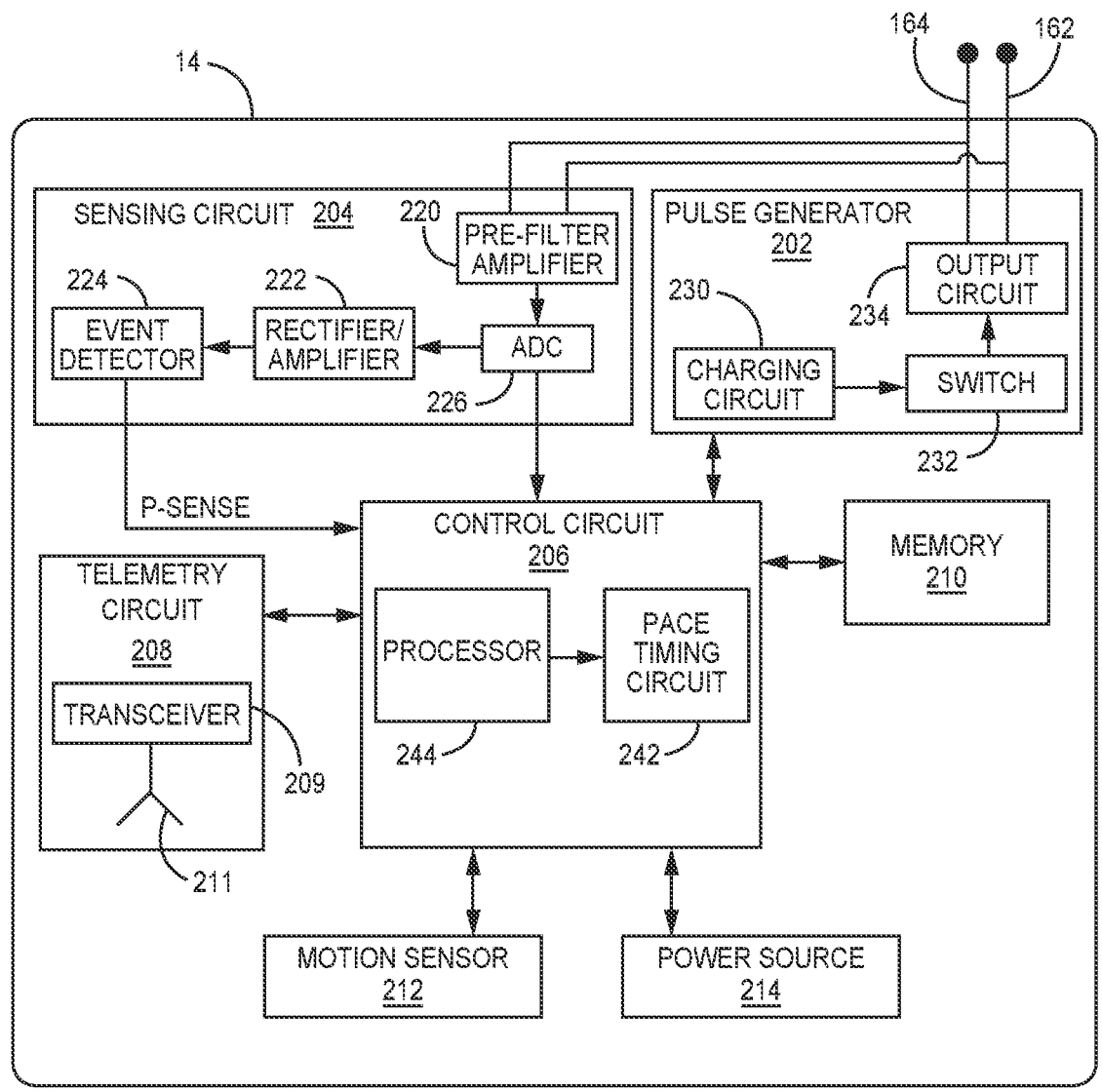
FIG. 6 is a conceptual diagram of an example configuration of the pacemaker shown in FIG. 1.

FIG. 6 is a conceptual diagram of an example configuration of a medical device configured to sense cardiac signals for a cardiac monitoring function of the medical device. FIG. 6 is described in the context of pacemaker 14 of FIG. 1; however it is to be understood that circuitry and components and the associated functionality described in conjunction with FIG. 6 may be incorporated in pacemaker 14 shown in FIG. 4 or pacemaker 254 of FIG. 5. Furthermore, the circuitry and functionality described here may be applicable or adapted for use in pacemaker 12 for sensing cardiac signals from a ventricular location for providing a cardiac monitoring function.

Pacemaker 14 includes a pulse generator 202, a cardiac electrical signal sensing circuit 204, a control circuit 206, memory 210, telemetry circuit 208, motion sensor 212 and a power source 214. The various circuits represented in FIG. 6 may be combined on one or more integrated circuit boards which include a specific integrated circuit (ASIC), an electronic circuit, a processor (shared, dedicated, or group) and memory that execute one or more software or firmware programs, a combinational logic circuit, state machine or other suitable components that provide the described functionality.

Motion sensor 212 may include an accelerometer in the examples described herein. Motion sensor 212 is not limited to being an accelerometer, however, and other motion sensors may be utilized successfully in pacemaker 14 for detecting cardiac motion signals according to the techniques described herein. Examples of motion sensors that may be implemented in motion sensor 212 include piezoelectric sensors and MEMS devices. Motion sensor 212 may be enclosed by the housing 150 (shown in FIG. 2) of pacemaker 14. However, in the case of a pacemaker coupled to transvenous leads, such as pacemaker 254 of FIG. 5, including a motion sensor 212 within the pacemaker housing 255 may be optional. Instead a motion sensor may be carried by a transvenous lead coupled to pacemaker 254, e.g., accelerometer 274 as shown in FIG. 5, for positioning within a heart chamber. In some examples, motion sensor 212 may be included within the housing 255 of the pacemaker 254, in addition to a lead-based motion sensor, and configured for sensing motion due to patient physical activity and/or acceleration signal changes due to patient posture changes.

Motion sensor 212 (or lead-based accelerometer 274) may include a multi-axis sensor, e.g., a two-dimensional or three-dimensional sensor, with each axis providing an axis signal that may be analyzed individually or in combination for detecting cardiac mechanical events, individually or over several cardiac cycles based on a cardiac event monitoring metric. Motion sensor 212 produces an electrical signal correlated to motion or vibration of sensor 212 (and pacemaker 14), e.g., when subjected to flowing blood and cardiac motion. The motion sensor 212 may include one or more filter, amplifier, rectifier, analog-to-digital converter (ADC) and/or other components for producing a motion signal that is passed to control circuit 206. As such, motion sensor 212 is also referred to herein as a "second sensing circuit" for sensing a cardiac signal. Each vector signal produced by each individual axis of a multi-axis accelerometer may be filtered by a high pass filter, e.g., a 10 Hz high pass filter, or a bandpass filter, e.g., a 10 Hz to 30 Hz bandpass filter. The filtered signal may be digitized by an ADC and rectified for use by processor 244 of control circuit 206 for determining cardiac event monitoring metrics. The high pass filter may be raised (e.g., to 15 Hz) if needed to detect ventricular event signals that have higher frequency content than atrial event signals, for instance. In some examples, high pass filtering is performed with no low pass filtering. In other examples, each accelerometer axis signal is filtered by a low pass filter, e.g., a 30 Hz low pass filter, with or without high pass filtering. Various signal processing and analysis techniques may be performed by control circuit 206 for determining a cardiac event monitoring metric from the motion signal received from motion sensor 212, e.g., applying one or more thresholds for detecting ventricular event signals, determining an integration metric, determining a differential signal, determining a number of threshold crossings by the motion signal, determining a number of peaks, determining a morphology matching score or the like.

One example of an accelerometer for use in implantable medical devices that may be implemented in conjunction with the techniques disclosed herein is generally disclosed in U.S. Pat. No. 5,885,471 (Ruben, et al.), incorporated herein by reference in its entirety. An implantable medical device arrangement including a piezoelectric accelerometer for detecting patient motion is disclosed, for example, in U.S. Pat. No. 4,485,813 (Anderson, et al.) and U.S. Pat. No. 5,052,388 (Sivula, et al.), both of which patents are hereby incorporated by reference herein in their entirety. Examples of three-dimensional accelerometers that may be implemented in pacemaker 14 and used for detecting cardiac mechanical events using the presently disclosed techniques are generally described in U.S. Pat. No. 5,593,431 (Sheldon) and U.S. Pat. No. 6,044,297 (Sheldon), both of which are incorporated herein by reference in their entirety. Other accelerometer designs may be used for producing an electrical signal that is correlated to motion imparted on pacemaker 14 due to ventricular and atrial mechanical events. As discussed above, pacemaker 14 may include other sensors for sensing a cardiac mechanical or hemodynamic signal in addition to or instead of motion sensor 212.

Sensing circuit 204 may be a cardiac electrical signal sensing circuit configured to receive at least one cardiac electrical signal via electrodes coupled to pacemaker 14, e.g., electrodes 162 and 164. The cardiac electrical signal is received by a pre-filter and amplifier circuit 220. Pre-filter and amplifier circuit 220 may include a high pass filter to remove DC offset, e.g., a 2.5 to 5 Hz high pass filter, or a wideband filter having a bandpass of 2.5 Hz to 100 Hz or narrower to remove DC offset and high frequency noise. Pre-filter and amplifier circuit 220 may further include an amplifier to amplify the "raw" cardiac electrical signal passed to analog-to-digital converter (ADC) 226. ADC 226 may pass a multi-bit, digital electrogram (EGM) signal to control circuit 206 for use by control circuit 206 in identifying atrial electrical events (e.g., sensed P-waves) and/or FFRWs. Identification of FFRWs may be used in confirming ventricular events sensed from the motion signal and/or for use in a monitoring feature such as AV block monitoring. Identification of sensed P-waves may be used in setting windows for detecting ventricular events from the motion signal and/or FFRWs from the cardiac electrical signal, comparing an atrial rate to a ventricular event rate, and/or normalizing a ventricular event metric for detecting AV block. The digital signal from ADC 226 may be passed to rectifier and amplifier circuit 222, which may include a rectifier, bandpass filter, and amplifier for passing a cardiac signal to cardiac event detector 224. An episode of the EGM signal passed to control circuit 206 from ADC 226 may be stored in memory 210 in response to determining whether or not to enable AV block monitoring (or another monitoring feature) and/or in response to AV block detection made after AV block monitoring is enabled.

Cardiac event detector 224 may include a sense amplifier or other detection circuitry that compares the incoming rectified, cardiac electrical signal to a cardiac event sensing threshold, which may be an auto-adjusting threshold. For example, when the incoming signal crosses a P-wave sensing threshold, the cardiac event detector 224 produces a P-wave sensed event signal (P-sense) that is passed to control circuit 206. In other examples, cardiac event detector 224 may receive the digital output of ADC 226 for detecting P-waves by a comparator, morphological signal analysis of the digital EGM signal or other P-wave detection techniques. In some examples, cardiac event detector 224 may apply a first, lower threshold for detecting FFRWs and a second higher threshold for detecting P-waves.

Processor 244 may provide sensing control signals to sensing circuit 204, e.g., P-wave sensing threshold, FFRW detection threshold, sensitivity, and various blanking and refractory intervals applied to the cardiac electrical signal for controlling P-wave sensing and/or FFRW sensing. P-wave sensed event signals passed from cardiac event detector 224 to control circuit 206 may be used for scheduling atrial pacing pulses by pace timing circuit 242 and for use in setting windows for detecting ventricular events by control circuit 206 from a signal received from motion sensor 212 and/or for detecting FFRWs from the cardiac electrical signal. P-wave sensed event signals may be used by control circuit 206 for identifying multiple atrial cycles over which a ventricular event metric is determined.

In some examples, cardiac event detector 224 may be configured to detect FFRWs from the atrial signal received by electrodes 162 and 164. FFRWs may be sensed based on a FFRW detection threshold crossing, which may occur after an atrial pacing pulse or sensed P-wave. In other examples, control circuit 206 may detect FFRWs from the digital EGM signal passed to control circuit 206 from ADC 226. FFRWs may be detected based on a morphological analysis of the atrial EGM signal or an FFRW detection threshold amplitude crossing by the atrial EGM signal. Sensing circuit 204 may include a P-wave sensing channel and a separate FFRW sensing channel in some examples. Components included in the P-wave sensing channel and the FFRW sensing channel may be shared between channels in some examples. For example, pre-filter/amplifier 220 and ADC 226 may be shared by both channels with the output of ADC 226 being passed to a P-wave detector and to an FFRW detector. Different filtering and amplification may be applied to the output of ADC 226 before passing the signal to the respective P-wave detector and FFRW detector.

In examples that include an electrode advanced to the His bundle for ventricular pacing, additional electrode(s) may be coupled to cardiac electrical signal sensing circuit 204. For example, tip electrode 184 as shown in FIGS. 3 and 4 may be coupled to sensing circuit 204 for sensing ventricular R-waves by cardiac event detector 224 based on an R-wave sensing threshold crossing. In the case of pacemaker 254 which may be coupled to both an atrial lead and a ventricular lead, sensing circuit 204 may include two sensing channels, one for sensing atrial P-waves and one for sensing ventricular R-waves.

Control circuit 206 includes pace timing circuit 242 and processor 244. Control circuit 206 may receive P-wave sensed event signals and/or digital cardiac electrical signals from sensing circuit 204 for use in detecting and confirming cardiac events and controlling atrial pacing (and in some examples ventricular pacing via the His bundle). For example, P-wave sensed event signals may be passed to pace timing circuit 242 for starting a new atrial pacing escape interval. In some examples, FFRW or R-wave sensed event signals may also be passed to control circuit 206 for use in detecting or confirming ventricular events and AV block.

Processor 244 is configured to determine a cardiac event monitoring metric, e.g., a ventricular event monitoring metric, from a signal received from motion sensor 212 or from sensing circuit 204. Techniques for determining a cardiac event monitoring metric are described below. In some examples, processor 244 receives a motion signal from motion sensor 212 and may start a ventricular event window in response to identifying an atrial event, e.g., a P-wave sensed event signal from sensing circuit 204 or delivery of an atrial pacing pulse by pulse generator 202. The ventricular event window may correspond to a time period after the atrial electrical event during which ventricular mechanical contraction is expected to occur when AV conduction is intact. Processor 244 determines if the motion signal satisfies ventricular event detection criteria during the sensing window in some examples. Control circuit 206 may determine a ventricular event monitoring metric as a count of ventricular events detected over multiple atrial cycles according to some examples. Processor 244 may generate ventricular event detection signals for counting the detected ventricular events and determining when the ventricular event monitoring metric meets expected cardiac rhythm criteria. Individual ventricular events may be detected on a beat by beat basis based on a threshold crossing by a sensed cardiac signal received from sensing circuit 204 or motion sensor 212 or based on one or more sensed cardiac signal features determined during ventricular event sensing windows as described below.

In other examples, control circuit 206 may identify multiple atrial cycles and determine a ventricular event monitoring metric over the identified atrial cycles with or without requiring sensing windows. For instance, the ventricular event monitoring metric may be a variation of an AV activation time determined from the time intervals between atrial events, sensed or paced, and ventricular events sensed from the motion signal or the cardiac electrical signal. In other examples, the ventricular event monitoring metric may include an integration metric determined over a detection time interval that includes multiple atrial cycles. Control circuit 206 may determine that expected cardiac rhythm criteria are met based on one or more ventricular event monitoring metrics and enable a cardiac monitoring feature of the pacemaker 14 using a selected cardiac signal in response to determining that the expected rhythm criteria are met.

Pace timing circuit 242 may additionally receive P-wave sensed event signals from P-wave detector 224 for use in controlling the timing of pacing pulses delivered by pulse generator 202. Processor 244 may include one or more clocks for generating clock signals that are used by pace timing circuit 242 to time out an atrial pacing interval, e.g., a permanent lower rate pacing interval for treating bradycardia or a temporary lower rate interval for providing rate responsive pacing. The atrial pacing interval, sometimes referred to as an "escape interval" may be restarted by pace timing circuit 242 in response to each atrial electrical event, e.g., upon receipt of each P-wave sensed event signal and upon delivery of each atrial pacing pulse by pulse generator 202.

Pace timing circuit 242 may include one or more pacing rate interval timers or counters used to time out the pacing escape interval. For example, pace timing circuit 242 may include a timer or counter for timing out the atrial pacing interval, which may be a programmable interval stored in memory 210 and retrieved by processor 244. If a P-wave sensed event signal is not received by control circuit 206 before expiration of the atrial pacing interval, pulse generator 202 generates an atrial pacing pulse in response to the atrial pacing interval expiration.

In examples that include ventricular pacing capabilities by pacemaker 14 (or pacemaker 254), control circuit 206 may control pulse generator 202 to generate ventricular pacing pulses, e.g., delivered by a His bundle pacing electrode 184 or 284. The ventricular pacing pulses may be delivered in a non-atrial tracking ventricular pacing mode, e.g., during atrial tachyarrhythmia. Pace timing circuit 242 may set a ventricular pacing interval set to a lower pacing rate interval or a temporary interval to provide ventricular rate support. The ventricular pacing pulses may be delivered in an atrial tracking pacing mode when control circuit 206 detects AV block in some examples. In this case, an AV pacing interval may be set by pace timing circuit 242 in response to P-wave sensed event signals and atrial pacing pulses to synchronize the ventricular pacing pulses to the sensed P-waves and atrial pacing pulses. Upon expiration of an AV pacing interval, pulse generator 202 generates a ventricular pacing pulse delivered via a ventricular pacing electrode vector (e.g., electrodes 184 and 182 shown in FIG. 3 or electrodes 284 and 282 shown in FIG. 5).

While only electrodes 162 and 164 are shown in FIG. 6, it is to be understood from the conceptual diagrams of FIGS. 4 and 5 that any housing-based electrodes, e.g., electrodes 182, 184, and 186, and/or lead-based electrodes, e.g., electrodes 270, 272, 282, and 284, coupled to a medical device performing the functions disclosed herein can be electrically coupled to circuitry depicted in FIG. 6 and enclosed by the housing of the pacemaker 14 or 254. As such, housing-based electrodes 182, 184, and 186 may be electrically coupled to pulse generator 202 and/or cardiac electrical signal sensing circuit 204 for providing cardiac electrical signal sensing and delivering pacing pulses. Lead based electrodes 270, 272, 282 and 284 shown in FIG. 5 may be electrically coupled to pulse generator 202 and/or cardiac electrical signal sensing circuit 204 via the conductors carried by the lead bodies 266 and 268 and connector block 252.

Pulse generator 202 generates electrical pacing pulses that are delivered to the RA of the patient's heart via cathode electrode 164 and return anode electrode 162 (or in other examples via electrodes 182 and 186 shown in FIG. 4 or electrodes 270 and 272 shown in FIG. 5). In examples including ventricular pacing capabilities, pulse generator 202 may generate electrical pacing pulses, which may be delivered to the His-Purkinje conduction system using electrodes 184 and 182 (FIG. 4) or electrodes 282 and 284 (FIG. 5). In addition to providing control signals to pace timing circuit 242 and pulse generator 202 for controlling the timing of atrial pacing pulses, processor 244 may retrieve programmable pacing control parameters from memory 210, such as pacing pulse amplitude and pacing pulse width, which are passed to pulse generator 202 for controlling pacing pulse delivery.

Pulse generator 202 may include charging circuit 230, switching circuit 232 and an output circuit 234. Charging circuit 230 is configured to receive current from power source 214 and may include a holding capacitor that may be charged to a pacing pulse amplitude under the control of a voltage regulator included in charging circuit 230. The pacing pulse amplitude may be set based on a control signal from control circuit 206. Switching circuit 232 may control when the holding capacitor of charging circuit 230 is coupled to the output circuit 234 for delivering the pacing pulse. For example, switching circuit 232 may include a switch that is activated by a timing signal received from pace timing circuit 242 upon expiration of a pacing escape interval and kept closed for a programmed pacing pulse width to enable discharging of the holding capacitor of charging circuit 230. The holding capacitor, previously charged to the pacing pulse voltage amplitude, is discharged across electrodes 162 and 164 (or other selected pacing electrode vector) through the output capacitor of output circuit 234 for the programmed pacing pulse duration.

Memory 210 may include computer-readable instructions that, when executed by control circuit 206, cause control circuit 206 to perform various functions attributed throughout this disclosure to pacemaker 14 (or pacemaker 254). The computer-readable instructions may be encoded within memory 210. Memory 210 may include any non-transitory, computer-readable storage media including any volatile, non-volatile, magnetic, optical, or electrical media, such as a random access memory (RAM), read-only memory (ROM), non-volatile RAM (NVRAM), electrically-erasable programmable ROM (EEPROM), flash memory, or other digital media with the sole exception being a transitory propagating signal.

Memory 210 may store cardiac event monitoring data determined by control circuit 206 from the signal from motion sensor 212 and/or sensing circuit 204. In some examples, memory 210 includes a buffer that stores a flag for indicating when a cardiac event monitoring metric does not meet expected rhythm criteria. Memory 210 may include a buffer for storing cardiac event monitoring metrics for use in determining when a monitoring feature should be enabled. Memory 210 may store episodes of cardiac electrical signals sensed by sensing circuit 204 and/or episodes of motion signals sensed by motion sensor 212 in response to control circuit 206 enabling or disabling a monitoring feature. Memory 210 may additionally or alternatively store data determined by control circuit 206 relating to sensed cardiac events, from both the cardiac electrical signal and the motion sensor signal, particularly data relating to AV block detection or other monitored cardiac conditions.

Control circuit 206 may determine that a sensed cardiac signal received from sensing circuit 204 or motion sensor 212 meets expected cardiac rhythm criteria and enable a monitoring feature using the sensed cardiac signal. After enabling the monitoring feature, control circuit 206 may detect a cardiac condition when the sensed cardiac signal meets detection criteria based on processing and analysis of the sensed cardiac signal. For example, control circuit 206 may enable AV block monitoring when the sensed cardiac signal meets AV conduction rhythm criteria as determined by control circuit 206. Control circuit 206 may generate an alert or notification indicating that AV block monitoring is enabled (or recommended to be enabled). Telemetry circuit 208 may transmit the notification to external device 20. After enabling AV block monitoring, control circuit 206 may detect AV block when the sensed cardiac signal meets AV block detection criteria. Control circuit 206 may generate an alert or notification indicating the AV block detection. Telemetry circuit 208 may transmit the AV block detection notification to external device 20. In some examples, pulse generator 202 may generate and deliver ventricular pacing pulses as described above in response to AV block detection.

Telemetry circuit 208 includes a transceiver 209 and antenna 211 for transferring and receiving data via a radio frequency (RF) communication link. Telemetry circuit 208 may be capable of bi-directional communication with external device 20 (FIG. 1) as described above. Motion sensor signals and cardiac electrical signals, and/or data derived therefrom may be transmitted by telemetry circuit 208 to external device 20. Programmable control parameters and algorithms for sensing cardiac events and determining cardiac event monitoring metrics from sensed cardiac signals for a monitoring feature and/or for controlling pacing therapies delivered by pulse generator 202 may be received by telemetry circuit 208 and stored in memory 210 for access by control circuit 206.

Power source 214 provides power to each of the other circuits and components of pacemaker 14 as required. Power source 214 may include one or more energy storage devices, such as one or more rechargeable or non-rechargeable batteries. The connections between power source 214 and other pacemaker circuits and components are not shown in FIG. 6 for the sake of clarity but are to be understood from the general block diagram of FIG. 6. For example, power source 214 may provide power as needed to charging and switching circuitry included in pulse generator 202; amplifiers, ADC 226 and other components of sensing circuit 204; telemetry circuit 208; memory 210 and motion sensor 212.

The functions attributed to pacemaker 14 (and pacemaker 254) herein may be embodied as one or more processors, controllers, hardware, firmware, software, or any combination thereof. Depiction of different features as specific circuitry is intended to highlight different functional aspects and does not necessarily imply that such functions must be realized by separate hardware, firmware or software components or by any particular circuit architecture. Rather, functionality associated with one or more circuits described herein may be performed by separate hardware, firmware or software components, or integrated within common hardware, firmware or software components. For example, determination of cardiac monitoring metrics from the motion sensor signal may be implemented in control circuit 206 executing instructions stored in memory 210 and relying on input from sensing circuit 204 and motion sensor 212. Providing software, hardware, and/or firmware to accomplish the described functionality in the context of any modern pacemaker, given the disclosure herein, is within the abilities of one of skill in the art.

Figure 7:
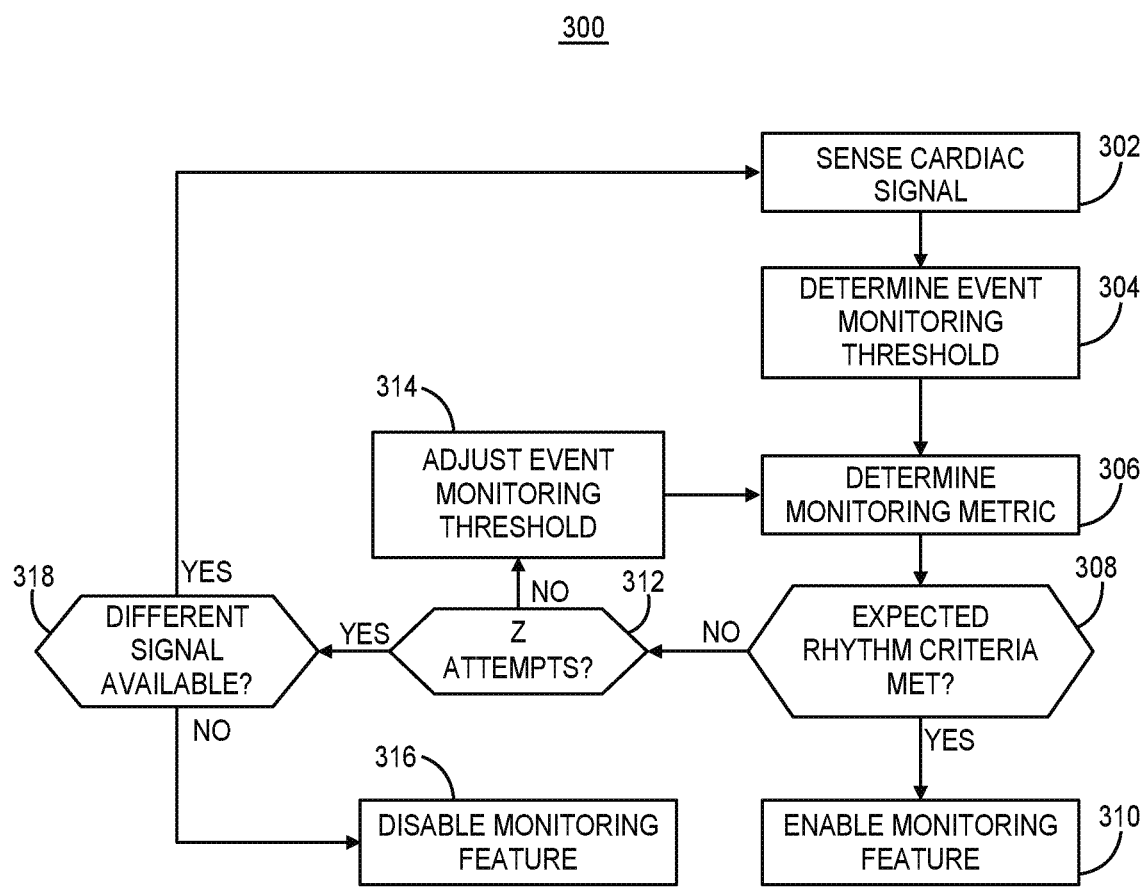
FIG. 7 is a flow chart of a method that may be performed by a medical device for enabling a cardiac signal monitoring feature of the device according to one example.

FIG. 7 is a flow chart 300 of a method that may be performed by a medical device for enabling a cardiac monitoring feature of the medical device according to one example. At block 302, a cardiac signal is sensed by the medical device, e.g., pacemaker 14. In some examples, the cardiac signal is a motion signal, which may be sensed by motion sensor 212. In other examples, the cardiac signal is an electrical signal, which may be sensed by cardiac electrical signal sensing circuit 204. Other examples of sensed cardiac signals include pressure signals, flow signals, oxygen saturation signals, acoustical signals, or the like.

At block 304, control circuit 206 determines an event monitoring threshold. In some examples, control circuit 206 determines the event monitoring threshold based on the sensed cardiac signal. Control circuit 206 may determine the event monitoring threshold by determining a threshold for detecting a desired cardiac event signal from the sensed cardiac signal on a beat by beat basis. As an example, control circuit 206 may set a ventricular event detection threshold amplitude to be applied to the sensed cardiac signal for detecting the ventricular event signal on a beat by beat basis. Control circuit 206 may determine the event monitoring threshold by determining a feature of the sensed cardiac signal over a predetermined time interval or for a predetermined number of cardiac cycles. Control circuit 206 may set the event monitoring threshold based on the determined cardiac signal feature. As an example, control circuit 206 may determine a maximum peak amplitude of the cardiac signal outside an atrial blanking period for setting a ventricular event detection threshold based on the maximum peak amplitude of the sensed cardiac signal during each atrial cycle. In this case, the event monitoring threshold determined as a ventricular event detection threshold may be used for detecting FFRWs from the cardiac electrical signal from cardiac electrical sensing circuit 204 or for detecting ventricular event signals from the cardiac motion signal from motion sensor 212 on a beat-by-beat basis for use in monitoring the ventricular rhythm or ventricular rate based on detected ventricular event signals.

In other examples, the event monitoring threshold may be a threshold applied to a metric of the cardiac signal that is determined over multiple cardiac cycles rather than on a beat by beat basis. For example, control circuit 206 may determine an integration metric of the sensed cardiac signal over multiple cardiac cycles. The integration metric may represent a cumulative area of the rectified cardiac signal over multiple cardiac cycles and be correlated to the rate, amplitude and/or width of a desired cardiac event signal occurring over the multiple cycles. For example, control circuit 206 may determine the integration metric by summing amplitudes of the cardiac signal sample points occurring outside any applied blanking periods to determine the area of the cardiac signal over multiple cardiac cycles or over a predetermined time interval. This integration metric may be determined multiple times (over multiple predetermined time intervals or over a predetermined number of multiple cardiac cycles) to generate a histogram of the integration metric. The event monitoring threshold may be set by control circuit 206 at block 304 based on the histogram of the integration metrics. In some examples, the integration metric is determined by summing sample point amplitudes of the cardiac signal outside of atrial blanking periods to determine a metric correlated to the rate of ventricular event signals, electrical or mechanical depending on what cardiac signal is being processed and analyzed, over the integration time period. The event monitoring threshold may be set based on a minimum integration metric, for instance. This minimum integration metric may represent a lower limit of the integration metric expected during AV conduction, for example, when ventricular event signals are present in the sensed cardiac signal for every atrial cycle. Additional examples of methods for determining event monitoring thresholds are described below.

At block 306, control circuit 206 determines a monitoring metric from the cardiac signal. The monitoring metric may be determined according to a monitoring protocol that is used when the monitoring feature is enabled. For example, when the cardiac signal is monitored for detecting AV block, the monitoring metric may be an amplitude metric of the cardiac signal (e.g., a mean or median amplitude, peak amplitude or the like determined over a specified time interval), an integration metric of the cardiac signal, a rate of detected ventricular event signals, a ratio of detected ventricular event signals to atrial events, and/or an AV time interval metric, e.g., a mean or variability of time intervals between atrial events and detected ventricular event signals. Various examples of monitoring metrics that may be determined in conjunction with the techniques disclosed herein for enabling an AV block or other monitoring feature are generally described in provisional U.S. Patent Application No. 63/006,208 (Galarneau, et al.), incorporated herein by reference in its entirety.

At block 308, control circuit 206 determines if expected rhythm criteria are met based on the monitoring metric. Control circuit 206 determines if expected rhythm criteria are met using the event monitoring threshold determined at block 304 by either determining the monitoring metric using the event monitoring threshold at block 306 or comparing the monitoring metric to the event monitoring threshold at block 308.

For example, when the event monitoring threshold is determined as a threshold amplitude for sensing a desired cardiac event signal, e.g., a ventricular mechanical event signal, a ventricular electrical event signal, an atrial mechanical event signal or an atrial mechanical event signal, control circuit 206 may use the event monitoring threshold to detect the desired cardiac event signal on a beat by beat basis and use a count, rate or event time intervals (which may be determined between the detected cardiac event signals or between the detected cardiac event signals and other cardiac event signals or pacing pulses) to determine the monitoring metric. The monitoring metric may then be compared to expected rhythm criteria at block 308 to determine if the monitoring metric, determined using the event monitoring threshold, meets the expected rhythm criteria.

When the event monitoring threshold is a threshold integration value, control circuit 206 may use the event monitoring threshold as a requirement of the expected rhythm criteria. For example, control circuit 206 may determine the monitoring metric as the integration metric then compare the monitoring metric to the threshold integration value at block 308 to determine if expected rhythm criteria are met. In this way, the event monitoring threshold determined from the sensed cardiac signal is used in determining when expected rhythm criteria are met at block 308.

The expected rhythm criteria may be applied to the monitoring metric for determining that the expected rhythm is AV conduction in some examples. For example, when pacemaker 14 is implanted in the RA, the patient may be expected to require only atrial pacing due to SA node dysfunction with normal AV conduction intact. However, it may be desirable to monitor for AV block in some patients since the patient's conduction abnormalities may change or worsen over time. The monitoring metric determined at block 306 may be correlated to ventricular event signals present in the sensed cardiac signal and may be compared to expected rhythm criteria for detecting expected intact AV conduction. When the monitoring metric meets AV conduction rhythm criteria at block 308, control circuit 206 may enable AV block monitoring based on processing and analysis of the sensed cardiac signal at block 310. The monitoring metric (e.g., a ventricular event rate or an integration metric) and event monitoring threshold (e.g., a ventricular event detection threshold or an integration threshold value) determined from the sensed cardiac signal result in expected AV conduction rhythm criteria being met, as is initially expected in the patient receiving an atrial pacemaker with AV conduction intact. As such, the sensed cardiac signal is determined by control circuit 206 to be reliable for monitoring for AV block that may develop later on.

In other examples, an expected rhythm may be a paced rhythm that results in capture of a heart chamber on a beat by beat basis, where the heart chamber may be an opposing heart chamber. In still other examples, the expected rhythm may be a normal sinus rhythm or rate, e.g., without a long pause, asystole, bradycardia or tachycardia beats or episodes. In these examples, the monitoring feature enabled at block 310 may be a capture monitoring feature or an oversensing/undersensing monitoring feature that detects when oversensing or undersensing of cardiac events from a different cardiac signal is suspected. When the expected rhythm criteria are met at block 308, control circuit 206 may enable the monitoring feature that relies on the sensed cardiac signal or generate a notification that enabling the monitoring feature is recommended.

When the expected rhythm criteria are not met at block 308, control circuit 206 may determine whether at least Z attempts to enable the monitoring feature have been made at block 312. Control circuit 206 may attempt to establish an event monitoring threshold and/or determine monitoring metric(s) for determining whether expected rhythm criteria are met based on the event monitoring threshold and monitoring metric(s) multiple times, e.g., 2, 3, 4, 5 or other selected number of times, before disabling (or recommending to disable) the monitoring feature at block 316.

When fewer than Z attempts to enable the monitoring feature have been made, control circuit 206 may adjust the event monitoring threshold at block 314. In some examples, control circuit 206 may adjust the event monitoring threshold by a predetermined amount or percentage from the current value. In other examples, control circuit 206 may adjust the event monitoring threshold to a different threshold based on cardiac signal features originally determined at block 304 used to set the original event monitoring threshold. In still other examples, control circuit 206 may re-determine cardiac signal features over a new predetermined time interval or number of cardiac cycles for determining the adjusted event monitoring threshold at block 314.

Control circuit 206 repeats determination of monitoring metric(s) at block 306 and determining whether expected rhythm criteria are met based on the adjusted event monitoring threshold and newly determined monitoring metric(s). When Z attempts to enable the monitoring feature have been made, and control circuit 206 has determined that the expected rhythm criteria are not met at block 308, control circuit 206 may disable the monitoring feature that relies on processing and analysis of the sensed cardiac signal at block 316. Additionally or alternatively, control circuit 206 may generate a notification that disabling the monitoring feature is recommended. For example, when expected AV conduction rhythm criteria are not met at block 308 in a patient that is not expected to be experiencing AV block, ventricular event signals in the sensed cardiac signal may be undersensed (or oversensed) based on the event monitoring threshold and monitoring metric. In this case, control circuit 206 may disable the AV block monitoring feature since the cardiac signal is deemed not reliable for determining AV conduction when AV conduction is expected or known to be present.

It is to be understood that even though the sensed cardiac signal may be determined to not meet expected rhythm criteria at block 308 as required for enabling a specific monitoring feature, the cardiac signal may still be sensed by the medical device for other purposes. For example, a FFRW monitoring metric determined from an atrial electrical signal may not meet expected AV conduction rhythm criteria for enabling an AV block monitoring feature based on FFRW sensing from the atrial electrical signal. However, the atrial electrical signal may still be sensed by pacemaker 14 for sensing atrial P-waves, determining the atrial rhythm and controlling atrial pacing.

In some examples, when control circuit 206 determines that the expected rhythm criteria are not met after Z attempts, control circuit 206 may select an alternative cardiac signal at block 318. When the motion sensor 212 includes a multi-axis accelerometer, control circuit 206 may initially sense one acceleration vector signal at block 302, which may be a sensed from a single axis of the accelerometer, from a combination of two axes of the accelerometer, or a combination of all three axes of the accelerometer.

When one or more attempts using the first selected acceleration vector signal do not succeed in determining the expected rhythm from the sensed signal, control circuit 206 may select a different acceleration vector signal at block 318. A different single axis acceleration signal or a different combination of two axis signals may be selected, or the combination of all three axes of the accelerometer may be selected if not already attempted. Control circuit 206 may test all available combinations or a programmable subset of the available acceleration vector signals before disabling the monitoring feature at block 316.

Selection of a different cardiac signal at block 318 by control circuit 206 may include switching from a mechanical signal to an electrical signal or vice versa. For example, control circuit 206 may initially sense an atrial electrical signal at block 302 to determine a FFRW detection threshold amplitude, determine a FFRW monitoring metric using the detection threshold amplitude, and determine whether the FFRW monitoring metric meets expected rhythm criteria, e.g., AV conduction criteria, at block 308. For example, the monitoring metric may be a rate of sensed FFRWs or a ratio of the rate of sensed FFRWs to the rate of atrial events (sensed and/or paced). When AV conduction rhythm criteria are unmet at block 308 based on the sensed atrial electrical signal, control circuit 206 may perform additional attempts of enabling the monitoring feature using the atrial electrical signal. However, when the expected AV conduction criteria are unmet at block 308 after a maximum specified number of attempts, control circuit 206 may switch to sensing the motion signal, using one or more accelerometer axis signals, at block 318 for repeating subsequent attempts at enabling the monitoring feature. In other instances, all available acceleration vector signals may be tested first for enabling the monitoring feature. When all or a selected subset of acceleration vectors signals from motion sensor 212 are determined to not meet expected rhythm criteria at block 308, after a predetermined maximum number of attempts, control circuit 206 may switch to the atrial electrical signal at block 318 for subsequent attempts at enabling the monitoring feature.

It is recognized that in addition to or instead of automatically enabling or disabling the monitoring feature at block 310 or 316, respectively, control circuit 206 may generate an output indicating a recommendation and/or data that supports enabling or disabling the monitoring feature. For example, control circuit 206 may transmit a notification to external device 20 indicating the recommendation to enable or disable the monitoring feature and/or transmit data corresponding to the sensed cardiac signal(s), event monitoring threshold(s) determined from the sensed cardiac signals(s), and/or determined monitoring metrics used for the determination of whether the expected rhythm criteria are met or not. Processor 52 of external device 20 may generate a display of transmitted data, e.g., in tabular and/or graphical formats and/or as cardiac signal episodes with annotations indicating thresholds, cardiac event signals, and/or monitoring metric values for displaying on display unit 54.

Figure 8:
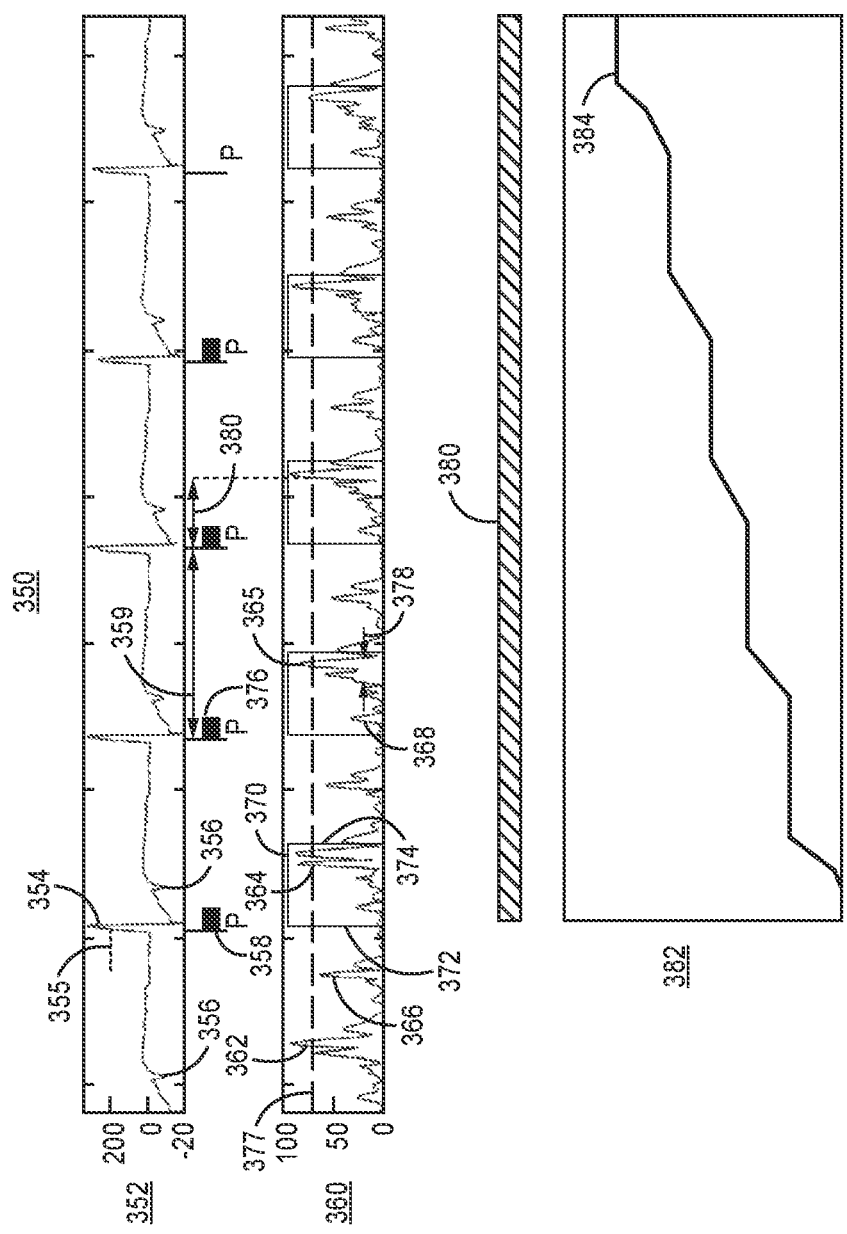
FIG. 8 is a diagram of a cardiac electrical signal and a corresponding motion signal, shown as an acceleration signal, during normal sinus rhythm with intact AV conduction.

FIG. 8 is a diagram 350 of a cardiac electrical signal 352 and a corresponding motion signal, shown as acceleration signal 360, during normal sinus rhythm with intact AV conduction. The cardiac electrical signal 352 in this example is an atrial EGM signal that may be produced by sensing circuit 204 from signals sensed from the patient's heart via electrodes 162 and 164 and passed to control circuit 206 for further processing and analysis in some examples. The acceleration signal 360 is a rectified, filtered signal produced by motion sensor 212. For example, acceleration signal 360 may be bandpass filtered, e.g., by a 10 to 30 Hz bandpass filter, and rectified by motion sensor 212 and passed to control circuit 206. The acceleration signal 360 in this example is a single axis acceleration signal but may alternatively be produced by motion sensor 212 as a combination of two axis signals or all three axis signals of a three axis accelerometer included in motion sensor 212 in other examples. In some implementations, control circuit 206 may receive two or all three single axis acceleration signals from motion sensor 212 and determine one or more combinations of two or all three axis signals.

Cardiac electrical signal 352 includes atrial P-waves 354, each followed by an FFRW 356, as expected during an intact AV conduction rhythm. The acceleration signal 360 includes a ventricular event signal 362 following each FFRW 356. In the example of FIG. 8, AV conduction is intact such that each atrial P-wave 354 is conducted to the ventricles as evidenced by the FFRW 356 that follows each P-wave 354 and the subsequent mechanical contraction of the ventricles as evidenced by the ventricular event signal 362 following each P-wave 354. The term "ventricular event signal" referred to in conjunction with a motion signal produced by motion sensor 212 may generally refer to acceleration signals present in the motion signal due to closure of the tricuspid and mitral valves, ventricular contraction, and/or opening of the pulmonary and aortic valves. The ventricular event signal 362 may therefore include cardiac motion signals associated with ventricular systole.

The acceleration signal 360 may include a ventricular diastolic event signal 366 following the ventricular event signal 362 associated with ventricular systole. The ventricular diastolic event signal 366 corresponds generally to the end of ventricular systole and start of ventricular diastole upon the closure of the pulmonary and aortic valves and the ventricular relaxation and filling phase of the ventricular cycle. The techniques described herein for detecting a ventricular event or determining a ventricular event monitoring metric may correspond to detecting the ventricular event signal 362 associated with ventricular systole because the ventricular event signal 362 is generally the largest amplitude signal in the acceleration signal 360 and therefore has the greatest signal strength promoting reliable determination of a ventricular event monitoring metric correlated to ventricular mechanical activation which may be used for determining an expected rhythm, e.g., for determining AV conduction and enabling an AV block monitoring feature that uses the acceleration signal 360. It is recognized, however, that ventricular signals 362 and 366 of the acceleration signal 360 may include multiple signal peaks corresponding to mechanical activity of the ventricles during ventricular systole and diastole. All or any portion of the signal peaks corresponding to ventricular systole and/or diastole may contribute to a ventricular event monitoring metric determined by control circuit 206 from acceleration signal 360 for verifying that the acceleration signal 360 meets expected cardiac rhythm criteria, e.g., AV conduction rhythm criteria, for enabling a monitoring feature, e.g., AV block monitoring, that is based on processing and analysis of acceleration signal 360. Once enabled, acceleration signal 360 may be used by the AV block monitoring algorithm for detecting AV block. Examples of monitoring metrics determined from the acceleration signal 360 that may include contributions of one or both ventricular event signal 362 associated with ventricular systole and ventricular diastolic event signal 366 are described below.

The acceleration signal 360 may include an atrial event signal 368 corresponding to atrial contraction subsequent to each P-wave 356. Atrial cycles may be identified by identifying the atrial event signals 368 from the acceleration signal 360. Since the atrial event signal 368 is relatively small compared to the ventricular event signals 362 and 366, the atrial event signal 368 may not interfere with detecting ventricular event signals 362 and may contribute insignificantly or not at all to the determination of a ventricular event monitoring metric. In some examples, and as described below, the atrial event signal 368 may be blanked by an atrial blanking period 376 when a monitoring metric is determined from the acceleration signal 360 for use in determining whether to enable a monitoring feature. The monitoring metric may be determined by analyzing the acceleration signal 360 outside the atrial blanking period 376. Atrial blanking period 376 may be 100 to 200 ms long and is between 120 to 150 ms long, as examples. Additionally or alternatively, a ventricular event window 370 may be set by control circuit 206 for determining a monitoring metric from the acceleration signal 360 within the ventricular event window 370. Control circuit 206 may be configured to determine a monitoring metric from the acceleration signal 360 outside an atrial blanking period 376 and/or within a ventricular event window 370 for determining when to enable a monitoring feature as well as for determining a ventricular event monitoring metric after the monitoring feature is enabled. The monitoring feature that relies on acceleration signal 360 may be an AV block monitoring feature or a long ventricular pause monitoring feature. In other examples, the monitoring feature may be a ventricular rate monitoring feature or a capture monitoring feature where capture or loss of capture of a ventricular pacing pulse, a His bundle pacing pulse, or an atrial pacing pulse (with the atrial evoked response conducted to the ventricles) may be determined. In still other examples, the monitoring feature may be a ventricular oversensing/undersensing monitoring feature where suspected oversensing/undersensing of ventricular events from another signal, e.g., FFRWs from a cardiac electrical signal such as the atrial electrical signal 352, may be determined based on the monitoring metric.

While illustrative examples given above relate primarily to a monitoring metric associated with ventricular event monitoring, it is to be understood that a monitoring metric may be associated with atrial event monitoring, e.g., atrial event signal 368. In this case, control circuit 206 may determine the monitoring metric from the acceleration signal 360 outside a ventricular blanking period and/or within an atrial event sensing window so that atrial event signal 368 contributes most significantly to the monitoring metric and ventricular event signal 362 and/or ventricular diastolic event signal 366 do not or minimally contribute to the monitoring metric. Furthermore, for some monitoring features, more than one monitoring metric may be determined, e.g., a first monitoring metric correlated to ventricular events and a second monitoring metric correlated to atrial events.

Sensing circuit 204 generates a P-wave sensed event signal 358 in response to sensing each P-wave 354, e.g., in response to the cardiac electrical signal 352 (or another filtered and rectified atrial electrical signal) crossing a P-wave sensing threshold 355. Control circuit 206 may identify atrial cycles 359 by identifying an atrial electrical event in response to receiving each P-wave sensed event signal 358. Control circuit 206 may identify multiple atrial cycles by identifying two consecutive atrial events associated with each atrial cycle 359. In some examples, control circuit 206 is configured to identify an atrial cycle 359 in response to receiving a P-wave sensed event signal 358 and set a ventricular event sensing window 370 applied to the acceleration signal 360 in response to the P-wave sensed event signal 358. The ventricular event sensing window 370 may be set by control circuit 206 in response to each P-wave sensed event signal 358 and in response to an atrial pacing pulse delivered by pulse generator 202. Sensing window 370 may begin without a delay at starting time 372 upon receipt of P-wave sensed event signal 358 (or a pacing pulse). In other examples, sensing window 370 may have a starting time 372 that occurs at a predetermined delay after the P-wave sensed event signal 358, e.g., 50 ms, 100 ms, 150 ms or other interval, which may serve to blank any atrial motion signals, e.g., atrial event signal 368, present in the acceleration signal 360 immediately following the P-wave 354. While intrinsic P-waves 354 are shown to be sensed on each atrial cycle in the example of diagram 350, it is to be understood that control circuit 206 may set a ventricular event sensing window 370 following any atrial electrical event, sensed intrinsic P-waves and atrial pacing pulses, when determining a monitoring metric correlated to ventricular activity. The starting time 372 of the ventricular event sensing window 370 may be different following an atrial pacing pulse than following a P-wave sensed event signal because the timing of a subsequent ventricular contraction may be different following an atrial pacing pulse than a sensed intrinsic P-wave.

In the example shown, the ventricular event sensing window 370 has an ending time 374, which may be set to a predetermined time interval after the atrial electrical event, e.g., after P-wave sensed event signal 358 in this example. The ending time 374 may be set to 300 ms, 400 ms, 500 ms, 550 ms, 600 ms, 650 ms or other selected time interval after the atrial electrical event. In some examples, the ending time 374 is adjustable by control circuit 206 and may vary with the atrial rate, e.g., increase with longer atrial cycles and decrease with shorter atrial cycles, and/or set differently depending on whether the atrial electrical event is paced or sensed. Sensing windows 370 may be set uniquely for each accelerometer axis signal or combinations of signals when used for determining a monitoring metric. For example, the sensing window 370 may start earlier or later and/or end earlier or later for a particular accelerometer axis signal due to the timing relative to the P-wave sensed event signal 358 of the maximum acceleration associated with ventricular contraction along the associated axis of the motion sensor 212.

Referring again to FIG. 7, at block 304, control circuit 206 may set an event monitoring threshold as a ventricular event sensing threshold 377 that is applied to acceleration signal 360 for determining when to enable a monitoring feature (and may be used after the monitoring feature is enabled). The ventricular event sensing threshold 377 may be applied outside an atrial blanking period 376 and/or during the ventricular event sensing window 370. In other examples, the ventricular event sensing threshold 377 may be applied to the acceleration signal 360 without requiring a blanking period 376 or a sensing window 370.

As described below in conjunction with FIG. 12, control circuit 206 may establish ventricular event sensing threshold 377 by determining a maximum peak amplitude 365 of the rectified acceleration signal 360 during each ventricular event sensing window 370 over a predetermined time interval or predetermined number of atrial cycles. The predetermined time interval may be a few seconds, e.g., 2 to 10 seconds, 30 seconds, one minute, two minutes or other selected time interval. Alternatively, the predetermined number of atrial cycles may be five to ten atrial cycles, ten to fifteen atrial cycles, up to 20 atrial cycles, up to 50 atrial cycles, or other selected number of atrial cycles. The maximum peak amplitude within each ventricular event sensing window 370 of each atrial cycle (and/or outside atrial blanking period 376) may be stored in an amplitude buffer of memory 210. Control circuit 206 may determine the ventricular event sensing threshold 377 based on the determined maximum peak amplitudes.

For example, control circuit 206 may identify the lowest maximum peak amplitude and set the threshold 377 as a percentage or fraction of the lowest maximum peak amplitude. In other examples, control circuit 206 may set the threshold 377 to the lowest maximum peak amplitude less an offset. Control circuit 206 may determine a metric of the maximum peak amplitudes, such as a median, mean, nth lowest value, mean of the lowest two, three or other selected number of the maximum peak amplitudes, and set the threshold 377 to a percentage of, fraction of, or offset less than the metric of the maximum peak amplitudes.

It is recognized that the ventricular event sensing threshold 377 established as an event monitoring threshold may be set based on the maximum peak amplitudes of the acceleration signal 360 according to a variety of techniques. In general, however, the threshold 377 may be set near or less than the lowest maximum peak amplitude so that all or a large majority of ventricular event signals 362 are detected based on the established ventricular event sensing threshold 377. For instance, when the heart rhythm is expected to be an AV conduction rhythm, a ventricular event signal 362 is expected to be detected following each atrial P-wave 354. When the method of FIG. 7 is being performed while the patient is expected to be in an AV conduction rhythm, e.g., after an initial implant of pacemaker 14 in an atrial chamber, control circuit 206 may determine ventricular event sensing threshold 377 for promoting reliable sensing of all ventricular event signals 362 when AV conduction is intact.

Additionally or alternatively, control circuit 206 may determine an event monitoring threshold at block 304 of FIG. 7 by determining an FFRW detection threshold. Control circuit 206 may determine peak amplitudes of FFRWs 356 and set an amplitude threshold for sensing FFRWs 356 outside of an atrial blanking period 376 (and/or during ventricular sensing window 370 applied to the cardiac electrical signal 352. Since the FFRW 356 is expected to be a relatively narrow, low amplitude signal, other features of the cardiac electrical signal corresponding to the FFRW 356 may be determined by control circuit 206 for establishing an event monitoring threshold. For example, the polarity, the integral, the slope, the signal width, a morphology template or other features of the atrial electrical signal 352 may be determined during a ventricular event sensing window 370, corresponding to the expected timing of the FFRW waveform. Any of these example features are among the signal features that may be determined over a predetermined number of atrial cycles for establishing an event monitoring threshold that may be used for sensing FFRWs 356 for enabling a monitoring feature of pacemaker 14 and used as an event monitoring threshold when the monitoring feature that relies on FFRW sensing is enabled, such as AV block monitoring.

While illustrative examples described in conjunction with FIG. 8 relate primarily to determining an event monitoring threshold for detecting electrical or mechanical ventricular activity, e.g., FFRWs 356 or mechanical ventricular event signals 362, it is to be understood that an event monitoring threshold determined by control circuit 206 using the techniques disclosed herein may be associated with atrial activity, e.g., P-waves 354 or mechanical atrial event signals 368. In this case, control circuit 206 may determine the event monitoring threshold from the cardiac electrical signal 352 or acceleration signal 360 outside a ventricular blanking period and/or within an atrial event sensing window so that the P-wave 354 or the atrial event signal 368 contributes most significantly to the determination of the event monitoring threshold and ventricular events, e.g., FFRWs 356 or ventricular event signals 362 and/or ventricular diastolic event signals 366, do not or minimally contribute to the determination of the event monitoring threshold. The event monitoring threshold correlated to atrial electrical or mechanical activity may be used when a monitoring feature of pacemaker 14 is enabled for detecting an atrial rate, detecting atrial capture or loss of capture, detecting bradycardia or asystole, monitoring for an atrial conduction abnormality, determining undersensing or oversensing of atrial events from a different cardiac signal or other monitoring features. A maximum or upper threshold limit or threshold range may be applied to the cardiac mechanical signal, e.g., a motion signal, for detecting atrial events so that higher amplitude ventricular mechanical event signals are not oversensed or mistaken as atrial mechanical event signals.

Furthermore, for some monitoring features of pacemaker 14, more than one event monitoring threshold may be determined and used for monitoring cardiac activity. For example, a first event monitoring threshold relating to ventricular activity and a second event monitoring threshold relating to atrial activity may be determined by control circuit 206 for use by the monitoring feature and/or for determining whether a monitoring feature of pacemaker 14 that is based on processing and analysis of the sensed cardiac signal should be enabled. The first event monitoring threshold and/or the second event monitoring threshold may be used in determining a heart rhythm, rate, pacing capture, undersensing and/or oversensing of cardiac events from another cardiac signal, or the like.

Figure 9:
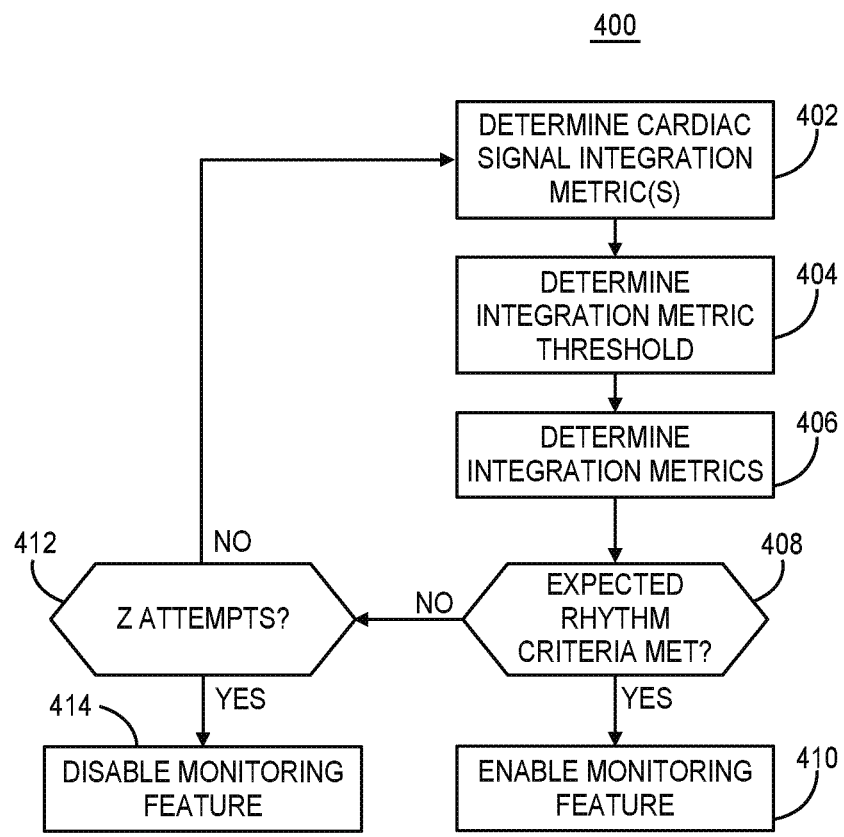
FIG. 9 is a flow chart of a method performed by a medical device for determining an event monitoring threshold for use in determining whether a monitoring feature of a medical device should be enabled according to one example.

FIG. 9 is a flow chart 400 of a method performed by a medical device for determining an event monitoring threshold for use in determining whether a monitoring feature of the medical device should be enabled or disabled according to one example. At block 402, control circuit 80 determines at least one cardiac signal integration metric of a selected cardiac signal. Control circuit 206 may start a set-up time interval at block 402 during which multiple signal integration metrics are determined from the sensed cardiac signal. The cardiac signal may be a motion signal, e.g., an acceleration signal from motion sensor 212 corresponding to a single axis or a combination of two or more axes. The selected cardiac signal, however, may be another signal that the medical device is capable of sensing, e.g., an electrical signal, a pressure signal, an oxygen saturation signal, a flow signal, an acoustical signal or the like.

Control circuit 80 may determine the integration metric by summing sample point amplitudes of the cardiac signal at a selected sampling rate over one or more integration time intervals. The cardiac signal may be a rectified signal, or the absolute values of the sample point amplitudes may be summed. When multiple integration metrics are determined over multiple respective integration time intervals, control circuit 80 starts the set-up time interval at block 402 and collects the integration metric data until the set-up time interval expires. The set-up interval may be set to a portion of one minute, one minute, several minutes one hour, several hours, one day, two days, one week or other predetermined time period. In one example, control circuit 206 determines an integration metric over each six second integration interval over two to seven days.

The integration metric may be determined by summing sample points outside any blanking periods applied to ignore cardiac events that are not being monitored and/or by summing sample points within a sensing window applied for monitoring a targeted or desired cardiac event. As described above, for example, an atrial blanking period and/or a ventricular event sensing window may be applied to a sensed cardiac signal such that the amplitudes of sample points outside the atrial blanking period and/or within a ventricular event sensing window may be summed to obtain an integration metric at block 402. In some examples, the integration metric is determined by summing sample point amplitudes over a predetermined time period or number of cardiac cycles, with or without applying blanking periods and/or sensing windows. When the integration metric is determined by integrating the cardiac signal over a time interval that may encompass multiple cardiac cycles, the integration metric may be normalized by the number of cardiac events sensed from the same cardiac signal or a different cardiac signal during the integration time interval. For example, the integration metric of the acceleration signal may be normalized by the number of atrial events sensed from a cardiac electrical signal during the integration time interval to determine a normalized integration metric that is correlated to ratio of ventricular events to atrial events. The normalized integration metric may be used to monitor for AV block, for example.

Referring again to FIG. 8, an integration metric 382 of acceleration signal 360 determined over an integration time interval 380 is shown according to one example. The integration time interval 380 may be set to a predetermined number of atrial cycles, e.g., one atrial cycle, 2 atrial cycles, 3 atrial cycles, 5 atrial cycles, 8 atrial cycles, 20 atrial cycles or other selected number of atrial cycles. In other examples, integration time interval 380 is set to a predetermined time interval, e.g., 1 second, 2 seconds, 3 seconds, 5 seconds, 10 seconds or other selected time interval. Control circuit 80 may start the integration time interval 380 in response to receiving a P-wave sensed event signal 358 from sensing circuit 204. Control circuit 206 may start a timer or counter to time out the predetermined number of atrial cycles (e.g., based on received P-wave sensed event signals 358) or the predetermined time interval (e.g., based on a clock signal generated by control circuit 206). In other examples, the starting time of integration time interval 380 may be independent of the relative timing of P-wave sensed event signals or other marker of the relative timing of the atrial cycles. Control circuit 206 may end integration time interval 380 upon receiving an nth P-wave sensed event signal where n corresponds to the predetermined number of atrial cycles. Alternatively, control circuit 206 may end integration time interval 380 upon expiration of a predetermined time interval, independent of the relative timing of an atrial cycle.

Control circuit 206 sums the sample point amplitudes of acceleration signal 360 that occur during the integration time interval 380. In the example shown, control circuit 206 sums the sample points within ventricular event sensing windows 370 and outside atrial blanking periods 376 to reach a final integration metric value 384 at the end of the integration time interval 380. In other examples, control circuit 206 may sum all sample point amplitudes within ventricular event sensing windows 370 that occur during integration time interval 380 including sample points within the atrial blanking period 376 or without setting atrial blanking period 376.

In still other examples, control circuit 206 may sum all sample point amplitudes that occur outside atrial blanking periods 376 within integration time interval 380 (e.g., without setting ventricular event sensing windows 370). In still other examples, blanking periods 376 and sensing windows 370 are optional for use in determining an integration metric of a cardiac signal. All sample point amplitudes of acceleration signal 360 may be summed over the integration time interval 380 with the assumption that atrial event signals 368 have an insignificant contribution to the integration metric 382 determined as a ventricular event monitoring metric.

In some instances, control circuit 206 may set a threshold amplitude and sum all sample point amplitudes that are greater than the threshold amplitude within the integration time interval 380 (and optionally outside an applied blanking period and/or within a sensing window). A threshold amplitude may be applied for reducing the contribution of low amplitude or baseline noise pulses and/or smaller amplitude event signals, e.g., atrial event signals 368, to the integration metric 382. For example, a threshold amplitude that is expected to be greater than the peak amplitude of a majority of atrial event signals 368 may be set without using atrial blanking periods 358 or ventricular sensing windows 370. All acceleration signal sample point amplitudes within integration time interval 380 that are greater than the threshold amplitude may be summed by control circuit 206 to determine the integration metric.

Referring again to FIG. 9 with continued reference to FIG. 8, control circuit 206 may determine one or more integration metrics over one or more respective integration time intervals at block 402 of FIG. 9 for use in determining an event monitoring threshold at block 404. For example, control circuit 206 may restart integration time interval 380 upon expiration of an immediately preceding integration time interval multiple times, in continuous succession or after a time delay between consecutive integration time intervals. To illustrate, control circuit 206 may determine an integration metric over each integration time interval where each integration time interval is two to eight seconds, e.g., six seconds, in duration, and the integration time intervals are repeated consecutively over the set-up time interval. The integration metrics may be determined at scheduled times of day and/or after verifying that set-up conditions are met. For example, control circuit 206 may verify that the atrial rate is not a tachyarrhythmia rate before starting an integration time interval.

The integration metric value 384 reached at the end of each integration time interval 380 may be stored in a buffer in memory 210. In some examples, the value of each integration metric determined over a set-up time interval is used to update a histogram storing the frequency of each integration metric value that occurs over the set-up time interval according to specified histogram bin ranges. An example integration metric histogram is described below in conjunction with FIG. 10. Individually buffered integration metric values and/or the integration metric histogram may be used by control circuit 206 in setting an integration metric threshold at block 404 of FIG. 9. In some examples, the integration metric determined at the expiration of the first integration time interval is buffered in memory 210. When a subsequent integration metric is less than the stored integration metric, the stored integration metric is overwritten by the lower integration metric. This process continues until the set-up time period expires such that the minimum integration metric determined out of multiple integration time intervals is stored in memory 210 and may be used by control circuit 206 to set the integration metric threshold at block 404.

Depending on the particular monitoring feature for which the cardiac signal is to be used, a maximum integration metric may be buffered in memory 210 and overwritten when a higher integration metric is determined. The maximum integration metric may be used for setting the integration metric threshold at block 404. In other examples, control circuit 206 may determine and update a running mean or median value of the integration metrics determined over multiple integration time intervals.

At block 404, control circuit 206 determines the integration metric threshold based on the integration metric(s) determined at block 402. The integration metric threshold may depend on the monitoring feature that is being enabled. In the illustrative example of an AV block monitoring feature, the integration metric is determined for monitoring for ventricular activity for detecting a decrease in the rate or occurrence of ventricular events due to AV block or a long ventricular pause. In this case, the integration metrics determined at block 402 may be determined when the heart rhythm is expected to be in an AV conduction rhythm, which may be an atrial sensed or atrial paced rhythm. The integration metrics determined at block 402 during an expected AV conduction rhythm therefore correspond to relatively large ventricular event signals contributing to the integration metric during each atrial cycle in a 1:1 conducted rhythm. If AV block or a long ventricular pause occurs after AV block monitoring is enabled, the integration metric is expected to be less than the lowest integration metric determined at block 402 during the AV conduction rhythm. As such, control circuit 206 may set the integration metric threshold at block 404 to be equal to or less than the lowest integration metric determined during the set-up time interval, e.g., a predetermined offset or percentage less than the lowest integration metric.

Figure 10:
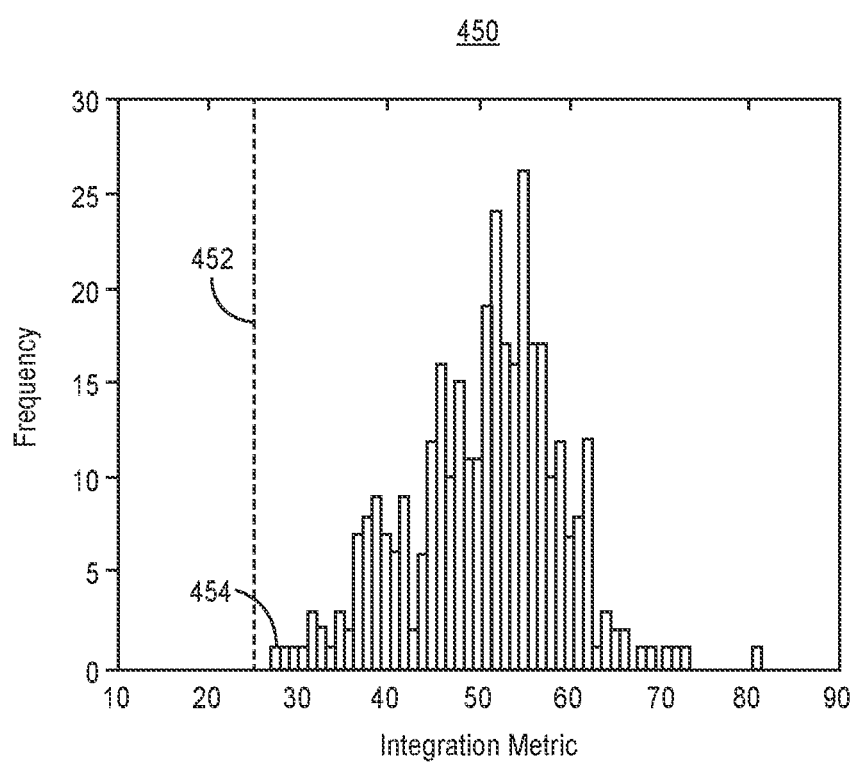
FIG. 10 is a histogram of integration metrics determined as monitoring metrics by a medical device according to one example.

FIG. 10 is a histogram 450 of integration metrics determined over a set-up time interval that may be generated by control circuit 206 according to one example. The frequency (or count) of integration metric values determined for each integration time interval (e.g., over two to six seconds) over the set-up time period (e.g., one to seven days) is stored in the histogram 450 according to specified bin values or ranges. The integration metrics shown may be determined by control circuit 206 during an AV conduction rhythm. Control circuit 206 may set the integration metric threshold 452 for discriminating between AV conduction and AV block. Since AV conduction is expected to be present for all integration metrics stored in histogram 450 generated during the set-up time interval, control circuit 206 may set integration metric threshold 452 to be less than the minimum integration metric value 454. In the example, control circuit 206 sets integration metric threshold 452 to be the lowest integration metric value 454 less 2 integration metric units. In other examples, the threshold 452 may be set equal to the lowest integration metric value 454 or a different offset less than the lowest integration metric value, e.g., one, three, four or other number of integration metric units less than the lowest integration metric value 454. In some examples, control circuit 206 may set threshold 452 to a percentile of the integration metric values of histogram 450, e.g., to the $5^{th}$ percentile or other selected percentile.

Referring again to FIG. 9, control circuit 206 may start a test time interval at block 406 for determining the integration metric at block 406 according to a monitoring protocol. Each integration metric may be determined during the test time interval according to the same integration control parameters as used at block 402 during the set-up time period, e.g., by summing the sensed cardiac signal amplitudes at the same sampling rate over the integration time interval set to the same duration as the integration time interval during the set-up time period while applying the same blanking periods and/or sensing windows as used during the set-up time period. The integration metric may be determined according to the same schedule as during the set-up time interval. For example, if the integration metrics were determined during consecutive integration time intervals for 10 minutes four times a day, the integration metrics determined during the test time interval at block 406 may be determined according to the same schedule. In other examples, the integration metrics may be determined according to a monitoring feature schedule, e.g., continuously, once per minute, once per hour or another specified schedule.

The test time interval may be several minutes, one hour, several hours, one day, two days, one week or other selected test time interval. The test time interval may be shorter than, equal to, or longer than the set-up time interval. Control circuit 206 may wait until the test time interval expires before determining if expected rhythm criteria are met at block 408 using the integration metrics determined over the test time interval and integration metric threshold. In other examples, control circuit 206 may compare each integration metric as it is determined to the integration metric threshold to verify that expected rhythm criteria are met during the test time interval. For example, each integration metric determined during the test time interval may be compared to the integration metric threshold. If a threshold number, e.g., X out Y or Y out of Y (where Y may equal one), of the integration metrics is less than the integration metric threshold, the expected rhythm criteria are not met at block 408. When one or more integration metrics determined during the test time interval are less than the integration metric threshold, control circuit 206 may determine that the expected rhythm criteria are not met at block 408.

In the example of an AV block monitoring feature, the heart rhythm during the test time interval, which may immediately follow the set-up time interval and may be within a relatively short time after the pacemaker 14 is implanted, is expected to be an AV conduction rhythm. As such, all integration metrics determined during the test time interval are expected to be greater than the integration metric threshold established at block 402. When all integration metrics are greater than the integration metric threshold, control circuit 206 may determine that the acceleration signal (or other cardiac signal being evaluated) and the determined integration metric threshold are reliable for enabling the AV block monitoring feature based on processing and analysis of the acceleration signal since AV conduction was reliably detected when expected. If criteria are met at block 408 for detecting the expected AV conduction rhythm, the AV block monitoring feature may be enabled by control circuit 206 at block 410. For example, when fewer than a threshold number of the integration metrics are less than the integration metric threshold, the expected rhythm criteria may be determined to be met by control circuit 206 at block 408. Control circuit 206 may enable AV block monitoring using the sensed cardiac signal and the associated integration metric threshold determined at block 404. In the illustrative example of an AV block monitoring feature, control circuit 206 may determine that a threshold number of low integration metrics, less than the integration metric threshold, occur during the test time period. In this case, control circuit 206 may determine that the expected rhythm criteria corresponding to an AV conduction rhythm are not met at block 408 and subsequently disable (or recommend disabling) the AV block monitoring feature at block 414.

When the expected rhythm criteria are not met at block 408, and a maximum number of attempts has not been reached at block 412, control circuit 206 may make additional attempts at enabling the monitoring feature before disabling the feature. Control circuit 206 may return to block 402 for determining integration metrics over another set-up time interval, determining an integration metric threshold based on the integration metrics at block 404, determining integration metrics over a test time interval at block 406 and applying expected rhythm criteria (using the new integration metric threshold) to the test time interval integration metrics at block 408. As described above, control circuit 206 may select a different cardiac signal when performing additional attempts, such as a different acceleration vector signal or a different type of signal, e.g., electrical rather than mechanical. If a maximum number of attempts at enabling the monitoring feature has been reached at block 412 (for each of one or more available sensed cardiac signals), control circuit 206 may disable the monitoring feature at block 414. In some examples, control circuit 206 may generate an output to notify the patient or user that the monitoring feature is recommended to be disabled or enabled at blocks 414 and 410, respectively, in addition to or instead of automatically disabling or enabling the monitoring feature.

Figure 11:
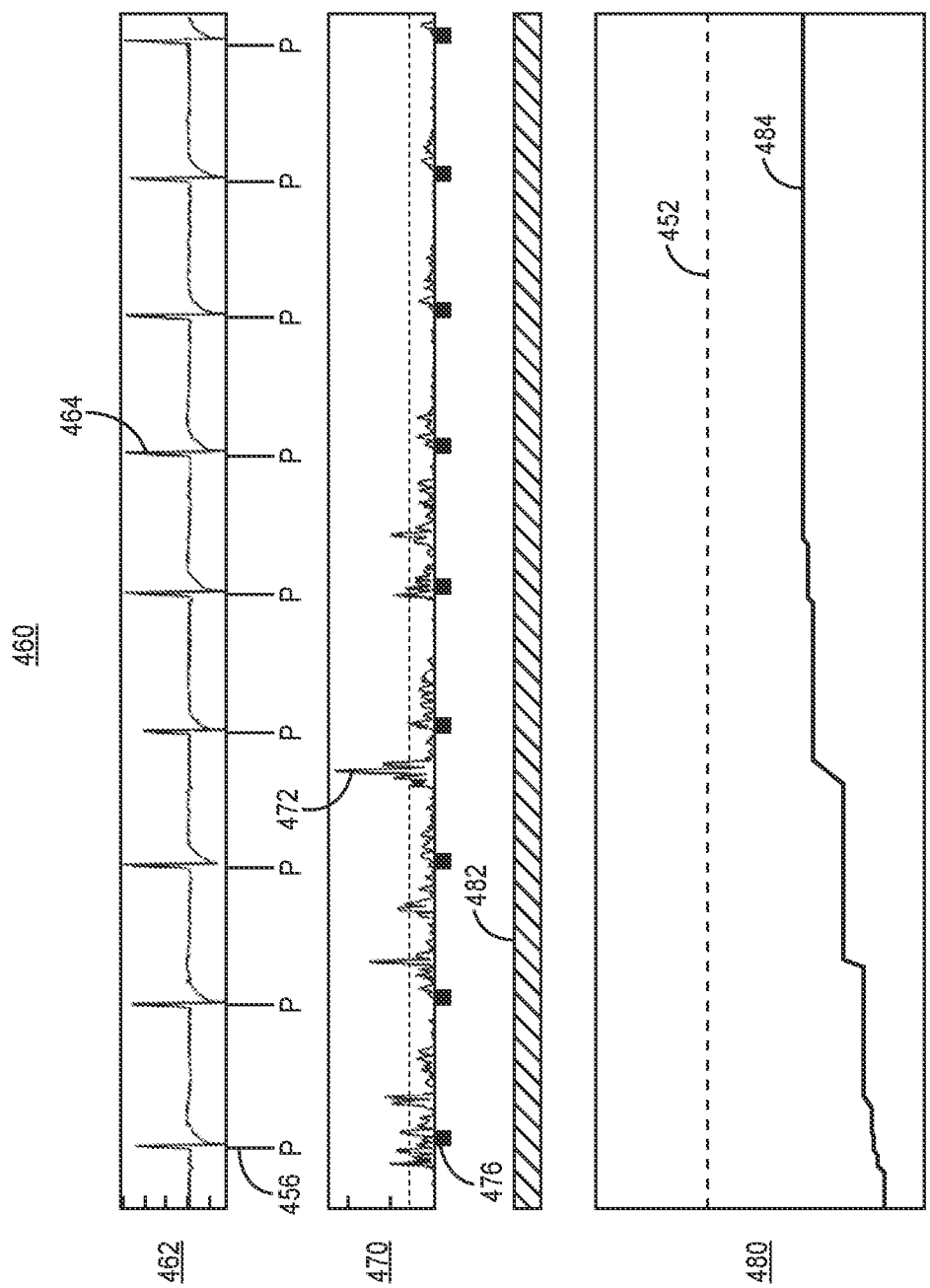
FIG. 11 is a diagram of a cardiac electrical signal and an acceleration signal when ventricular event signals disappear following atrial P-waves.

FIG. 11 is a diagram 460 of a cardiac electrical signal 462 and an acceleration signal 470 with ventricular event signals 472 that are observed following atrial P-waves 464 initially and then observed to disappear following the atrial P-waves 464. The ventricular event signals 472 may disappear due to AV block or a long ventricular pause or may be low amplitude or absent from the acceleration signal due to poor signal strength in some examples. The cardiac electrical signal 462 shows a regular rate of atrial P-waves 464, resulting in P-wave sensed event signals 456 produced by sensing circuit 204. The acceleration signal 470 may be integrated by control circuit 206, outside of atrial blanking periods 476 in this example, to determine an integration metric 480. At the end of the integration time interval 482, the integration metric 480 reaches a value 484 that is less than the integration metric threshold 452 established by control circuit 206 (e.g., at block 404 of FIG. 9). The integration metric threshold 452 may be established based on a minimum integration metric value during the set-up time interval as shown in FIG. 10. When the integration metric value 484 is determined during the test time period (e.g., at block 406 of FIG. 9), control circuit 206 may determine that the expected rhythm criteria corresponding to an AV conduction rhythm are not met. Control circuit 206 may determine that AV block monitoring that is based on processing and analysis of the acceleration signal 470 should be disabled. If the AV block monitoring feature has previously been enabled, the result of the low integration metric value 484, less than integration metric threshold 452, may lead to a determination of AV block by control circuit 206 during AV block monitoring.

The example method described in conjunction with the flow chart 400 of FIG. 9 may be performed beginning at the time of implant, during office visits, and/or periodically according to an update scheduled or triggered by a user command transmitted from external device 20. The set-up time period over which integration metrics are determined at block 402 for use in determining the integration metric threshold may vary and may be programmable. For example, the set-up time period may be relatively longer when the process of flow chart 400 is performed the first time after implant of pacemaker 14, e.g., over one to seven days or for two days in one example. When the process of flow chart 400 is being performed at a later time, e.g., during an office visit, the set-up time period may be relatively shorter, e.g., two minutes to fifteen minutes or about ten minutes. Likewise, the test time period over which integration metrics are determined at block 406 may vary and may be programmable. The test time period may be relatively longer the first time the process of flow chart 400 is performed, e.g., one day to seven days, and relatively shorter when the process of flow chart 400 is repeated, e.g., two to ten minutes or about five minutes. In some examples, the set-up time period applied at block 402 is longer than the test time period applied at block 406. The set-up time period and the test time period may be equal, however, or the set-up time period may be shorter than the test time period.

Furthermore, the test time period may be terminated early when control circuit 206 determines that the expected rhythm criteria are not met at block 408 before the expiration of the test time period. Control circuit 206 may reattempt enabling the monitoring feature by returning to block 402 and restarting the set-up time period using the same cardiac signal or a different cardiac signal for determining the integration metrics. The set-up time period and the test time period may be set differently for different cardiac signals. For example, the set-up time period and/or the test time period may be set differently when the integration metric is being determined from a single axis acceleration vector signal than a two or three axis acceleration vector signal. The set-up time period and/or the test time period may be set different when the integration metric is being determined from a cardiac motion signal than when the integration metric is being determined from a different type of signal, e.g., an electrical signal, a pressure signal, an oxygen saturation signal, etc.

Figure 12:
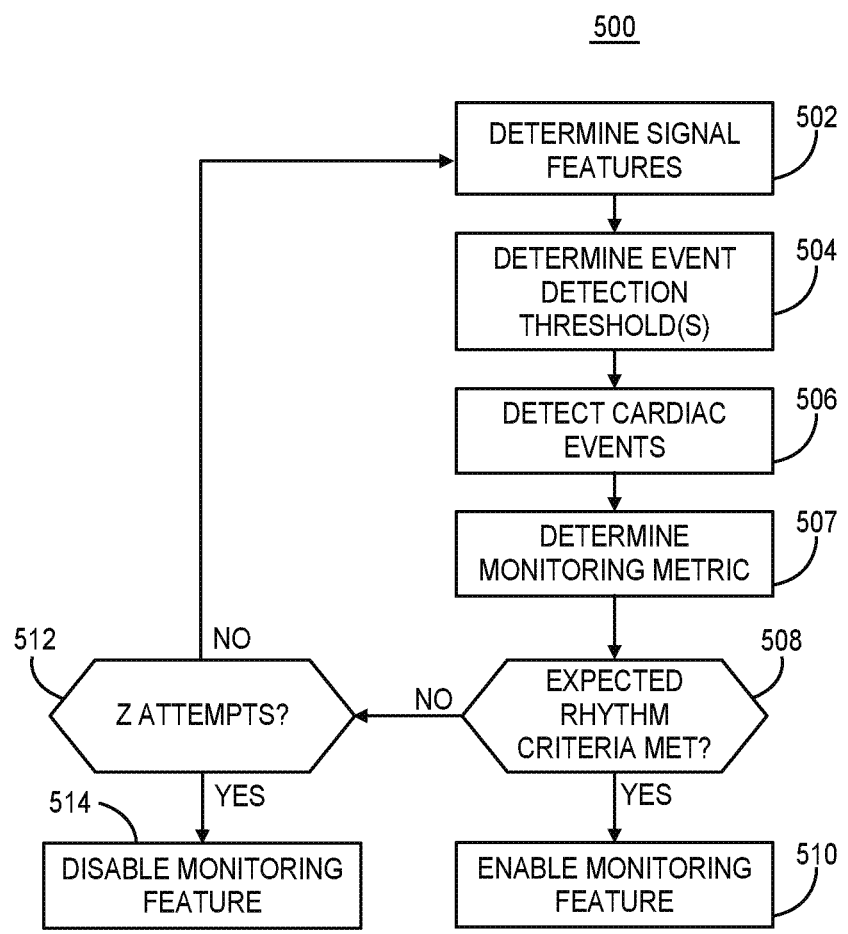
FIG. 12 is a flow chart of a method performed by a medical device for determining an event monitoring threshold for use in determining whether a monitoring feature of the medical device should be enabled according to another example.

FIG. 12 is a flow chart 500 of a method performed by a medical device for determining an event monitoring threshold for use in determining whether a monitoring feature should be enabled according to another example. At block 502, control circuit 206 determines one or more cardiac signal features from a sensed cardiac signal. Using the acceleration signal 360 shown in FIG. 8 as an example, control circuit 206 may determine a maximum peak amplitude 365 during each ventricular event sensing window 370 over a set-up time period. The set-up time period may be several seconds, several minutes, one hour or several hours, as examples. When cardiac signal features are being determined on a beat by beat basis, e.g., during each ventricular event sensing window 370 following each P-wave sensed event signal 358 (or atrial pacing pulse), a relatively shorter set-up time period may be used than when integration metrics are being determined over relatively longer integration time intervals that encompass multiple atrial cycles.

One or more cardiac signal features may be determined during each ventricular event sensing window 370 by control circuit 206 at block 502. Other example signal features that may be determined include a maximum slope or slew rate, signal width, overall waveform morphology template (e.g., using a Haar wavelet transform or other waveform morphology analysis), number of peaks, peak polarity, or other features or combinations of features of the sensed cardiac signal. For instance, control circuit 206 may determine when the signal width 378 during ventricular event sensing window 370 is at least a predetermined signal width threshold and then determine the maximum peak amplitude 365 that occurs within the signal width 378. The cardiac signal features may be determined over the set-up time period set by control circuit 206 to generate a histogram of waveform feature values or buffered in memory 210 to determine the minimum, maximum, median, mean, nth largest, nth smallest or specified percentile, as examples, of the buffered values of the waveform feature.

Control circuit 206 determines the event monitoring threshold as an event detection threshold at block 504 based on the determined cardiac signal features. The event detection threshold may be set for detecting a desired cardiac event during an individual heartbeat, e.g., on a beat-by-beat basis. For example, as shown in FIG. 8, a ventricular event detection threshold 377 may be set based on the maximum peak amplitudes 365 determined during the set-up time period. An event detection threshold may be determined for each of the different signal features determined, e.g., an event amplitude threshold may be determined based on the maximum peak amplitudes, an event slope threshold may be determined based on maximum signal slopes, a signal width threshold may be determined from signal widths, etc. Each event detection threshold may be set to a percentage or fraction of a metric of the determined signal feature, e.g., a percentage or fraction of a maximum, minimum, mean, median, nth largest or nth smallest value of the determined feature. In other examples, an event detection threshold may be set to a metric of the signal feature plus or minus a predetermined offset or to a specified percentile of the signal feature metric. When determining an event detection threshold based on morphology templates determined from the sensed cardiac signal, control circuit 206 may determine a morphology matching score threshold by determining morphology matching scores between waveform morphology templates determined during sensing windows. Control circuit 206 may set the morphology matching score threshold to be equal to or less than the lowest morphology matching score determined between morphology templates generated during the set-up time interval or based on a percentile of all determined matching scores.

The event detection threshold(s) determined at block 504 are set to enable detection of the individual cardiac event signal that is being monitored, e.g., ventricular event signals 362 of acceleration signal 360, during a cardiac cycle, e.g., atrial cycle 359. At block 506, control circuit 206 applies the event detection threshold(s) to the sensed cardiac signal for detecting the desired cardiac events, e.g., ventricular event signals 362. Cardiac events may be detected from the sensed cardiac signal over a predetermined test time interval, which may be the same, greater than or shorter than the set-up time period applied at block 502.

At block 507, control circuit 206 determines a monitoring metric based on the cardiac events detected during the test time interval at block 506. Control circuit 206 may wait until the test time interval expires to determine one or more monitoring metrics based on detected cardiac events or determine monitoring metric(s) during the test time interval as cardiac events are detected. Control circuit 206 determines if the monitoring metric(s) determined during or after the test time interval meet expected rhythm criteria at block 508. For example, control circuit 206 may determine the monitoring metric at block 507 by determining a rate of ventricular event signals 362 detected in response to the acceleration signal 360 crossing the ventricular event detection threshold amplitude 376 during ventricular sensing windows 370 applied during the test time interval. Control circuit 206 may compare the rate of detected ventricular events to an atrial rate, or determine the ratio of detected ventricular events to atrial events that occur during the test time interval, and compare the rate or ratio to a rate or ratio threshold at block 508 for determining that expected rhythm criteria are met. In the example of enabling an AV block monitoring feature, control circuit 206 may determine that expected AV conduction rhythm criteria are met when ventricular event signals are detected from the acceleration signal 360 at a 1:1 ratio with atrial electrical events (atrial pacing pulses and/or sensed P-waves) in the test time interval. In another example, the monitoring metric may be determined as a count of ventricular event sensing windows that occur during the test time interval without a ventricular event detection. When a threshold number of ventricular event sensing windows (consecutive or non-consecutive) expire without detecting the ventricular event signal based on the event detection threshold amplitude 376, control circuit 206 may determine that the expected rhythm criteria, e.g., expected AV conduction rhythm criteria, are not met at block 508.

In various examples, control circuit 206 may determine the monitoring metric at block 507 as a detected cardiac event rate, a ratio relative to other cardiac events, or as a cardiac event interval. The metric may be determined as a mean, median, maximum, minimum, variance or variability metric, or other metric of the rate or event intervals associated with the detected cardiac events. The expected rhythm criteria may be met when the monitoring metric determined at block 507 meets a threshold value, range or other criteria corresponding to an expected rate, expected ratio relative to other sensed or paced cardiac events (e.g., a 1:1 ratio between atrial events and detected ventricular event signals), and/or at an expected time interval relative to other sensed or paced cardiac events as examples.

Referring again to FIG. 8, control circuit 206 may determine AV time intervals 380 between a P-wave sensed event signal 358 and a subsequently detected ventricular event signal 362. During normal AV conduction, AV time intervals 380 are expected to be relatively stable and within an expected range of normal AV conduction time. Control circuit 206 may determine a monitoring metric at block 507 correlated to the variation in AV time intervals 380. When the variation is low, e.g., when less than a threshold number of AV time intervals 380 fall outside an expected AV conduction time range or when successive AV time interval differences are less than a threshold difference, control circuit 206 may determine that the expected AV conduction rhythm criteria are met at block 508. In another example, AV time interval variability may be determined and compared to a threshold. When the AV time interval variability is less than the threshold, the expected AV conduction rhythm criteria may be met at block 508.

It is contemplated that one or more different monitoring metrics may be determined at block 507. For example, control circuit 206 may determine an AV time interval metric and a ratio of detected ventricular events to atrial events for comparison to expected rhythm criteria at block 508. When the expected cardiac rhythm criteria are met at block 508, control circuit 206 may determine that the sensed cardiac signal and the event detection threshold(s) provide reliable cardiac event detection for enabling a monitoring feature, such as AV block monitoring, pacing capture monitoring, undersensing/oversensing monitoring or the like.

When control circuit 206 verifies that the expected rhythm criteria are met at block 508 based on a monitoring metric determined from cardiac events detected from the sensed cardiac signal using the determined event detection threshold, control circuit 206 may enable the monitoring feature at block 510. The monitoring feature relies on processing and analysis of the sensed cardiac signal for detecting the cardiac events (or not) based on the same event detection threshold applied to the same sensed cardiac signal. Using the example of AV block monitoring, control circuit 206 may detect ventricular event signals from a sensed acceleration signal based on the event detection threshold amplitude (and/or other event detection thresholds determined at block 504) when AV block monitoring is enabled. When expected AV conduction rhythm criteria are not met, e.g., based on detected ventricular event signals that do not occur at a 1:1 ratio with the atrial rate, irregular AV time intervals, or the absence of detected ventricular event signals, ventricular events may be undersensed or oversensed or AV block or another unexpected heart rhythm (e.g., atrial tachycardia or a ventricular arrhythmia) may actually be present. In this case, AV block monitoring may not be enabled but additional attempts may be made to enable AV block monitoring when fewer than a maximum number of attempts have already been made. AV block monitoring may therefore be enabled by control circuit 206 based on determining that AV conduction criteria are met at block 508 using the event detection threshold established at block 504.

When control circuit 206 determines that the expected rhythm criteria are not met at block 508, control circuit 206 may repeat the process by returning to block 502 until a maximum number of attempts are made as determined at block 512. Additional attempts may be made using the same cardiac signal to determine a new event detection threshold at block 504 after determining signal features from the sensed cardiac signal over another set-up time period at block 502. In some examples, a different cardiac signal may be selected for a new attempt upon returning to block 502.

When the maximum number of attempts have been made (for all possible cardiac signals available for the monitoring feature) as determined at block 512, control circuit 206 may disable the monitoring feature at block 514. For example, when expected AV conduction rhythm criteria are not met based on sensing ventricular event signals using the event detection threshold(s) determined at block 504, AV block monitoring may be disabled at block 514. As described above in conjunction with FIG. 7, control circuit 206 may additionally or alternatively generate a notification and/or data that is transmitted to an external device to support a recommendation of enabling or disabling the monitoring feature.

In other examples, instead of a motion signal, such as acceleration signal 360, a cardiac electrical signal, e.g., atrial electrical signal 352, may be sensed at block 502. Control circuit 206 may determine signal features from the cardiac electrical signal over a set-up time period at block 502. With reference to FIG. 8, control circuit 206 may determine a maximum peak amplitude (rectified or peak to peak), signal width, signal area, signal polarity or other features or combinations of features of the cardiac electrical signal 352 outside atrial blanking period 376 for determining one or more signal features corresponding to FFRWs 356. In some examples, the ventricular event sensing window 370 may be applied to cardiac electrical signal 352, e.g., from P-wave sensed event signal 358 (or an atrial pacing pulse) or from the expiration of atrial blanking period 376 and extend a predetermined interval that corresponds to an expected P-R interval during normal AV conduction to encompass the expected time of FFRWs 356.

At block 504, control circuit 206 may determine event detection threshold(s) from the determined cardiac electrical signal features for use in detecting FFRWs at block 506 during a test time period. When the FFRWs are detected at a 1:1 ratio with atrial events, the expected rhythm criteria may be met at block 508, allowing the AV block monitoring feature to be enabled at block 510 based on processing and analysis of the atrial electrical signal for FFRW sensing using the determined FFRW detection threshold(s). In some examples, control circuit 206 may verify that the AV intervals between atrial P-waves or atrial pacing pulses and a subsequently detected FFRWs are stable and within an expected AV conduction time interval range in order to verify that expected rhythm criteria are met at block 508.

When expected rhythm criteria are not met at block 508, undersensing of FFRWs, oversensing of FFRWs and/or actual AV block or other unexpected rhythm may be present. Control circuit 206 may perform multiple attempts (up to a maximum number of attempts as determined at block 512) using the cardiac electrical signal or by selecting a different signal, e.g., a cardiac motion signal, and returning to block 502 to repeat the process.

Figure 13:
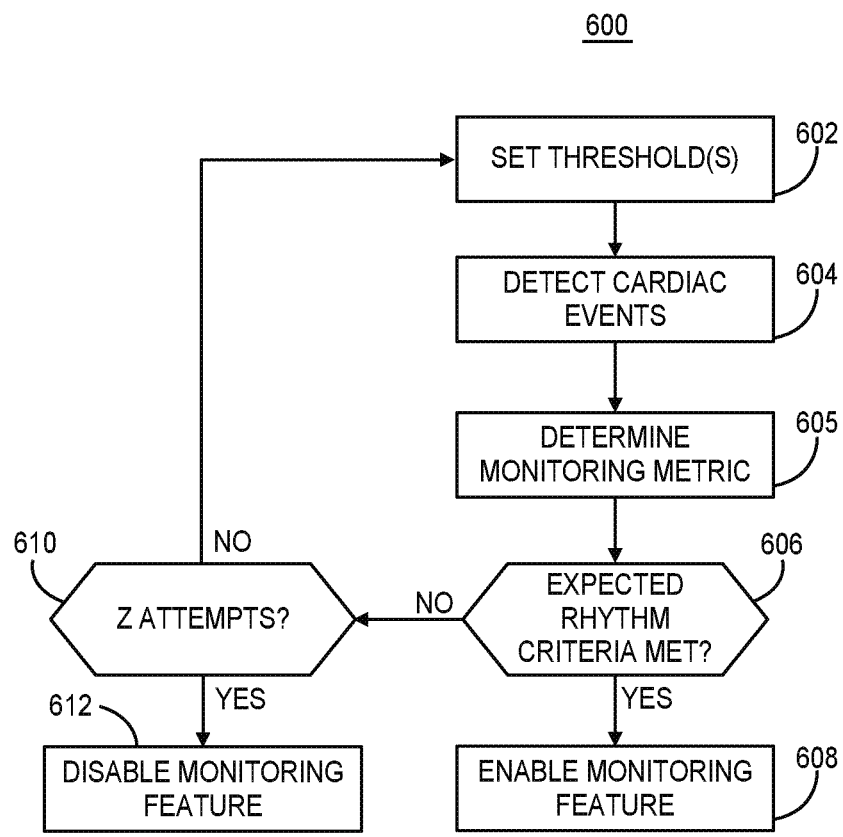
FIG. 13 is a flow chart of a method performed by a medical device for determining whether a monitoring feature utilizing a sensed cardiac signal should be enabled according to another example.

FIG. 13 is a flow chart 600 of a method performed by a medical device for determining whether a monitoring feature utilizing a sensed cardiac signal should be enabled according to another example. In some examples, determination of an event monitoring threshold based on determining cardiac signal features during a set-up time period as described above may be optional. In the example of FIG. 13, control circuit 206 sets an event monitoring threshold at block 602 to a default or nominal threshold setting or to a programmed starting event monitoring threshold. The event monitoring threshold may correspond to signal amplitude, however, it is recognized the event monitoring threshold may correspond to other signal features, such as signal width, morphology, polarity, number of peaks, event time interval, integration metric, or other signal features. In some examples, more than one event monitoring threshold may be set at block 602 in order to detect a desired cardiac event, e.g., a FFRW, a ventricular event signal from a motion signal, or other cardiac event signal based on a combination of event detection threshold requirements. In other examples, more than one event monitoring threshold may be set at block 602 to allow control circuit 206 to detect two or more different cardiac event signals, e.g., atrial event signals and ventricular event signals.

For the sake of illustration, the event threshold(s) set at block 602 may correspond to signal amplitude such that when a cardiac signal crosses the event threshold amplitude, a cardiac event may be detected. For instance, a nominal FFRW detection threshold amplitude may be set to 0.1 mV, as one example, at block 602. At block 604, control circuit 206 may detect FFRWs during a test time period based on FFRW detection threshold amplitude crossings by a cardiac electrical signal. The FFRW detection threshold amplitude may be applied to the cardiac electrical signal within a ventricular event sensing window and/or outside an atrial blanking period.

Control circuit 206 may determine a monitoring metric at block 605 based on cardiac events detected at block 604 during the test time interval. Control circuit 206 compares the monitoring metric(s) to expected rhythm criteria at block 606 to determine whether expected rhythm criteria are met based on the nominal event monitoring detection threshold set at block 602. When met, control circuit 206 may enable the monitoring feature at block 608. When the expected rhythm criteria are not met at block 606, control circuit 206 may adjust the event monitoring threshold(s) at block 602. In the example of monitoring for FFRWs for use in AV block monitoring, control circuit 206 may determine that expected rhythm criteria are not met at block 606 when a ratio of detected FFRW signals to atrial events is less than a 1:1 ratio. Control circuit 206 may adjust the FFRW detection threshold amplitude from the starting value at block 602 and repeat the process of detecting FFRWs at block 604 until the expected rhythm criteria are met (block 606) or until a maximum number of attempts using adjusted threshold amplitudes have been made (block 610). When the expected rhythm criteria are met using an adjusted event detection threshold, the monitoring feature, e.g., AV block monitoring based on processing and analysis of the cardiac electrical signals for FFRW detection, may be enabled by control circuit 206 using the adjusted event monitoring threshold.

In some examples, control circuit 206 may set an atrial event detection threshold and a ventricular event detection threshold at block 602. For example, a P-wave sensing threshold amplitude and a FFRW detection threshold amplitude may be set at block 602, to programmed or default, nominal values. At block 604, control circuit 206 may detect P-waves based on P-wave sensing threshold crossings and FFRWs based on FFRW detection threshold amplitude crossings and determine a monitoring metric at block 605 based on detected cardiac events as illustrated in conjunction with FIG. 14.

Figure 14:
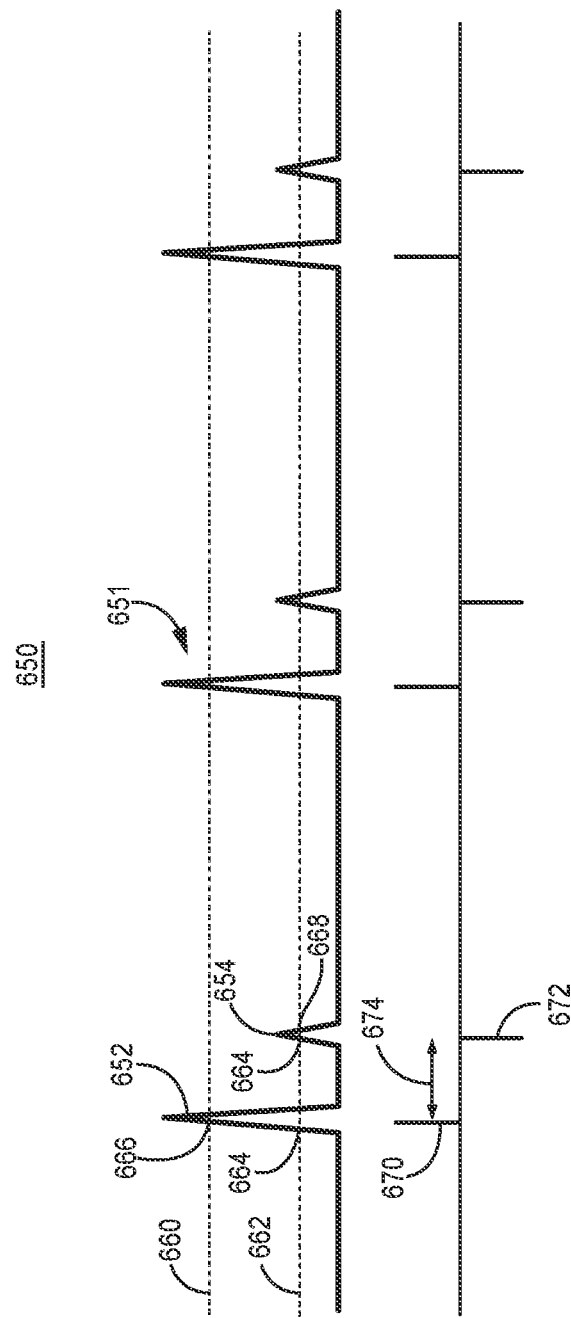
FIG. 14 is a diagram of a cardiac electrical signal may be sensed by the cardiac electrical signal sensing circuit of a medical device in association with a monitoring feature of the medical device according to another example.

FIG. 14 is a diagram 650 of a cardiac electrical signal 651 that may be sensed by cardiac electrical signal sensing circuit 204 of pacemaker 14. When pacemaker 14 is implanted within an atrial chamber, signal 651 is an atrial electrical signal including atrial P-waves 652 and at least some of the time including FFRWs 654. Cardiac electrical signal 651 may be a filtered and rectified signal that is passed to event detector 224 of cardiac electrical signal sensing circuit 204. Control circuit 206 may be configured to set a P-wave sensing threshold amplitude 660 and a FFRW detection threshold amplitude 662 at block 602 of FIG. 13. Sensing circuit 204 (or control circuit 206) may apply the threshold amplitudes 660 and 662 to the cardiac electrical signal 651 over a test time interval, e.g., for 5 to 10 seconds, 10 to 20 seconds, or 30 to 60 seconds as examples. When the cardiac electrical signal 651 crosses the first, lower FFRW detection threshold amplitude 662 and the second, higher P-wave sensing threshold amplitude 660, control circuit 206 detects a P-wave 652. Control circuit 206 may generate a P-wave sensed event signal 670. In order to detect P-wave 652, cardiac electrical signal 651 may be required to cross the second, higher P-wave sensing threshold amplitude after a first crossing 664 of the FFRW detection threshold 662 within a predetermined P-wave signal width time interval and/or before a negative going FFRW detection threshold crossing so that both the first, lower threshold crossing 664 and the second, higher threshold crossing 666 correspond to a single P-wave 652.

Control circuit 206 may detect a FFRW 654 when only the first, lower FFRW detection threshold 662 is crossed without a second, higher P-wave sensing threshold crossing before the negative going FFRW detection threshold crossing 668 and/or before a FFRW signal width time interval expires. Control circuit 206 may generate a FFRW detected event signal 672 in response to detecting each FFRW 654.

Referring again to FIG. 13 with continued reference to FIG. 14, at block 606 of FIG. 13, control circuit 206 may determine if expected rhythm criteria are met based on the P-wave sensed event signals 670 and the FFRW detected event signals 672 generated within the test time interval. When the FFRW event signals 672 follow each P-wave sensed event signal 670 in a 1:1 ratio, and in some cases at a stable AV time interval 674 that falls within an expected AV conduction time range, expected AV conduction rhythm criteria may be determined to be met at block 606 by control circuit 206. Control circuit 206 may enable an AV block monitoring feature that is based on processing and analysis of the cardiac electrical signal for detecting FFRWs using the FFRW detection threshold amplitude.

When the expected rhythm criteria are determined to be unmet at block 606 by control circuit 206, control circuit 206 may repeat the process of flow chart 600 up to a maximum number of attempts (as determined at block 610). For each new attempt, control circuit 206 may adjust one or more event monitoring thresholds at block 602. In the illustrative example of detecting P-waves and FFRWs, control circuit 206 may adjust the P-wave sensing threshold amplitude and/or the FFRW detection threshold amplitude at block 602 and apply the adjusted thresholds to the cardiac electrical signal over a new test time period at block 604. If a maximum number of attempts is reached at block 610, control circuit 206 may disable the monitoring feature, e.g., disable AV block monitoring based on FFRW detection, at block 612.

In other examples, the process of flow chart 600 or other flow charts presented herein may be performed by control circuit 206 to determine an event monitoring threshold that enables reliable detection of cardiac event signals for use in a capture monitoring feature, an oversensing and/or undersensing monitoring feature, a cardiac rate or rhythm monitoring feature, or other monitoring feature. For example, control circuit 206 may verify that atrial event signals and/or ventricular event signals, which may be near field or far field signals, can be reliably detected based on a selected event monitoring threshold during a test time interval before enabling a monitoring feature that relies on detecting the cardiac event using the selected event detection threshold. In at least some monitoring applications, the monitoring feature is enabled for determining when cardiac event signals are absent or occur at a low rate based on determining a monitoring metric from the sensed cardiac signal and using the established event monitoring threshold that was used to verify reliable detection of the cardiac event signals during a known or expected cardiac rhythm. In this way, control circuit 206 verifies that cardiac events or associated heart chamber activity are detected reliably based on the event monitoring threshold during an expected, normal cardiac rhythm so that when the desired cardiac events or associated heart chamber activity is abnormal (e.g., disappears or occurs at an abnormally high or low rate), the event monitoring threshold enables reliable detection of a cardiac condition associated with the absence of the cardiac events or abnormal heart chamber activity.

Figure 15:
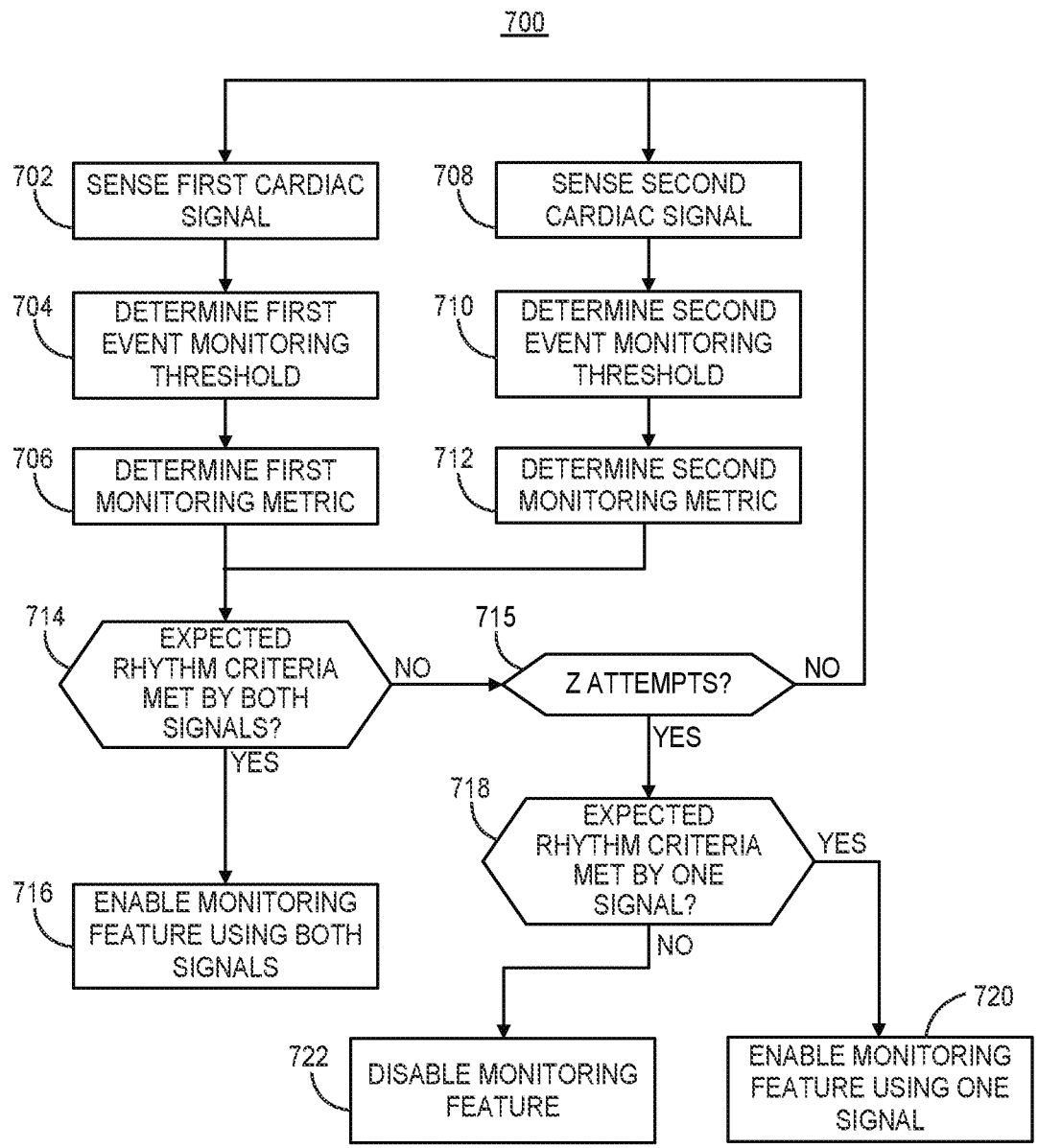
FIG. 15 is a flow chart of a method that may be performed by a medical device for enabling a cardiac signal monitoring feature of the device according to another example.

FIG. 15 is a flow chart 700 of a method for enabling a monitoring feature according to another example. At block 702, a first cardiac signal is sensed by the medical device, e.g., pacemaker 14. In some examples, the first cardiac signal may be a motion signal sensed by motion sensor 212.

At block 708, a second cardiac signal is sensed by the medical device. The second cardiac signal may be an electrical signal sensed by sensing circuit 204. Other examples of cardiac signals that may be sensed by the medical device are given above. The first and second cardiac signals may both be the same type of signal, e.g., both electrical or both mechanical signals, but sensed using different electrodes or sensors (or axes of the accelerometer) and/or at two different locations.

At block 704, control circuit 206 determines a first event monitoring threshold to be applied to the first cardiac signal. At block 710, control circuit 206 determines a second event monitoring threshold to be applied to the second cardiac signal. As described above, the first and second monitoring thresholds may be determined using any of the example methods described above.

At block 706, control circuit 206 determines a first monitoring metric from the first cardiac signal. At block 712, control circuit 206 determines a second monitoring metric from the second cardiac signal. Any of the methods described above may be used for determining the first and second monitoring metrics from the respective first and second cardiac signals. At block 714, control circuit 206 determines whether each of the first and second monitoring metrics meet expected rhythm criteria as defined for each of the first and second monitoring metrics, respectively. Control circuit 206 determines that the first cardiac signal meets first expected rhythm criteria using the first event monitoring threshold determined at block 704 by either determining the first monitoring metric using the first event monitoring threshold at block 706 (e.g., comparing the sensed cardiac signal amplitude to the event monitoring threshold) or comparing the first monitoring metric to the first event monitoring threshold (e.g., comparing an integration metric to an integration threshold) at block 714. Control circuit 206 determines that the second cardiac signal meets the second expected rhythm criteria using the second event monitoring threshold determined at block 710 by either determining the second monitoring metric using the second event monitoring threshold at block 712 or comparing the second monitoring metric to the second event monitoring threshold at block 714. Various examples for determining whether expected rhythm criteria are met are described above and may be used for determining if each of the first cardiac signal and the second cardiac signal meet respective expected rhythm criteria.

When control circuit 206 determines that both the first cardiac signal and the second cardiac signal meet the expected rhythm criteria, control circuit 206 may enable the monitoring feature using both signals at block 716. Some monitoring features may utilize two cardiac signals, e.g., to verify or corroborate a monitoring outcome from one signal using the second signal. When two signals are available, the sensitivity and/or specificity of the monitoring feature may be improved.

When control circuit 206 determines that both signals do not meet the expected rhythm criteria at block 714, control circuit 206 may return to blocks 702 and 708 to repeat the process until a specified number of attempts have been made, as determined at block 715. If Z attempts have been made to enable the feature using both signals, control circuit 206 may determine whether at least one of the signals meets expected rhythm criteria at block 718. When one of the signals meets expected rhythm criteria, control circuit 206 may still enable the monitoring feature using the one signal at block 720. In some examples, the expected rhythm criteria applied at block 718 to one of the first or second cardiac signals may be the same criteria applied at block 714. As long as at least one signal meets its respective expected rhythm criteria, the monitoring feature may be enabled. In other examples, the expected rhythm criteria applied at block 718 may be different than the criteria applied to the same cardiac signal at block 714. For instance, when a single cardiac signal is used for the monitoring feature, a different monitoring algorithm may be performed than when two signals are used by the monitoring feature. Therefore, different criteria may be applied for determining that the expected criteria are met by one signal at block 718 than when both signals are being evaluated at block 714.

In other examples, the expected rhythm criteria applied at block 718 may be more stringent than the criteria applied to the same cardiac signal at block 714. When the monitoring feature is enabled using a single cardiac signal, the expected rhythm criteria may be more stringent in order to ensure reliability of the signal cardiac signal for performing the monitoring feature. When control circuit 206 determines that neither the first nor the second cardiac signals meet the expected rhythm criteria ("no" branch of block 718), control circuit 206 may disable the monitoring feature at block 722 or generate an output to indicate that the monitoring feature is recommended to be disabled.

The process of FIG. 15 depicts Z attempts of enabling the monitoring feature using both signals first and then checking whether only one cardiac signal meets the expected rhythm criteria for enabling the monitoring feature. It is contemplated that in other examples control circuit 206 may determine whether one cardiac signal meets criteria for enabling the monitoring feature, based on relatively more stringent criteria applied to that signal. When one signal does not meet relatively more stringent criteria, the other signal may be tested. When the expected rhythm criteria are not met by a single cardiac signal, control circuit 206 may determine whether the two cardiac signals each meet relatively less stringent criteria so that the monitoring feature may be enabled using both signals.

It should be understood that, depending on the example, certain acts or events of any of the methods described herein can be performed in a different sequence, may be added, merged, or left out altogether (e.g., not all described acts or events are necessary for the practice of the method). Moreover, in certain examples, acts or events may be performed concurrently, e.g., through multi-threaded processing, interrupt processing, or multiple processors, rather than sequentially. In addition, while certain aspects of this disclosure are described as being performed by a single circuit or unit for purposes of clarity, it should be understood that the techniques of this disclosure may be performed by a combination of units or circuits associated with, for example, a medical device.

In one or more examples, the functions described may be implemented in hardware, software, firmware, or any combination thereof. If implemented in software, the functions may be stored as one or more instructions or code on a computer-readable medium and executed by a hardware-based processing unit. Computer-readable media may include computer-readable storage media, which corresponds to a tangible medium such as data storage media (e.g., RAM, ROM, EEPROM, flash memory, or any other medium that can be used to store desired program code in the form of instructions or data structures and that can be accessed by a computer).

Instructions may be executed by one or more processors, such as one or more digital signal processors (DSPs), general purpose microprocessors, application specific integrated circuits (ASICs), field programmable logic arrays (FPLAs), or other equivalent integrated or discrete logic circuitry. Accordingly, the term "processor," as used herein may refer to any of the foregoing structure or any other structure suitable for implementation of the techniques described herein. Also, the techniques could be fully implemented in one or more circuits or logic elements.

Thus, a medical device has been presented in the foregoing description with reference to specific examples. It is to be understood that various aspects disclosed herein may be combined in different combinations than the specific combinations presented in the accompanying drawings. It is appreciated that various modifications to the referenced examples may be made without departing from the scope of the disclosure and the following claims.

What is claimed is:

1. A medical device comprising:
   a first sensing circuit configured to sense a first cardiac signal; and
   a control circuit configured to:
   determine a monitoring metric representative of activity of at least one heart chamber from the first cardiac signal;
   determine if the monitoring metric meets expected rhythm criteria by determining if the monitoring metric meets atrioventricular conduction criteria;
   in response to determining that the monitoring metric meets the atrioventricular conduction criteria:
   determine that the first cardiac signal is reliable for use by a monitoring feature of the medical device; and
   enable at least one monitoring feature of the medical device that is based on processing and analysis of the first cardiac signal by at least enabling an atrioventricular block monitoring feature;
   or
   in response to determining that the monitoring metric does not meet the atrioventricular conduction criteria:
   determine that the first cardiac signal is not reliable for use by a monitoring feature of the medical device; and
   disable at least one monitoring feature of the medical device by at least disabling the atrioventricular block monitoring feature.

2. The medical device of claim 1, wherein the control circuit is configured to:
   determine a first event monitoring threshold by:
   determining the monitoring metric from the first cardiac signal sensed during a first time interval; and
   determining the first event monitoring threshold based on the determined monitoring metric;
   redetermine the monitoring metric from the first cardiac signal sensed during a second time interval after the first time interval; and
   determine that the redetermined monitoring metric meets the expected rhythm criteria based on a comparison of the redetermined monitoring metric to the first event monitoring threshold.

3. The medical device of claim 1, wherein the control circuit is configured to determine the monitoring metric by determining an integration metric of the first cardiac signal by summing sample points of the first cardiac signal sensed over an integration time period comprising a plurality of cardiac cycles.

4. The medical device of claim 3, wherein the control circuit is further configured to:
   determine an atrial rate; and
   determine the monitoring metric by normalizing the integration metric by the atrial rate.

5. The medical device of claim 3, wherein the control circuit is configured to:
   determine a first event monitoring threshold by:
   determining the integration metric from the first cardiac signal over each one of a plurality of integration time intervals occurring within a first time interval, where each one of the plurality of integration time intervals extends over a plurality of cardiac cycles; and
   determining the first event monitoring threshold based on the integration metrics determined from the first cardiac signal sensed over the first time interval;
   re-determine the integration metric from the first cardiac signal sensed over at least one integration time interval occurring during a second time interval after the first time interval;
   determine that the re-determined integration metric is greater than the first event monitoring threshold; and
   determine that the expected rhythm criteria are met in response to the re-determined integration metric being greater than the first event monitoring threshold.

6. The medical device of claim 5, wherein the control circuit is further configured to set the first event monitoring threshold by:
   identifying a minimum integration metric from the integration metrics determined over each one of the plurality of integration time intervals occurring during the first time interval; and
   setting the event monitoring threshold based on the minimum integration metric.

7. The medical device of claim 1, wherein the control circuit is configured to determine the monitoring metric by:
   identifying a plurality of ventricular events from the first cardiac signal; and
   determining the monitoring metric based on the identified plurality of ventricular events by determining at least one of:
   a ventricular event rate;
   an atrioventricular time interval; and
   a ratio of a count of the plurality of ventricular events to a count of atrial events occurring over a time interval comprising the identified plurality of ventricular events.

8. The medical device of claim 7, wherein the control circuit is configured to:
   set an event monitoring threshold; and
   identify the plurality of ventricular events from the first cardiac signal based on the first cardiac signal crossing the event monitoring threshold.

9. The medical device of claim 8, wherein the control circuit is configured to set the event monitoring threshold by:
   setting a blanking interval in response to each of the plurality of atrial events
   determining a maximum amplitude of the first cardiac signal outside the blanking interval; and
   setting the event monitoring threshold based on the maximum amplitude.

10. The medical device of claim 1, wherein the control circuit is configured to:
    set a first event monitoring threshold;
    determine the monitoring metric from the first cardiac signal sensed during a first time interval;
    determine, based on the first event monitoring threshold, that the monitoring metric determined from the first cardiac signal sensed during the first time interval does not meet the expected rhythm criteria;
    adjust the first event monitoring threshold to a second event monitoring threshold;
    re-determine the monitoring metric from the first cardiac signal sensed during a second time interval after the first time interval;
    determine, based on the second event monitoring threshold, that the re-determined monitoring metric determined from the first cardiac signal sensed during the second time interval meets the expected rhythm criteria; and enable the at least one monitoring feature of the medical device in response to the redetermined monitoring metric meeting the expected rhythm criteria.

11. The medical device of claim 1, further comprising a second sensing circuit configured to sense a second cardiac signal different than the first cardiac signal, wherein the control circuit is configured to:
determine that the monitoring metric determined from the first cardiac signal does not meet the expected rhythm criteria;
determine a second monitoring metric from the second cardiac signal;
determine that the second monitoring metric meets the expected rhythm criteria; and
enable the at least one monitoring feature of the medical device based on processing and analysis of the second cardiac signal in response to the second monitoring metric meeting the expected rhythm criteria.

12. The medical device of claim 1, wherein:
the first sensing circuit comprises an accelerometer for sensing the first cardiac signal as an acceleration signal.

13. The medical device of claim 1, wherein:
the first sensing circuit is configured to sense the first cardiac signal as a cardiac electrical signal; and
the control circuit is configured to:
set an event monitoring threshold by setting a far field R-wave detection threshold;
sense far field R-waves from the cardiac electrical signal; and
determine the monitoring metric based on the sensed far field R-waves.

14. The medical device of claim 1, further comprising:
a second sensing circuit configured to sense a second cardiac signal different than the first cardiac signal;
wherein the control circuit is configured to:
determine that the second cardiac signal meets second expected rhythm criteria; and
enable the at least one monitoring feature of the medical device that is based on processing and analysis of the first cardiac signal and the second cardiac signal in response to the monitoring metric determined from the first cardiac signal meeting the expected rhythm criteria and the second cardiac signal meeting the second expected rhythm criteria.

15. The medical device of claim 1, wherein the control circuit is further configured to enable at least one monitoring feature by enabling one of a cardiac capture monitoring feature, an oversensing monitoring feature, and a cardiac event undersensing monitoring feature.

16. A method, comprising:
sensing a first cardiac signal determining a monitoring metric representative of activity of at least one heart chamber from the first cardiac signal;
determining if the monitoring metric meets expected rhythm criteria by determining if the monitoring metric meets atrioventricular conduction criteria; and
in response to the monitoring metric meeting the atrioventricular conduction criteria:
determining that the first cardiac signal is reliable for use by a monitoring feature of the medical device; and enabling a monitoring feature of the medical device that is based on processing and analysis of the first cardiac signal by at least enabling an atrioventricular block monitoring feature;
or
in response to determining that the monitoring metric does not meet the atrioventricular conduction criteria:
determining that the first cardiac signal is not reliable for use by a monitoring feature of the medical device; and
disabling at least one monitoring feature of the medical device by at least disabling the atrioventricular block monitoring feature.

17. The method of claim 16, comprising:
determining a first event monitoring threshold by:
determining the monitoring metric from the first cardiac signal sensed during a first time interval; and
determining the first event monitoring threshold based on the determined monitoring metric;
redetermining the monitoring metric from the first cardiac signal sensed during a second time interval after the first time interval; and
determining that the redetermined monitoring metric meets the expected rhythm criteria based on a comparison of the redetermined monitoring metric to the first event monitoring threshold.

18. The method claim 16, wherein determining the monitoring metric comprises determining an integration metric of the first cardiac signal by summing sample points of the first cardiac signal sensed over an integration time period comprising a plurality of cardiac cycles.

19. The method of claim 18, further comprising:
determining an atrial rate; and
determining the monitoring metric by normalizing the integration metric by the atrial rate.

20. The method of claim 18, further comprising:
determining a first event monitoring threshold by:
determining the integration metric from the first cardiac signal over each one of a plurality of integration time intervals occurring within a first time interval, where each one of the plurality of integration time intervals extends over a plurality of cardiac cycles; and
determining the first event monitoring threshold based on the integration metrics determined from the first cardiac signal sensed during the first time interval;
re-determining the integration metric from the first cardiac signal sensed over at least one integration time interval occurring during a second time interval after the first time interval;
determining that the re-determined integration metric is greater than the first event monitoring threshold; and
determining that the expected rhythm criteria are met in response to the re-determined integration metric being greater than the first event monitoring threshold.

21. The method of claim 20, where setting the first event monitoring threshold further comprises:
identifying a minimum integration metric from the integration metrics determined over each one of the plurality of integration time intervals occurring during the first time interval; and
setting the event monitoring threshold based on the minimum integration metric.

22. The method of claim 16, wherein determining the monitoring metric comprises:
identifying a plurality of ventricular events from the first cardiac signal; and determining the monitoring metric based on the identified plurality of ventricular events by determining at least one of:
a ventricular event rate;
an atrioventricular time interval; and
a ratio of a count of the plurality of ventricular events to a count of atrial events occurring over a time interval comprising the identified plurality of ventricular events.

23. The method of claim 22, further comprising:
setting an event monitoring threshold; and
identifying the plurality of ventricular events from the first cardiac signal based on the first cardiac signal crossing the event monitoring threshold.

24. The method of claim 23, wherein setting the event monitoring threshold comprises:
setting a blanking interval in response to each of the plurality of atrial events
determining a maximum amplitude of the first cardiac signal outside the blanking interval; and
setting the event monitoring threshold based on the maximum amplitude.

25. The method of claim 16, further comprising:
setting a first event monitoring threshold;
determining the monitoring metric from the first cardiac signal sensed during a first time interval;
determining, based on the first event monitoring threshold, that the monitoring metric determined from the first cardiac signal sensed during the first time interval does not meet the expected rhythm criteria;
adjusting the first event monitoring threshold to a second event monitoring threshold;
re-determining the monitoring metric from the first cardiac signal sensed during a second time interval after the first time interval;
determining, based on the second event monitoring threshold, that the re-determined monitoring metric determined from the first cardiac signal sensed during the second time interval meets the expected rhythm criteria; and
enabling the at least one monitoring feature of the medical device in response to the redetermined monitoring metric meeting the expected rhythm criteria.

26. The method of claim 16, further comprising:
determining that the monitoring metric determined from the first cardiac signal does not meet the expected rhythm criteria;
sensing a second cardiac signal different than the first cardiac signal;
determining a second monitoring metric from the second cardiac signal;
determining that the second monitoring metric meets the expected rhythm criteria; and
enabling the at least one monitoring feature of the medical device that is based on processing and analysis of the second cardiac signal in response to the second monitoring metric meeting the expected rhythm criteria.

27. The method of claim 16, comprising sensing the first cardiac signal as an acceleration signal.

28. The method of claim 16, comprising:
sensing the first cardiac signal as a cardiac electrical signal;
setting a far field R-wave detection threshold;
sensing far field R-waves from the cardiac electrical signal based on the far field R-wave detection threshold; and
determining the monitoring metric based on the sensed far field R-waves.

29. The method of claim 16, further comprising:
sensing a second cardiac signal different than the first cardiac signal;
determining that the second cardiac signal meets second expected rhythm criteria; and
enabling the at least one monitoring feature of the medical device that is based on processing and analysis of the first cardiac signal and the second cardiac signal in response to the monitoring metric determined from the first cardiac signal meeting the expected rhythm criteria and the second cardiac signal meeting second expected rhythm criteria.

30. A non-transitory, computer-readable storage medium comprising a set of instructions which, when executed by a control circuit of a medical device, cause the medical device to:
sense a cardiac signal
determine a monitoring metric representative of activity of at least one heart chamber from the cardiac signal;
determine if the monitoring metric meets expected rhythm criteria by determining if the monitoring metric meets atrioventricular conduction criteria; and
in response to determining that the monitoring metric meets atrioventricular conduction criteria:
determine that the first cardiac signal is reliable for use by a monitoring feature of the medical device; and
enable at least one monitoring feature of the medical device that is based on processing and analysis of the first cardiac signal by at least enabling an atrioventricular block monitoring feature; and
in response to determining that the monitoring metric does not meet the atrioventricular conduction criteria:
determine that the first cardiac signal is not reliable for use by a monitoring feature of the medical device; and
disable at least one monitoring feature of the medical device by at least disabling the atrioventricular block monitoring feature.

\* \* \* \* \*